United States Patent
Shin et al.

(10) Patent No.: US 8,204,087 B2
(45) Date of Patent: Jun. 19, 2012

(54) MULTI-LANE SIGNAL TRANSMITTING AND RECEIVING APPARATUSES

(75) Inventors: Jong-yoon Shin, Daejeon-si (KR); Jong-ho Kim, Daejeon-si (KR); Je-soo Ko, Daejeon-si (KR)

(73) Assignee: Electronics and Telecommunications Research Institute (KR)

( * ) Notice: Subject to any disclaimer, the term of this patent is extended or adjusted under 35 U.S.C. 154(b) by 295 days.

(21) Appl. No.: 12/634,651

(22) Filed: Dec. 9, 2009

(65) Prior Publication Data

US 2010/0158518 A1 Jun. 24, 2010

(30) Foreign Application Priority Data

Dec. 19, 2008 (KR) .................. 10-2008-0130629
Jun. 19, 2009 (KR) .................. 10-2009-0055036

(51) Int. Cl.
*H04J 3/22* (2006.01)
(52) U.S. Cl. ............. 370/543; 370/522; 398/43
(58) Field of Classification Search ............. 370/52, 370/474, 475, 532–543; 398/43, 140
See application file for complete search history.

(56) References Cited

U.S. PATENT DOCUMENTS

| | | | |
|---|---|---|---|
| 5,461,622 A | 10/1995 | Bleickardt et al. | |
| 7,525,983 B2 * | 4/2009 | Dropps et al. | 370/437 |
| 2008/0131117 A1 * | 6/2008 | Cho et al. | 398/45 |
| 2009/0263135 A1 * | 10/2009 | Dong et al. | 398/98 |
| 2010/0046951 A1 * | 2/2010 | Dong et al. | 398/98 |
| 2010/0098415 A1 * | 4/2010 | Jiang | 398/45 |
| 2010/0177785 A1 * | 7/2010 | Kisaka et al. | 370/465 |
| 2011/0217047 A1 * | 9/2011 | Dong et al. | 398/182 |

FOREIGN PATENT DOCUMENTS

WO WO 2008/110119 A1 9/2008

OTHER PUBLICATIONS

Pepper, Jerry, "Enabling 100 Gigabit Ethernet: Implementing PCS Lanes," IXIA White Paper (May 2009) 14 pages.

* cited by examiner

*Primary Examiner* — Gary Mui
(74) *Attorney, Agent, or Firm* — Blakely, Sokoloff, Taylor & Zafman

(57) ABSTRACT

An optical communication system is provided. In particular, multi-lane signal transmitting and receiving apparatuses capable of transmitting and receiving a multi-lane signal using the same inverse multiplexing scheme even when optic modules having several transport lane numbers are selected according to a purpose of use are provided. Each OTUk capable of containing a client signal in a transport hierarchy signal (OTUk-Xv) is defined as a virtual container, and Y virtual lanes are allocated to respective virtual containers X, in which identification information for the allocated virtual lanes is inserted into an overhead area and a transport hierarchy multi-lane signal is transmitted in the form of OTUk-XvYd. A receiving stage extracts the identification information inserted into the overhead area of the transport hierarchy signal in the form of OTUk-XvYd, compensates for a skew of the received signals, and aligns virtual lane signals for each virtual container to restore an OTUk-Xv signal that is an original transport hierarchy signal.

20 Claims, 45 Drawing Sheets

FIG.4A

| | 1 | 2 | 3 | 4 | 5 | 6 | 7 | 8 | 9 | 10 | 11 | 12 | 13 | 14 | 15 | 16 | 17 | ... 1904 | 1905 | ... 1920 | 1921 | ... 3824 | 3825 | ... 4080 |
|---|---|---|---|---|---|---|---|---|---|---|---|---|---|---|---|---|---|---|---|---|---|---|---|---|
| 1 | A1 | A1 | A1 | A2 | A2 | A2 | MFAS | SM | | | GCC0 | RES | | FTFL | | | OPU OH | Payload | | 4x16FS | | Payload | | FEC |
| 2 | RES | | | TCM ACT | TCM6 | | TCM5 | | TCM4 | | | EXP | | | | | | | | | | | |
| 3 | TCM3 | | | TCM2 | | | TCM1 | | PM | | RES | | | | | | | | | | | | |
| 4 | GCC1 | | | GCC2 | | | APS/PCC | | | | | | | | | | | | | | | | |

FIG.5A

| | 1 | | | | | 6 | 7 | 8 | | 10 | 11 | 12 | 13 | | 14 | 15 | 16 | 17 | | 1904 | 1905 | 1920 | 1921 | | 3824 | 3825 | | 4080 |
|---|---|---|---|---|---|---|---|---|---|---|---|---|---|---|---|---|---|---|---|---|---|---|---|---|---|---|---|---|
| | 1 | A1 | A1 | A2 | A2 | A2 | MFAS | SM | | | GCC0 | VLM1 | VLM11 | | OPU OH | | | | | | | | | | | | | |
| OTU2e#1v | 2 | RES | | TCM ACT | | | TCM6 | TCM5 | | | | TCM4 | FTFL | | | | | Payload | | | 4x16FS | | Payload | | | FEC | | |
| | 3 | TCM3 | | | TCM2 | | | TCM1 | | | | PM | EXP | | | | | | | | | | | | | | | |
| | 4 | GCC1 | | | GCC2 | | | APS/PCC | | | | | RES | | | | | | | | | | | | | | | |

| | 1 | | | | | 6 | 7 | 8 | | 10 | 11 | 12 | 13 | | 14 | 15 | 16 | 17 | | 1904 | 1905 | 1920 | 1921 | | 3824 | 3825 | | 4080 |
|---|---|---|---|---|---|---|---|---|---|---|---|---|---|---|---|---|---|---|---|---|---|---|---|---|---|---|---|---|
| | 1 | A1 | A1 | A2 | A2 | A2 | MFAS | SM | | | GCC0 | VLM2 | VLM12 | | OPU OH | | | | | | | | | | | | | |
| OTU2e#2v | 2 | RES | | TCM ACT | | | TCM6 | TCM5 | | | | TCM4 | FTFL | | | | | Payload | | | 4x16FS | | Payload | | | FEC | | |
| | 3 | TCM3 | | | TCM2 | | | TCM1 | | | | PM | EXP | | | | | | | | | | | | | | | |
| | 4 | GCC1 | | | GCC2 | | | APS/PCC | | | | | RES | | | | | | | | | | | | | | | |

· · · · ·

| | 1 | | | | | 6 | 7 | 8 | | 10 | 11 | 12 | 13 | | 14 | 15 | 16 | 17 | | 1904 | 1905 | 1920 | 1921 | | 3824 | 3825 | | 4080 |
|---|---|---|---|---|---|---|---|---|---|---|---|---|---|---|---|---|---|---|---|---|---|---|---|---|---|---|---|---|
| | 1 | A1 | A1 | A2 | A2 | A2 | MFAS | SM | | | GCC0 | VLM10 | VLM20 | | OPU OH | | | | | | | | | | | | | |
| OTU2e#10v | 2 | RES | | TCM ACT | | | TCM6 | TCM5 | | | | TCM4 | FTFL | | | | | Payload | | | 4x16FS | | Payload | | | FEC | | |
| | 3 | TCM3 | | | TCM2 | | | TCM1 | | | | PM | EXP | | | | | | | | | | | | | | | |
| | 4 | GCC1 | | | GCC2 | | | APS/PCC | | | | | RES | | | | | | | | | | | | | | | |

FIG.5B

VLM

| | VMFS | | | | VCN | |
|---|---|---|---|---|---|---|

VLM1

| | VMFS | | | 0 | 0 | 0 | 0 |
|---|---|---|---|---|---|---|---|

VLM11

| | VMFS | | | 0 | 0 | 0 | 0 |
|---|---|---|---|---|---|---|---|

VLM5

| | VMFS | | | 1 | 0 | 0 | 0 |
|---|---|---|---|---|---|---|---|

VLM15

| | VMFS | | | 1 | 0 | 0 | 0 |
|---|---|---|---|---|---|---|---|

| | 1 | 2 | 3 | 4 | 5 | ### | 4079 | 4080 |
|---|---|---|---|---|---|---|---|---|
| 1 | VLn | VLn+10 | VLn | VLn+10 | | | VLn | VLn+10 |
| 2 | VLn+10 | VLn | VLn+10 | VLn | | | VLn | VLn+10 |
| 3 | VLn | VLn+10 | VLn | VLn+10 | | ⋮ | VLn | VLn+10 |
| 4 | VLn+10 | VLn | VLn+10 | VLn | | | VLn | VLn+10 |

FIG.10A

VCM

FIG.10C

| | 1 | 8 | 9 | 16 | 17 | 24 | 25 | 32 | 33 | ... | 4064 | 4065 | 4072 | 4073 | ### |
|---|---|---|---|---|---|---|---|---|---|---|---|---|---|---|---|
| 2*m of OTU2e#nv  1 | VLn | | VLn+10 | | VLn | | VLn+10 | | | | | VL n | | VLn+10 | |
| 2 | VLn | | VLn+10 | | VLn | | VLn+10 | | | | | VL n | | VLn+10 | |
| 3 | VLn | | VLn+10 | | VLn | | VLn+10 | | | | | VL n | | VLn+10 | |
| 4 | VLn | | VLn+10 | | VLn | | VLn+10 | | | | | VL n | | VLn+10 | |

| | 1 | 8 | 9 | 16 | 17 | 24 | 25 | 32 | 33 | ... | 4064 | 4065 | 4072 | 4073 | ### |
|---|---|---|---|---|---|---|---|---|---|---|---|---|---|---|---|
| 2*m+1 of OTU2e#nv  1 | VLn+10 | | VLn | | VLn+10 | | VLn | | | | | VLn+10 | | VLn | |
| 2 | VLn+10 | | VLn | | VLn+10 | | VLn | | | | | VLn+10 | | VLn | |
| 3 | VLn+10 | | VLn | | VLn+10 | | VLn | | | | | VLn+10 | | VLn | |
| 4 | VLn+10 | | VLn | | VLn+10 | | VLn | | | | | VLn+10 | | VLn | |

FIG.10D

| | 1 | 2 | 3 | 4 | 5 | 6 | 7 | 8 | 9 | 10 | 11 | 12 | 13 | 14 | 15 | 16 | 17 | ... | 1904 | 1905 | 1920 | 1921 | ... | 3824 | 3825 | ... | 4080 |
|---|---|---|---|---|---|---|---|---|---|---|---|---|---|---|---|---|---|---|---|---|---|---|---|---|---|---|---|
| OTU2e#1v 1 | A1 | A1 | A1 | A2 | A2 | A2 | VCM | MFAS | SM | | GCCO | | RES | | | OPU OH | Payload | | | 4x16FS | | Payload | | | FEC | |
| 2 | RES | | | TCM ACT | | | TCM6 | TCM5 | | TCM4 | | FTFL | | | | | | | | | | | | | | | |
| 3 | TCM3 | | | TCM2 | | | TCM1 | | | PM | | EXP | | | | | | | | | | | | | | | |
| 4 | GCC1 | | | GCC2 | | | APS/PCC | | | | | RES | | | | | | | | | | | | | | | |

| | 1 | 2 | 3 | 4 | 5 | 6 | 7 | 8 | 9 | 10 | 11 | 12 | 13 | 14 | 15 | 16 | 17 | ... | 1904 | 1905 | 1920 | 1921 | ... | 3824 | 3825 | ... | 4080 |
|---|---|---|---|---|---|---|---|---|---|---|---|---|---|---|---|---|---|---|---|---|---|---|---|---|---|---|---|
| OTU2e#2v 1 | A1 | A1 | A1 | A2 | A2 | A2 | VCM | MFAS | SM | | GCCO | | RES | | | OPU OH | Payload | | | 4x16FS | | Payload | | | FEC | |
| 2 | RES | | | TCM ACT | | | TCM6 | TCM5 | | TCM4 | | FTFL | | | | | | | | | | | | | | | |
| 3 | TCM3 | | | TCM2 | | | TCM1 | | | PM | | EXP | | | | | | | | | | | | | | | |
| 4 | GCC1 | | | GCC2 | | | APS/PCC | | | | | RES | | | | | | | | | | | | | | | |

.....

| | 1 | 2 | 3 | 4 | 5 | 6 | 7 | 8 | 9 | 10 | 11 | 12 | 13 | 14 | 15 | 16 | 17 | ... | 1904 | 1905 | 1920 | 1921 | ... | 3824 | 3825 | ... | 4080 |
|---|---|---|---|---|---|---|---|---|---|---|---|---|---|---|---|---|---|---|---|---|---|---|---|---|---|---|---|
| OTU2e#10v 1 | A1 | A1 | A1 | A2 | A2 | A2 | VCM | MFAS | SM | | GCCO | | RES | | | OPU OH | Payload | | | 4x16FS | | Payload | | | FEC | |
| 2 | RES | | | TCM ACT | | | TCM6 | TCM5 | | TCM4 | | FTFL | | | | | | | | | | | | | | | |
| 3 | TCM3 | | | TCM2 | | | TCM1 | | | PM | | EXP | | | | | | | | | | | | | | | |
| 4 | GCC1 | | | GCC2 | | | APS/PCC | | | | | RES | | | | | | | | | | | | | | | |

FIG.10E

| | 1 | 16 | 17 | 32 | 33 | 48 | 49 | 64 | 65 | | 4048 | 4049 | | 4064 | 4065 | ### |
|---|---|---|---|---|---|---|---|---|---|---|---|---|---|---|---|---|
| 2*m of OTU2e#nv | 1 | VLn | | VLn+10 | | VLn | | VLn+10 | | ... | | VLn | | | VLn+10 | |
| | 2 | VLn | | VLn+10 | | VLn | | VLn+10 | | | | VLn | | | VLn+10 | |
| | 3 | VLn | | VLn+10 | | VLn | | VLn+10 | | | | VLn | | | VLn+10 | |
| | 4 | VLn | | VLn+10 | | VLn | | VLn+10 | | | | VLn | | | VLn+10 | |

| | 1 | 16 | 17 | 32 | 33 | 48 | 49 | 64 | 65 | | 4048 | 4049 | | 4064 | 4065 | ### |
|---|---|---|---|---|---|---|---|---|---|---|---|---|---|---|---|---|
| 2*m+1 of OTU2e#nv | 1 | VLn+10 | | VLn | | VLn+10 | | VLn | | ... | | VLn+10 | | | VLn | |
| | 2 | VLn+10 | | VLn | | VLn+10 | | VLn | | | | VLn+10 | | | VLn | |
| | 3 | VLn+10 | | VLn | | VLn+10 | | VLn | | | | VLn+10 | | | VLn | |
| | 4 | VLn+10 | | VLn | | VLn+10 | | VLn | | | | VLn+10 | | | VLn | |

| MFAS 45678 | VCOH1 1 2 3 4 5 6 7 8 | VCOH2 1 2 3 4 5 6 7 8 | VCOH3 1 2 3 4 5 6 7 8 |
|---|---|---|---|
| 00000 (0) | MFI1 | 0 1 2 3 4 5 6 7 | CRC8 |
| 00001 (1) | MFI2 | 8 9 10 11 12 13 14 15 | CRC8 |
| 00010 (2) | Reserved | 16 17 18 19 20 21 22 23 | CRC8 |
| 00011 (3) | SQ | 24 25 26 27 28 29 30 31 | CRC8 |
| 00100 (4) | SQ | 32 33 34 35 36 37 38 39 | CRC8 |
| 00101 (5) | CTRL GID RSA RES | 40 41 42 43 44 45 46 47 | CRC8 |
| 00110 (6) | Reserved | | |
| 00111 (7) | SQ | | |
| 01000 (8) | SQ | Member Status (0-255) | CRC8 |
| 01001 (9) | SQ | | |
| 01010 (10) | SQ | | |
| 01011 (11) | SQ | | |
| ...... 31 | Reserved | 248 249 250 251 252 253 254 255 | CRC8 |
| 11111 | | | |

FIG.16C

MULTI-LANE SIGNAL TRANSMITTING AND RECEIVING APPARATUSES

CROSS-REFERENCE TO RELATED APPLICATIONS

This application claims the benefit under 35 U.S.C. §119(a) of Korean Patent Application Nos. 10-2008-0130629, filed on Dec. 19, 2008, and 10-2009-0055036, filed on Jun. 19, 2009, the disclosures of which are incorporated herein in its entirety by reference.

BACKGROUND

1. Field

The following description relates to optical communication systems, and more particularly, to multi-lane signal transmitting and receiving apparatuses.

2. Description of the Related Art

ITU-T G.709 defines a virtual concatenation standard (VCAT) for an optical transport network (OTN) in an inverse multiplexing scheme capable of transmitting a high-capacity OTN signal in the form of several low-capacity OTN signals. For example, the VCAT standard for the OTN uses a scheme of dividing one 40 Gbps data signal into four 10 Gbps data signals and transmitting the 10 Gbps data signals, in which the four signals are transmitted with different delays because a physical line for each 10 Gbps data signal has a different length. The delay difference among the signals is called a skew. FAS and multi-frame alignment sequence (MFAS) signals are used in each 10 Gbps data signal to overcome a skew among the four signals. A receiving stage compares MFASs of four data signals aligned through the FAS byte and calculates delay amounts of the signals. The calculated delay amounts are used to compensate for the skew of the four signals.

FIG. 1 illustrates an apparatus for transmitting a 100 Gbps Ethernet signal (100 GbE) conforming to a VCAT standard for an OTN in the form of eleven 10 Gbps optical channel transport unit (OTU) 2 signals. An actual data rate of 100 GbE is 103.125 Gb/s±100 ppm, and data capacity of optical channel payload unit (OPU)2 in which an actual client signal of OTU2 is contained is 9.995276962 Gb/s (=238/237×9.95328 Gb/s). Since data capacity is 99.952769 Gb/s (=10×9.995276962 Gb/s) when ten OPU2 signals are simply inverse multiplexed, it is insufficient to contain the 100 GbE signal bit-transparently. Accordingly, the 100 GbE signal can be bit-transparently sent through eleven OTU2 signals, as in FIG. 1.

However, in case of OTU2-11v in which eleven OTU2 signals are inverse multiplexed, total data capacity is 109.948046582 (=11×238/237×9.95328 Gb/s). Accordingly, only about 93.794% of the total data capacity is used to contain 100 GbE and 6.823 Gb/s is not used. This structure is inefficient.

Another example in which a 160 Gbps signal is transmitted will now be described. Methods using a conventional standard frame to transmit a 160 G signal include OTU1-64v, OTU2-16v and OTU3-4v methods. Among them, OTU3-4v is capable of designing low-power chips with the lowest capacity. However, since OTU3-4v employs four virtual containers, transmission only through four lines or wavelengths can be achieved. That is, since sixteen 10 G optic modules are initially cheaper than four expensive 40 G optic modules, OTU2-16v is preferred over OTU3-4v. However, when the four 40 G optic modules become cheaper in the future, OTU3-4v will be used. That is, demapping and mapping must be unnecessarily performed in order to convert a signal using OTU2-16v or OTU3-4v according to optic modules in use.

Also, when an OTU3-4v line card using four 40 G optic modules, which will be cheap in the future, is implemented, the following must be considered. For electric interface between a 40 G optic module and a framer, it is very difficult and costly to connect them at a serial 40 Gbps rate. Since a high-speed 40 Gbps signal suffers from relatively severer attenuation, a transmission distance becomes shorter. Accordingly, interfacing through parallel data at a relatively lower rate is required. In case of interfacing through gigabit parallel data, a skew problem among parallel data arises. Thus, interfacing through parallel data requires a separate apparatus for compensating for a skew among the parallel data.

Another example in which a 40 Gbps signal is transmitted will now be described. In case of a 300 pin 40 G optical transponder standardized in the multi-source agreement (MSA), an interface to a framer has 16×2.5 Gbps. Also, a deskew channel of 2.5 Gb/s equal to a parallel data rate must be separately used to compensate for a skew between 2.5 G parallel data. Since this deskew channel has been defined to interface parallel data of 16 channels, it is not compatible with other interface standards. In addition, an optic module interface for a 40 G Ethernet signal, which is being standardized, has a 4×10 Gbps interface that has no separate deskew channel. Accordingly, when a transmission framer and a 40 G Ethernet optic module are interfaced, it is necessary to compensate for a skew between high-speed gigabit parallel data signals without a deskew channel. That is, a resultant structure is inefficient since different deskew structures are required for a 16×2.5 Gbps+skew channel compensation interface and a 4×10 Gbps interface in order to support each optic module.

SUMMARY

The following description relates to multi-lane signal transmitting and receiving apparatuses capable of transmitting and receiving a multi-lane signal using the same inverse multiplexing scheme even when optic modules having several transport lane numbers are selected according to a purpose of use.

Also, the following description relates to multi-lane signal transmitting and receiving apparatuses capable of very high speed data transmission of the same frame even when optic modules having several transport lane numbers are used, and of adjusting a speed according to a property of a line by replacing only optic modules.

According to an exemplary aspect, there is provided a multi-lane signal transmitting apparatus including: a transport hierarchy signal mapping unit mapping a data signal to transport hierarchy signals of a plurality of channels, and inserting virtual lane marker information for identifying a plurality of virtual lane signals belonging to each channel into an overhead area; byte distributors distributing the transport hierarchy signal frame of each channel to a plurality of virtual lanes; and an n:m bit multiplexer bit-multiplexing an transport hierarchy signal (OTUk-XvYd) having Y virtual lane signals per channel (X) output from each byte distributor according to a transport lane number of a signal transmission module located after the n:m bit multiplexer.

Other objects, features and advantages will be apparent from the following description, the drawings, and the claims.

BRIEF DESCRIPTION OF THE DRAWINGS

FIG. 4a illustrates a general OTU2e frame structure;

FIG. 4b illustrates a virtual concatenation overhead structure of OPUk-Xv in FIG. 4a;

FIG. 5a illustrates a modified frame structure according to an exemplary embodiment of the present invention;

FIG. 5b illustrates use of a VLM byte according to an exemplary embodiment of the present invention;

FIGS. 5c and 5d illustrate a modified frame structure according to an exemplary embodiment of the present invention;

FIG. 5e illustrates a virtual lane allocation structure of a frame when a 1-byte distributor is used according to an exemplary embodiment of the present invention;

FIG. 10a illustrates a modified frame structure when an 8 or 16-byte distributor is used according to an exemplary embodiment of the present invention;

FIG. 10b illustrates use of a VCM byte in FIG. 10a;

FIG. 10c illustrates an allocation structure of a frame to virtual lanes when an 8-byte distributor is used;

FIG. 10d illustrates a modified frame structure according to another exemplary embodiment of the present invention;

FIG. 10e illustrates an allocation structure of a frame to virtual lanes when a 16-byte distributor is used;

FIGS. 16a to 16c illustrate modified frame structures according to another exemplary embodiment of the present invention;

Elements, features, and structures are denoted by the same reference numerals throughout the drawings and the detailed description, and the size and proportions of some elements may be exaggerated in the drawings for clarity and convenience.

DETAILED DESCRIPTION

The detailed description is provided to assist the reader in gaining a comprehensive understanding of the methods, apparatuses and/or systems described herein. Various changes, modifications, and equivalents of the systems, apparatuses, and/or methods described herein will likely suggest themselves to those of ordinary skill in the art. Also, descriptions of well-known functions and constructions are omitted to increase clarity and conciseness.

First, an apparatus of the present invention will be described in detail in connection with OTU2e-10v to resolve the above-described inefficiency problem in containing a 100 GbE signal in OTU2-11v. In addition, an exemplary embodiment of 160 Gbps signal transport and an exemplary embodiment of 40 Gbps signal transport will be described.

Figure 2:
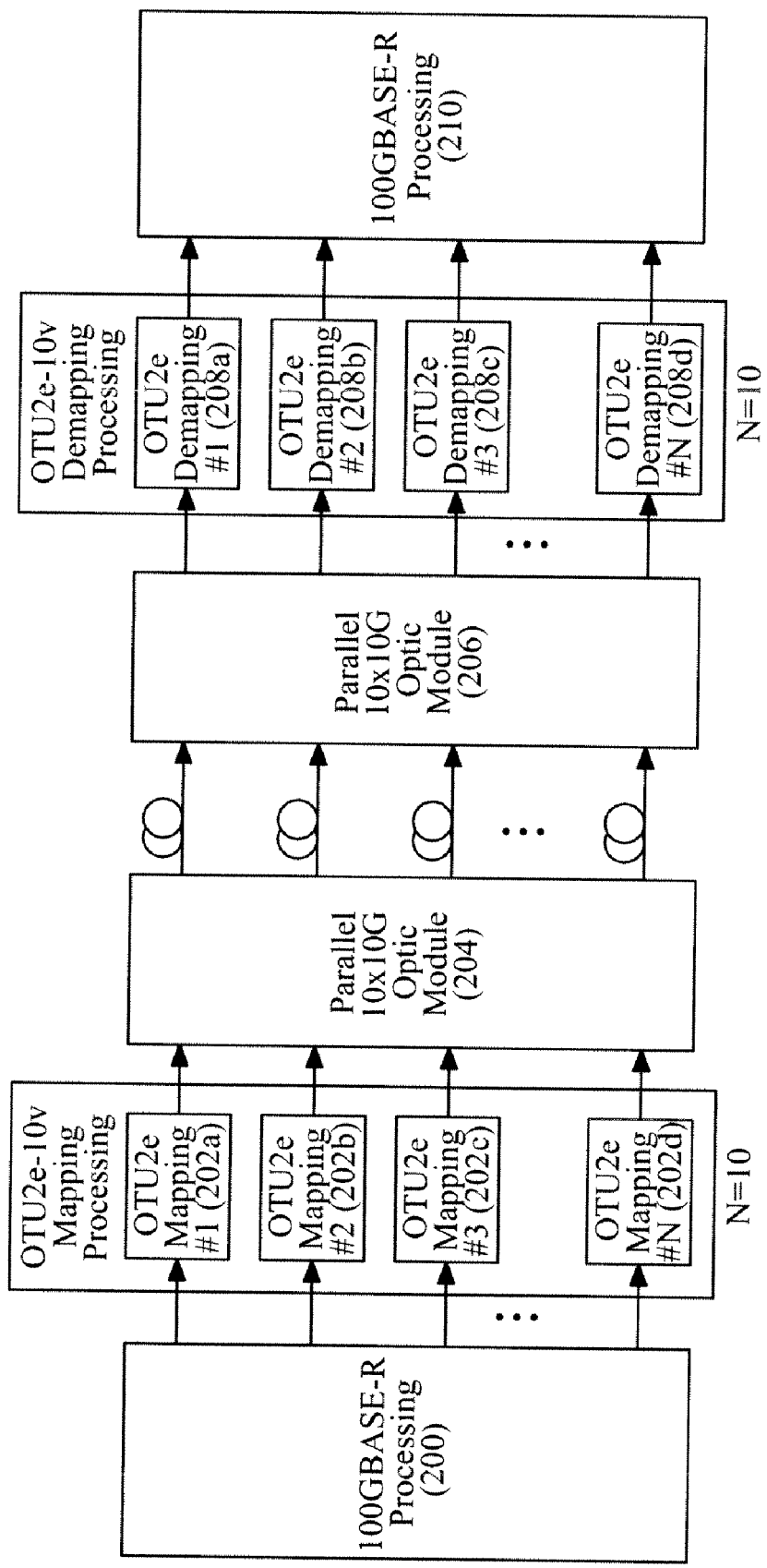
FIG. 2 is a block diagram of an apparatus transmitting a 100 GbE signal in the form of ten 10 Gbps OTU2e signals.

In order to resolve the inefficiency problem in containing a 100 GbE signal in OTU2-11v, an alternative using 10 OTU2e signals at a higher OTU2 rate, as shown in FIG. 2, may be considered. Data capacity of OTU2e is 10.356012658 Gb/s (=238/237×10.3125 Gb/s). Accordingly, OTU2e-10v in which ten OTU2e signals are inverse multiplexed may contain a 100 GbE signal having a 103.125 Gb/s rate, since total data capacity of OTU2e-10v is 103.560126582 (=10×238/237×10.3125 Gb/s). Mapping 100 GbE to OTU2e-10v uses data capacity of a total of about 99.579%, which corresponds to 0.435 Gb/s. OTU2e-10v is an efficient structure that can reduce unused data capacity to about $\frac{1}{15}$ or less, unlike OTU2-11v.

Among OTUk-Xv, each OTUk capable of containing a client signal is referred to as a virtual container. There are X virtual containers in OTUk-Xv. That is, application of OTUk-Xv requires that the number of virtual containers be equal to the number of transmission lines. In OTU2e-10v, 10 Gbps transport can be achieved only through ten lines or other wavelengths. For example, even though four 25 Gbps optic modules are more advantageous in terms of power consumption and cost than ten 10 Gbps optic modules, they are unavailable to this structure. To make the use of the four 25 Gbps optic modules possible, it is required that an inverse multiplexed OTU2e-10v signal be demapped to one 100 GbE signal, a new 25 Gbps signal defined and inverse multiplexed into four signals, and the 100 GbE signal mapped.

To resolve such a problem, a transmission method for allocating virtual lanes to each virtual container so that multi-lane transmission can be achieved while using the same inverse multiplexing scheme is proposed. That is, a multi-lane transmission signal dividing each virtual container into Y virtual lanes while an OTUk signal is inverse multiplexed into x virtual containers for transmission is defined as OTUk-XvYd. For example, a multi-lane transmission signal dividing each virtual container into two virtual lanes while an OTUk signal is inverse multiplexed into 10 virtual containers for transmission and reception is OTU2e-10v2d. In this case, since there are ten virtual containers each having two virtual lanes, the number of independent virtual signals is 20. The virtual signal means X×Y independently operable signals as Y virtual lanes are allocated to each of X virtual containers. Accordingly, when these virtual signals are bit multiplexed, the signals can be entirely restored by a receiver bit-demultiplexing, detecting 20 virtual signals and compensating for a skew even if transmission is performed through all transport lanes corresponding to a divisor of 20. This will now be described with reference the accompanying drawings.

Figure 3:
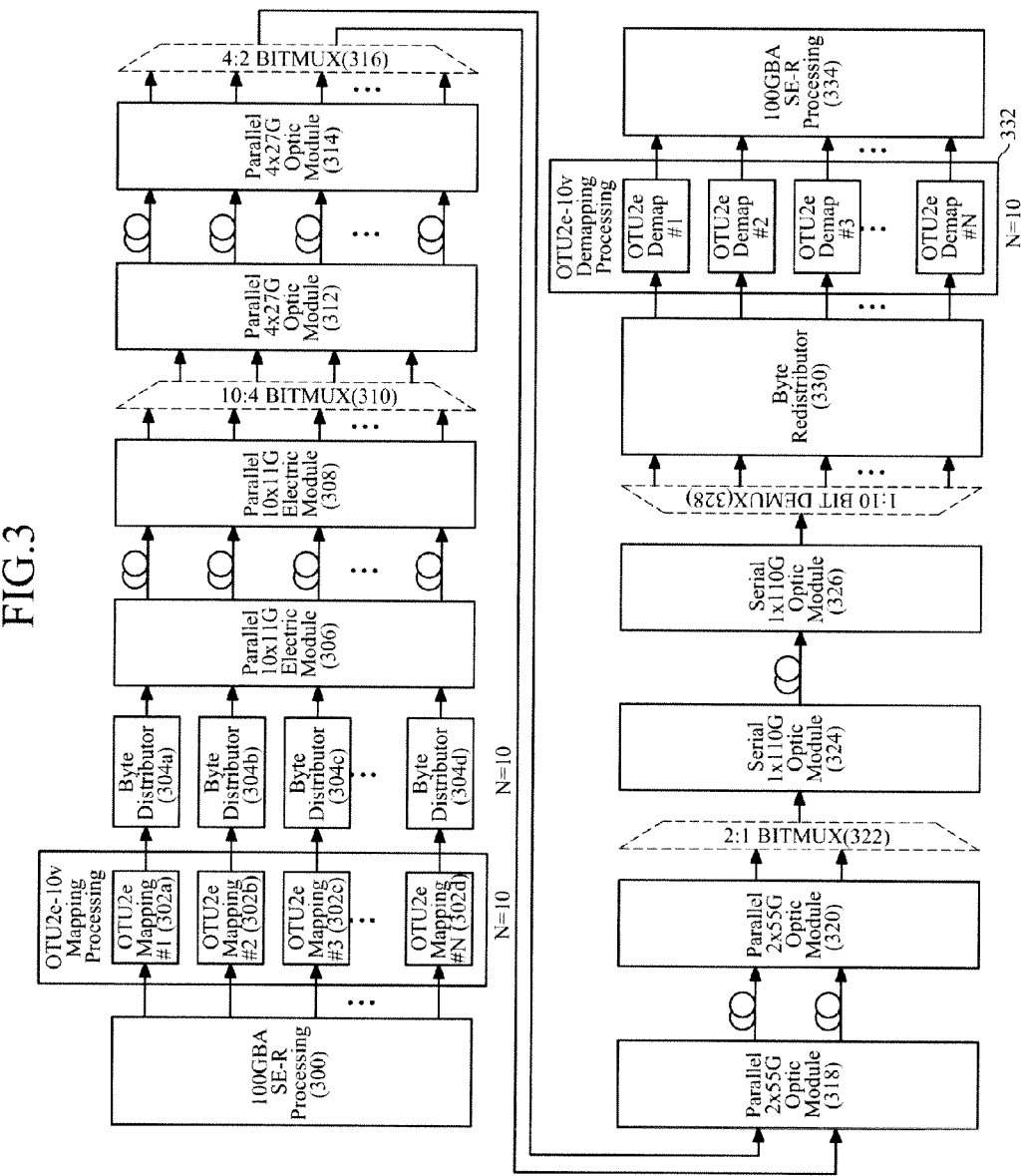
FIG. 3 is a block diagram of multi-lane signal transmitting and receiving apparatuses according to an exemplary embodiment of the present invention.

FIG. 3 is a block diagram of a multi-lane signal transmitting apparatus according to an exemplary embodiment of the present invention. More specifically, an apparatus for transmitting OTU2e-10v containing a 100 GbE signal through various transport lanes is shown.

Referring to FIG. 3, the signal transmitting apparatus includes 100 GBASE-R processors 300 and 334, OTU2e-10v mapping processors 302a, 302b, 302c and 302d, byte distributors 304a, 304b, 304c, and 304d, parallel 10×11 G electric modules 306 and 308, a 10:4 bit multiplexer 310, parallel 4×27 G optic modules 312 and 314, a 4:2 bit multiplexer 316, parallel 2×55 G optic modules 318 and 320, a 2:1 bit multiplexer 322, serial 1×110 G optic modules 324 and 326, a 1:10 bit demultiplexer 328, a byte redistributor 330, and OTU2e-10v demapping processors 330a, 330b, 330c and 330d.

The 100 GBASE-R processor 300 performs physical coding sublayer (PCS) processing on a 100 Gb/s Ethernet signal to generate a 103.125 Gb/s signal (100 GBASE-R). Each of the OTU2e-10v mapping processors 302a, 302b, 302c, and 302d divides a 100 GBASE-R signal into ten uniform signals and maps the ten signals to ten OTU2e signals. Each of the byte distributors 304a, 304b, 304c, and 304d distributes bytes in two groups and adds information for identifying virtual lanes so that the ten OTU2e signals can be transmitted via various transport lanes. The generated signal becomes an OTU2e-10v2d signal. Each virtual container for OTU2e-10v2d (hereinafter, each $n^{th}$ virtual container is referred to as OTU2e-#nv2d) has a rate of about 11 Gbps (=255/237×10.3125 Gbit/s). When, instead of OTU2e, OTU1e or another frame is used, the bit rate may be adjusted according to the OTU1e or frame.

Between the parallel 10×11 G electric modules 306 and 308, the generated OTU2e-10v2d signal is delivered through a printed circuit board (PCB) or an electrical cable. If parallel 10×11 G optic modules are used, the generated OTU2e-10v2d signal may be converted into light and delivered via an optical cable. The 10:4 bit multiplexer 310 performs 10:4 bit multiplexing on the OTU2e-10v2d signal received from the parallel 10×11 G electric module 308 to transmit the OTU2e-10v2d signal to the parallel 4×27 G optic module 312. The 10:4 bit multiplexing may use necessary overhead information. Between the parallel 4×27 G optic modules 312 and 314, a signal obtained by 10:4 bit multiplexing the OTU2e-10v2d signal is delivered to four optical cables or one optical cable through four wavelengths or through a differential quadrature phase-shift keying and polarization modulation (DQPSK+PM) scheme.

The 4:2 bit multiplexer 316 performs 4:2 bit multiplexing on the OTU2e-10v2d signal received from the parallel 4×27 G optic module 314 to transmit the OTU2e-10v2d signal to the parallel 2×55 G optic module 318. The 4:2 bit multiplexing may use necessary overhead information of the OTU2e-10v2d signal. Between the parallel 2×55 G optic modules 318 and 320, a signal obtained by 10:2 bit multiplexing the OTU2e-10v2d signal is delivered to two optical cables or one optical cable through two wavelengths or a DQPSK modulation scheme.

The 2:1 bit multiplexer 322 performs 2:1 bit multiplexing on the OTU2e-10v2d signal received from the parallel 2×55 G optic module 320 to transmit the OTU2e-10v2d signal to the serial 1×110 G optic module 324. The 2:1 bit multiplexing may use necessary overhead information of the OTU2e-10v2d signal. Between the serial 1×110 G optic modules 324 and 326, a signal obtained by 10:1 bit multiplexing the OTU2e-10v2d signal is delivered to one optical cable through one wavelength. The 1:10 bit demultiplexer 328 performs 1:10 bit demultiplexing on the signal obtained by 10:1 bit multiplexing the OTU2e-10v2d signal from the serial 1×110 G optic module 326 and interfaces to the byte redistributor 330 via ten lanes.

The byte redistributor 330 detects virtual lanes of each virtual container from the OTU2e-10v2d signal, compensates for a skew among the virtual lanes generated upon transmission, and redistributes bytes to generate the OTU2e-10v signal. The OTU2e-10v demapping processor 332 extracts a 100 GBASE-R signal from the OTU2e-10v signal received from the byte redistributor 330 and sends the 100 GBASE-R signal to the 100 GBASE-R processing block 334.

In FIG. 3, an exemplary embodiment for 100 Gbps signal transmission is shown. The parallel 10×11 G electric modules 306 and 308 may be replaced with parallel 10×11 G optic modules. The 10:4 bit multiplexer 310 may be located directly after the byte distributor 304 such that 100 G optical transport of 4 channels can be achieved through the 4×27 G optic module 312. Similarly, a 10:2 bit multiplexing block is located directly after the byte distributor 304 such that direct 100 Gb/s transport can be achieved through the 2×55 G optic module 318. The use of the 10:1 bit multiplexer directly after the byte distributor 304 enables direct 100 Gb/s transport via the 1×110 G optic module 324.

Thus, the OTU2e-10v signal can be sent through optic modules having various transport lanes by selecting a byte distributor and a byte redistributor to be used and modifying some overheads in an OTUk-Xv frame to generate an OTUk-XvYd signal. The byte redistributor and the overhead (OH) processing block for OTUk-Xv are modified according to whether the byte distributor distributes bytes in units of 1 byte, 8 bytes or a multiple of 8 bytes.

The byte distributor distributing bytes of each frame will be defined and then an OTUk-Xv mapping block sending virtual lane information according to the selected byte distributor and the byte redistributor receiving these virtual signals will be described in detail.

FIG. 4a illustrates an OTU2e frame structure according to an exemplary embodiment of the present invention.

As shown in FIG. 4a, an OTU2e frame consists of bytes of 4 rows and 4080 columns, in which row 1 columns 1 to 14 are used for an OTU2e overhead, rows 2 to 3 columns 1 to 14 for an ODU2e overhead, and columns 15 to 16 for an OPU2e overhead. Columns 17 to 3824 define a payload area. In the OTU2e frame structure, bytes of columns 1905 to 1920 are allocated for fixed stuff bytes. However, a number and a location of the fixed stuff bytes may be adjusted for more efficient transmission.

Figure 4B:
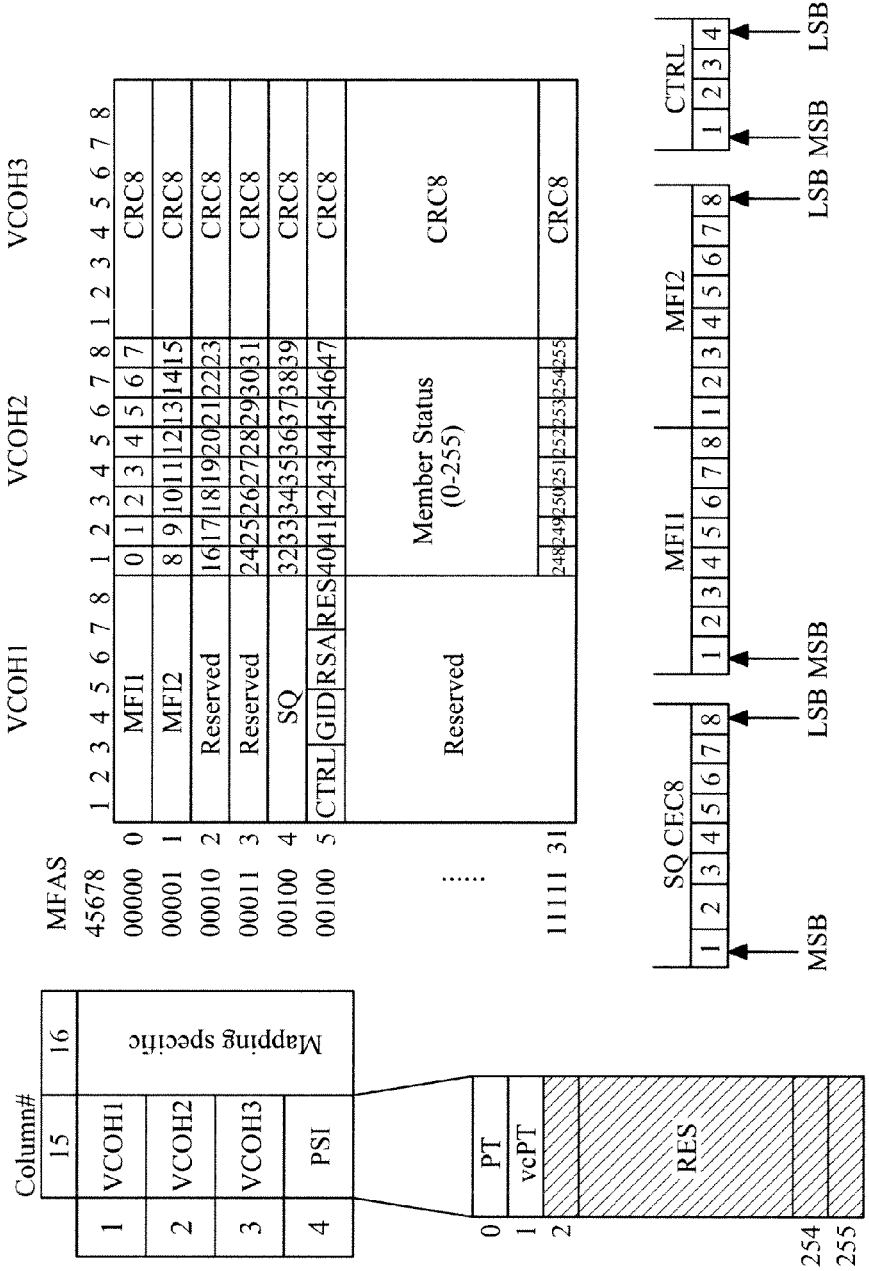

FIG. 4b illustrates a virtual concatenation overhead structure (VCOH) of conventional OPUk-Xv in FIG. 4a In the OPUk overhead in columns 15 to 16, 3 bytes in rows 1 to 3 column 15 are used for the virtual concatenation overhead (VCOH). The VCOH overhead has a multi-frame structure using 5 bits of a MFAS byte, such that a VCOH overhead value is updated in 32 periods. In the VCOH, a virtual concatenation multi-frame indicator (MFI) byte has a multi-frame identifier for a virtual container, in addition to the MFAS byte, and accordingly may consist of a maximum of 16 bits, like the MFI1 and MFI2 bytes, such that the MFI byte can identify a length of a maximum of 16,777,216 (=224) ODUk frames including the MFAS. The sequence indicator (SQ) byte represents an X value in OPUk-Xv, indicating a sequence or an arrangement number for the virtual container. Thus, the SQ byte may be used to identify each virtual container. The SQ byte may indicate a maximum of 28 virtual containers.

FIG. 5a illustrates a modified frame structure when a 1-byte distributor is used according to an exemplary embodiment of the present invention. In an OTU2e frame structure, 2 reserved bytes in row 1 columns 13 and 14 in an OTU2e overhead are used for virtual lane marker (VLM) bytes to identify two virtual lanes. The first reserved byte indicates virtual lane #n corresponding to virtual container #n (number), and the second reserved byte indicates virtual lane #n+10. For example, when a third virtual container of OTU2e-10v is OTU2e-#3v, a VLM at row 1 column 13 is allocated for virtual lane #3 and indicated by VLM3, and a VLM at row 1 column 14 is allocated for virtual lane #13 and indicated by VLM13.

As shown in FIG. 5b, a 4-bit virtual container number (VCN) of 8 VLM bytes of the OTU2e overhead indicates corresponding virtual container number #n. If information on virtual container #n is recognized from a received virtual lane, it may be inferred that a virtual lane signal corresponds to virtual lane #n or virtual lane #n+10. In case of VLM1, VCN has "0000" and in case of VLM5, VCN has "1000". On the other hand, VLM11 has VCN "0000", like VLM1, and VLM15 has the same VCN bit as VLM5. In principle, a minimum of 5 bits are required to identify 20 virtual signals each divided into virtual lanes and virtual containers. This is because a number that can be represented by 5 bits is 32.

However, twenty virtual lanes and virtual containers can be identified only by 4 bits in view of the modified frame structure. This is because frame alignment bytes, which will be described later, differ for virtual lanes #1 to 10 and virtual lanes #11 to 20 and accordingly a group of virtual lanes #1 to 10 and a group of virtual lanes #11 to 20 can be identified by different frame alignment bytes. Other 4 bits of 8 VLM bytes in the OTU2e overhead are used for a virtual multi-frame sequence (VMFS) of each virtual lane. Each virtual lane has a frame unit and VMFS is information obtained by counting such a frame. Since there are only 4 bits, a maximum of sixteen virtual lane frames can be counted. When one frame is insufficient due to a great delay difference among the virtual lanes, a multi-frame sequence may be used to determine how many frames a skew corresponds to.

Figure 5C:
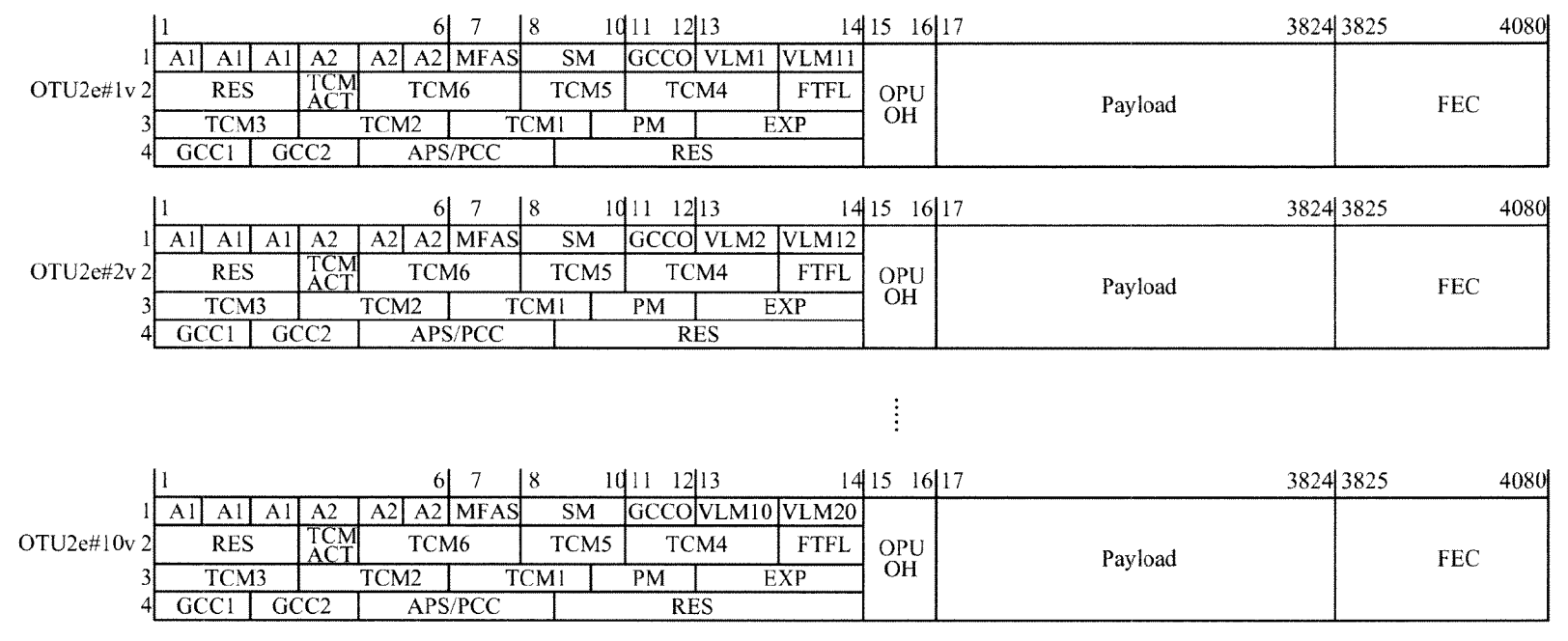

As described above, since each virtual container OTU2e-#nv in the OTU2e-10v frame structure utilizes an OTU2e structure as is, 16 fixed stuff (FS) bytes occupy row 4 in the middle of the payload area. On the other hand, an adopted OTU1e-10v frame structure is shown in FIG. 5c. Each virtual container of OTU2e-10v has a rate of about 11.095 Gbps (=255/237×10.3125 Gbit/s) while each virtual container of OTU1e-10v has a rate of about 11.049 Gbps (=255/238×10.3125 Gbit/s). A data rate required to contain a 100 GbE signal may be determined according to a type of the frame structure.

Figure 5D:
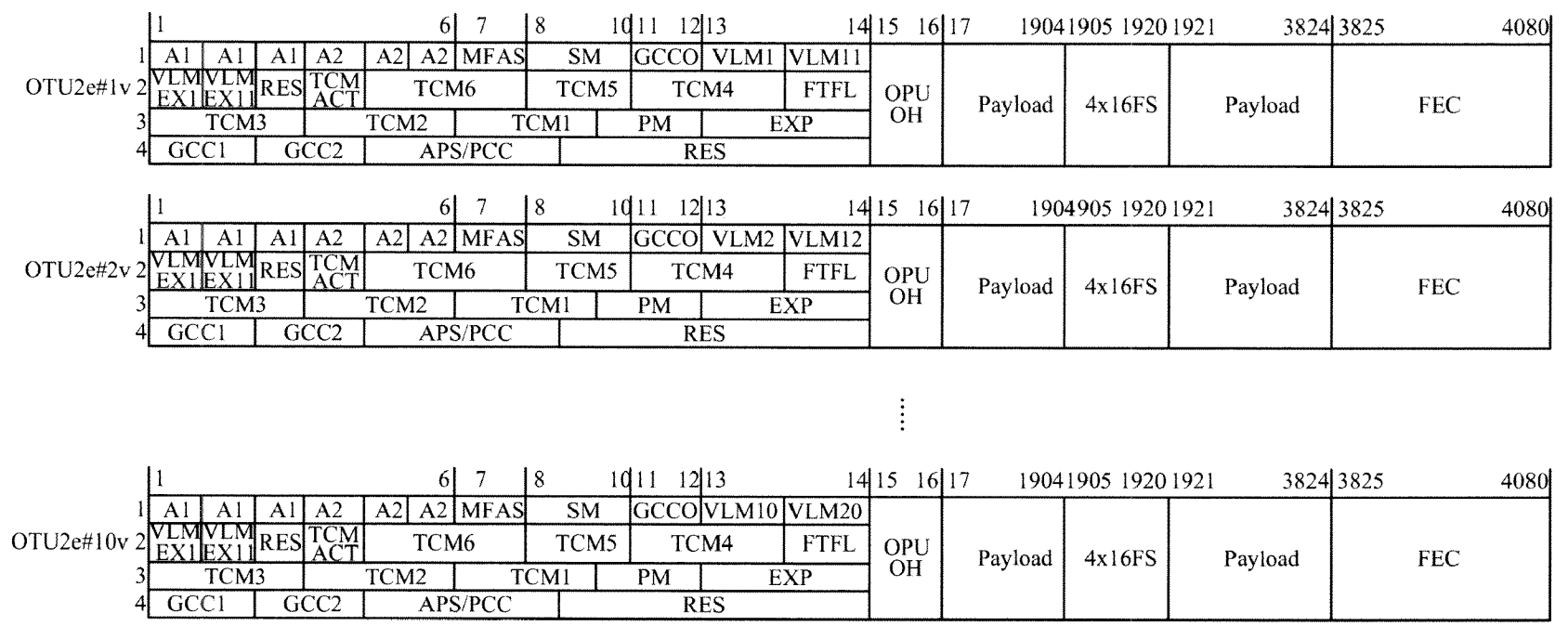

FIG. 5d illustrates a frame structure obtained by extending the virtual lane marker (VLM) overhead in the frame structure of FIG. 5a.

Referring to FIG. 5d, bytes in rows 1 to 2 among reserved bytes in row 2 columns 1 to 3 in an ODU2e overhead are used for a virtual lane marker extension byte. As described above, only 4 bits of 8 VLM bytes in the OTU2e overhead may be used for a multi-frame sequence of each virtual lane. In this case, a bit number capable of compensating for all skew bits is a maximum of 1,044,480 bits (=24×4×4080×8/2/2). Skew compensation of about 94 us (=24×4×4080×8/2/255/237×10.3125 Gbit/s) can be achieved in view of a bit rate of each OTU2e-#nv. To increase such a skew compensation value, a virtual lane marker extension byte (VLM EX#n) is added, as shown in FIG. 5d. Thus, since frames of each virtual lane can be identified with a total of 12 bits by extending a virtual multi-frame sequence from 4 bits to 8 bits, skew compensation of a maximum of 267,386,880 bits (=212×4×4080×8/2) can be achieved. Skew compensation of about 24,098 us can be achieved in view of a bit rate of OTU2e-#nv.

Since one virtual container has two virtual lanes and a 1-byte distributor is used, the OTU2e-#nv frame is distributed to each virtual lane by 1 byte, as shown in FIG. 5e. In FIG. 5d, VLM1, VLM2, ... are bytes transmitted to the virtual lane #n, and VLM11, VLM12, ... are bytes transmitted to virtual lane #n+10. VLM#n information at row 1 column 13 is distributed to virtual lane #n and transmitted, and VLM#n+10 information at row 1 column 14 is transmitted to virtual lane #n+10 (n=1, ..., 10).

Figure 6A:
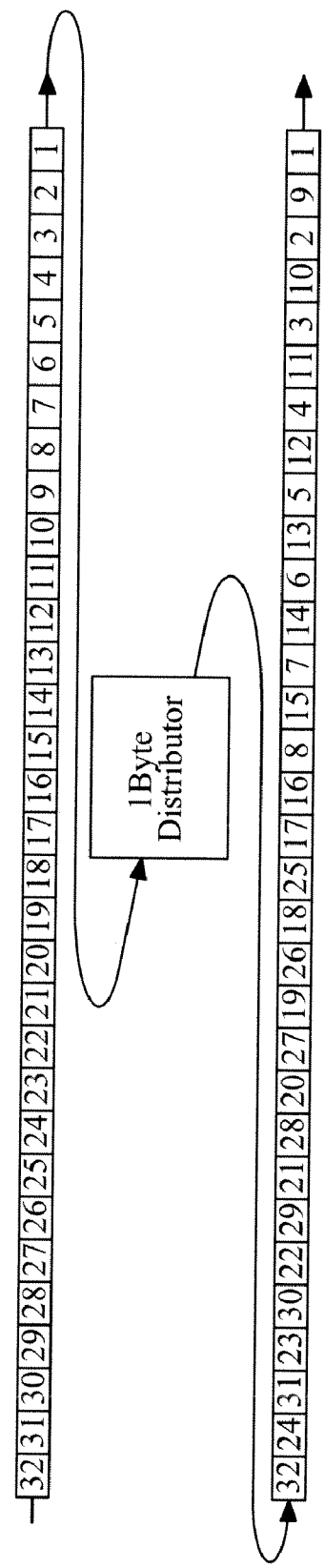
FIG. 6a illustrates a transmission bit string passing through a 1-byte distributor according to an exemplary embodiment of the present invention.

A bit string passing through the 1-byte distributor is shown in FIG. 6a. A bit string output when an input and output bit of the 1-byte distributor is 1 bit is shown in FIG. 6a, in which 1, 2, 3, ..., 24 are bits transmitted to virtual lane #n, and 9, 10, 11, ..., 32 are bits transmitted to virtual lane #n+10. The virtual lanes are repeatedly output in units of bits.

Figure 6B:
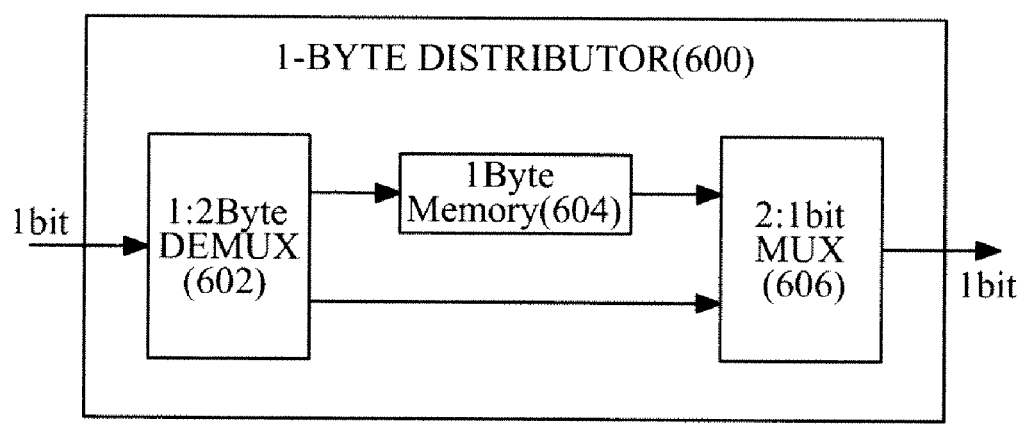
FIG. 6b is a block diagram of a 1-byte distributor according to an exemplary embodiment of the present invention.

A simplified structure of a 1-byte distributor 600 producing two such virtual lanes is shown in FIG. 6b. It is assumed that an input and output bit of the 1-byte distributor 600 is 1 bit, in which a 1:2 byte demultiplexer 602 demultiplexes input bits in units of bytes, 1 byte of an upper lane is stored in a 1-byte memory 604 and aligned with a lower lane, and a 2:1 bit multiplexer 606 generates an OTU2e-#nvd multi-lane signal.

Figure 6C:
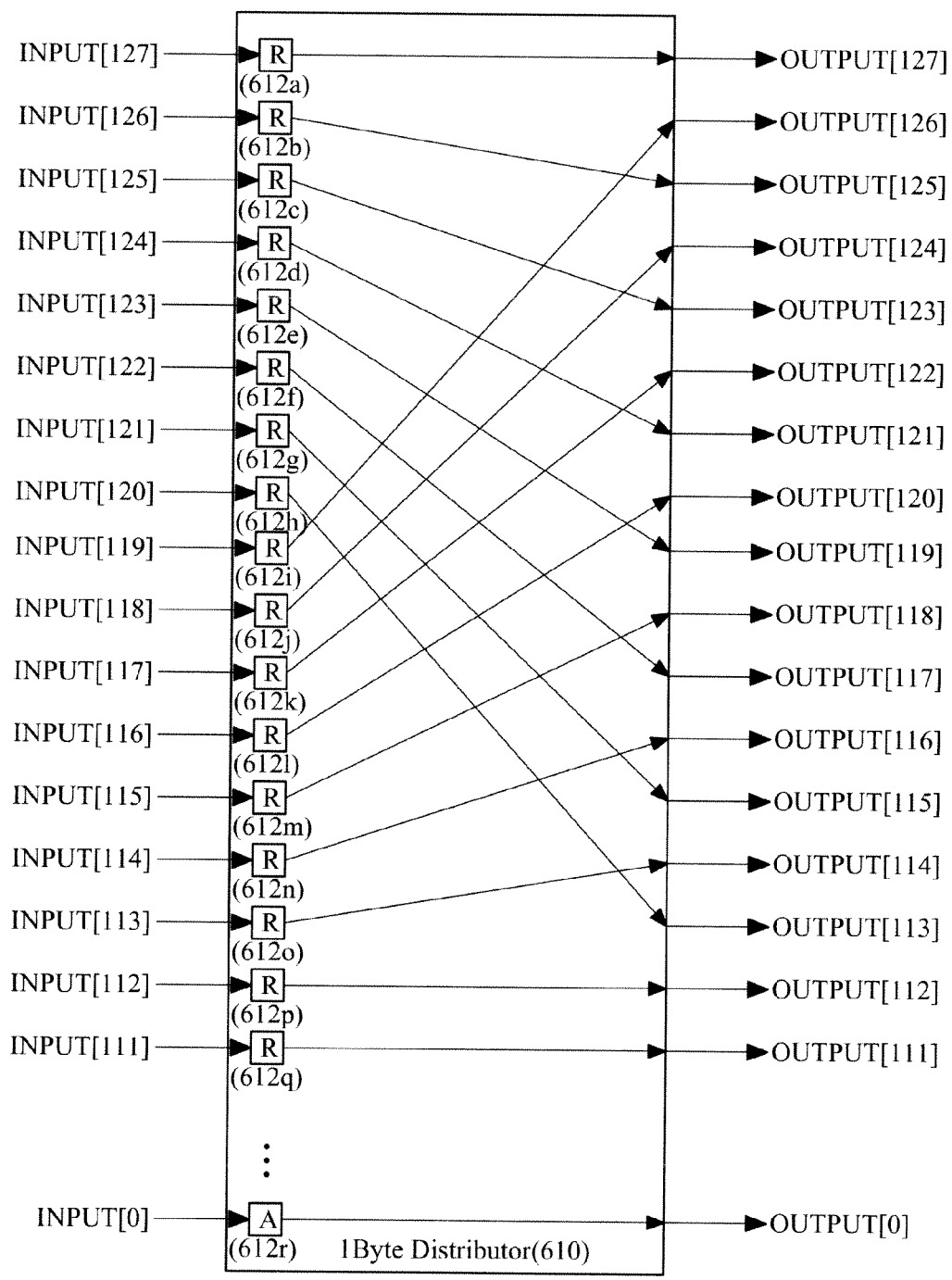
FIG. 6c is a block diagram of a 1-byte distributor according to another exemplary embodiment of the present invention.

A structure of the 1-byte distributor 610 when it is assumed that the input and output bit of the 1-byte distributor is 128 bits is shown in FIG. 6c. Since an input consists of a total of 16 bytes, the signal may be arranged by 2 bytes. In FIG. 6c, R (612a, . . . , 612r) denotes a register that stores the input signal during one clock and then outputs the input signal. The register is intended to increase a processing speed of the 1-byte distributor, but may not be used at a low rate.

Figure 7A:
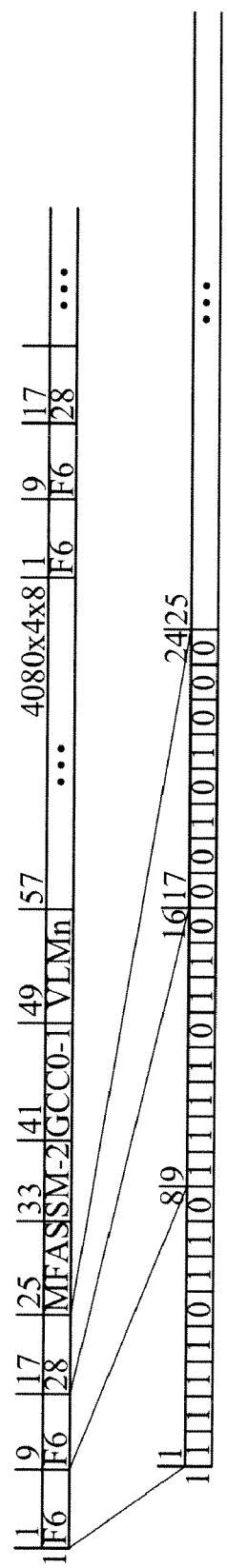
FIG. 7a illustrates a frame structure of virtual lane #n (n=1 to 10) according to an exemplary embodiment of the present invention.
Figure 7B:
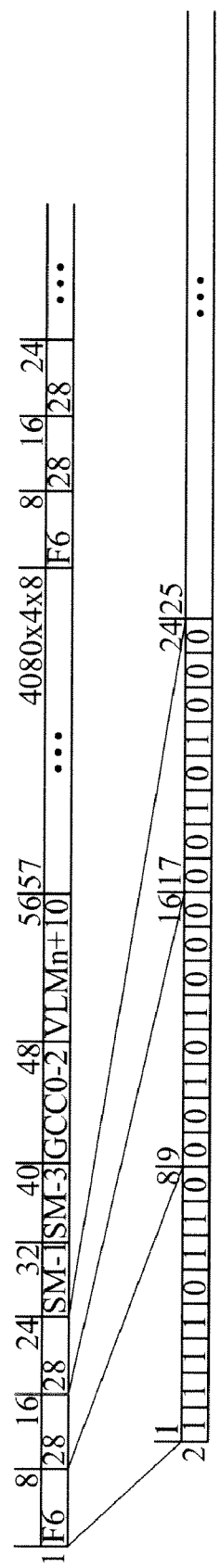
FIG. 7b illustrates a frame structure of virtual lane #n+10 (n=1 to 10) according to an exemplary embodiment of the present invention.

Structures of a frame of each virtual lane divided and transmitted and an entire frame are shown in FIGS. 7a and 7b. FIG. 7a shows a frame structure of virtual lane #n (n=1 to 10), in which an upper row is indicated by bytes and a lower row is indicated by bits. FIG. 7b illustrates a frame structure of virtual lane #n+10 (n=1 to 10) in units of bytes and bits. F6, F6, and 28 bytes are used for frame alignment of each virtual lane #n (n=1 to 10), and F6, 28, and 28 bytes are used for frame alignment of virtual lane #n+10 (n=1 to 10). After the virtual lane frames are aligned, #n of each virtual lane is obtained using the VLM byte defined in FIG. 5 and simultaneously, a frame skew value among the virtual lanes is measured, and the skew is compensated. After the skew is compensated, the virtual lane #n and #n+10 frames become the OTU2e-10v frames through a reverse process of the 1-byte distributor according to #n of the virtual lane.

Figure 8:
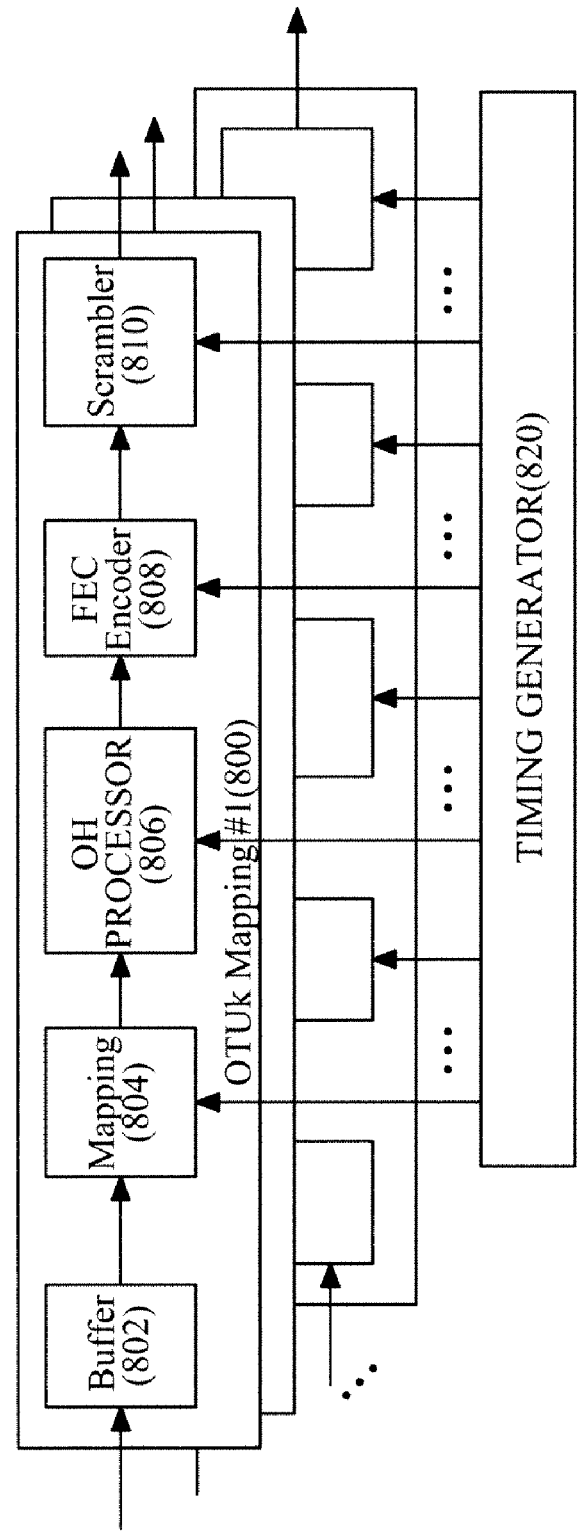
FIG. 8 is a block diagram of an OTUk-Xv mapping unit according to an exemplary embodiment of the present invention.

To amend an existing frame as shown in FIG. 5, the OTUk-Xv mapping units 800a, . . . , 800c have some functions of the overhead (OH) processor 806, as shown in FIG. 8. The OTUk-Xv mapping units 800a, . . . , 800c have a buffer 802 storing a client signal and mapping the signal at desired timing, and the mapping unit 804 performs a function of mapping the client signal to the payload area of the OTUk frame. The overhead processor 806 adds the overhead to the resultant OTUk frame. Then, the FEC coder 808 calculates a FEC parity byte using information bytes in rows 1 to 3824 of the OTUk frame and inserts the FEC parity byte into FEC bytes in rows 3825 to 4080. A scrambler 810 scrambles all bytes except for row 1 columns 1 to 6 in the is OTUk signal. A timing generator 820 generates all desired timing information from a frame start point to a frame end point to generate such an OTUk signal.

Figure 9:
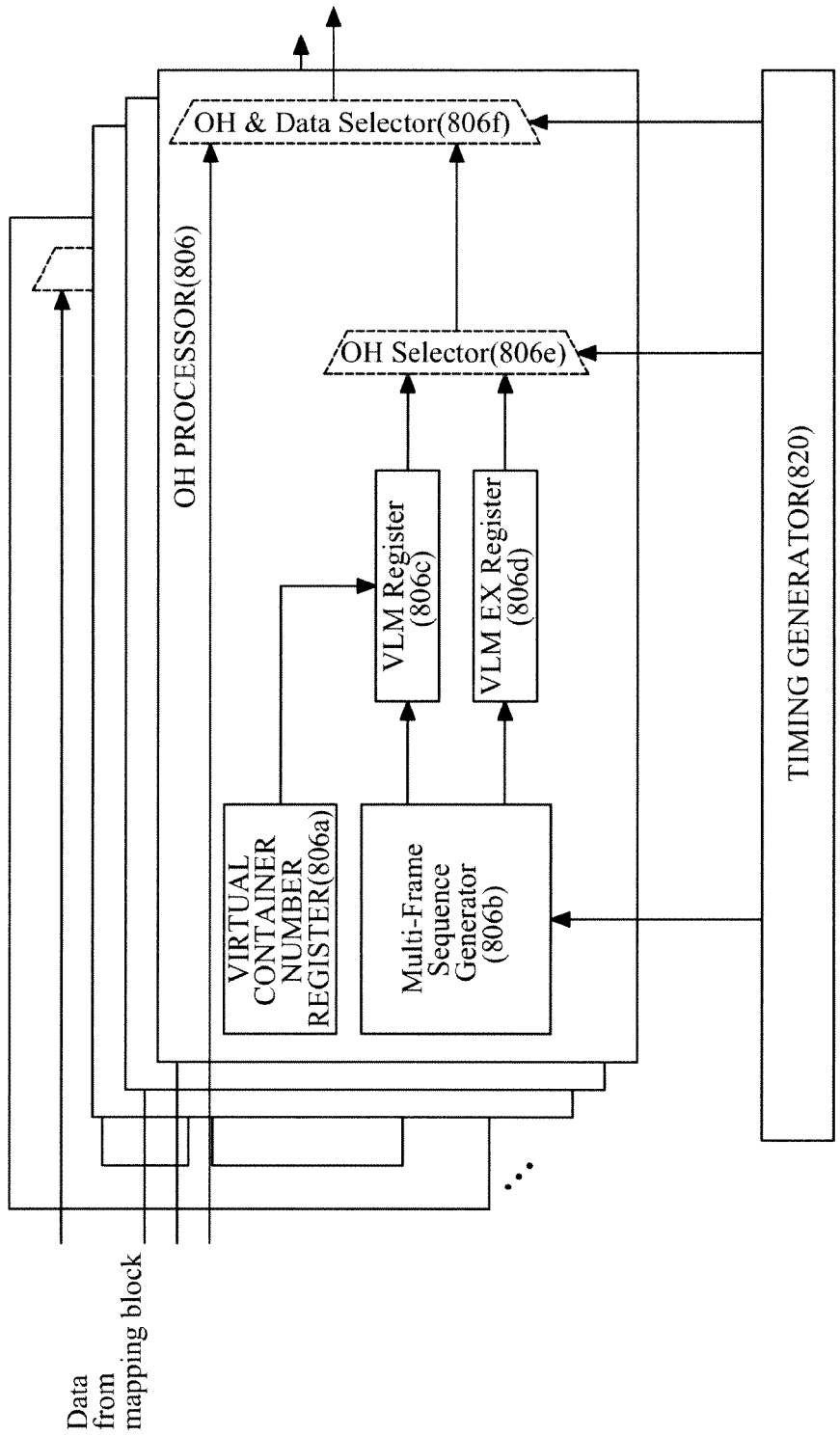
FIG. 9 is a block diagram of an overhead processor according to an exemplary embodiment of the present invention.

FIG. 9 illustrates an overhead processor further included for a multi-lane transmission frame when it is assumed that the overhead processor 806 in FIG. 8 has processed all existing overheads. A virtual container number register 806a enables a user to set a number of a virtual container to be used in each overhead processor 806. A multi-frame sequence generator 806b receives frame start information of the virtual container from a timing generator 820, and continues to count the frame of the virtual container to 12 bits. The multi-frame sequence generator 806b sends the lower 4 bits in 12-bit multi-frame number information to a VLM register 806c, and the other 8 bits to a VLM EX register 806d. The VLM register 806c combines the 4-bit VCN information from the virtual container number register 806a and the 4-bit VMFS information from the multi-frame sequence generator 806b and stores VLM byte information. The overhead selector 806e receives the VLM and VLM EX byte location information defined in FIG. 5 in the overhead timing information from the timing generator 820 and selects information from the VLM register 806c and the VLM EX register 806d. The overhead and data selector 806f receives the overhead timing information and the payload timing information from the timing generator 820, and selects the data and the overhead to deliver the data to the payload area and the overhead information selected by the overhead selector 806e to the overhead area. The timing generator 820 generates timing information for the overhead signal of OTUk and timing information for the payload signal and provides the information to the corresponding blocks. In FIG. 5, the 1-byte distributor was used, and the 2 reserved bytes in the OTU2e overhead were used for the VLM bytes to identify the virtual containers and the virtual lanes.

Figure 10A:
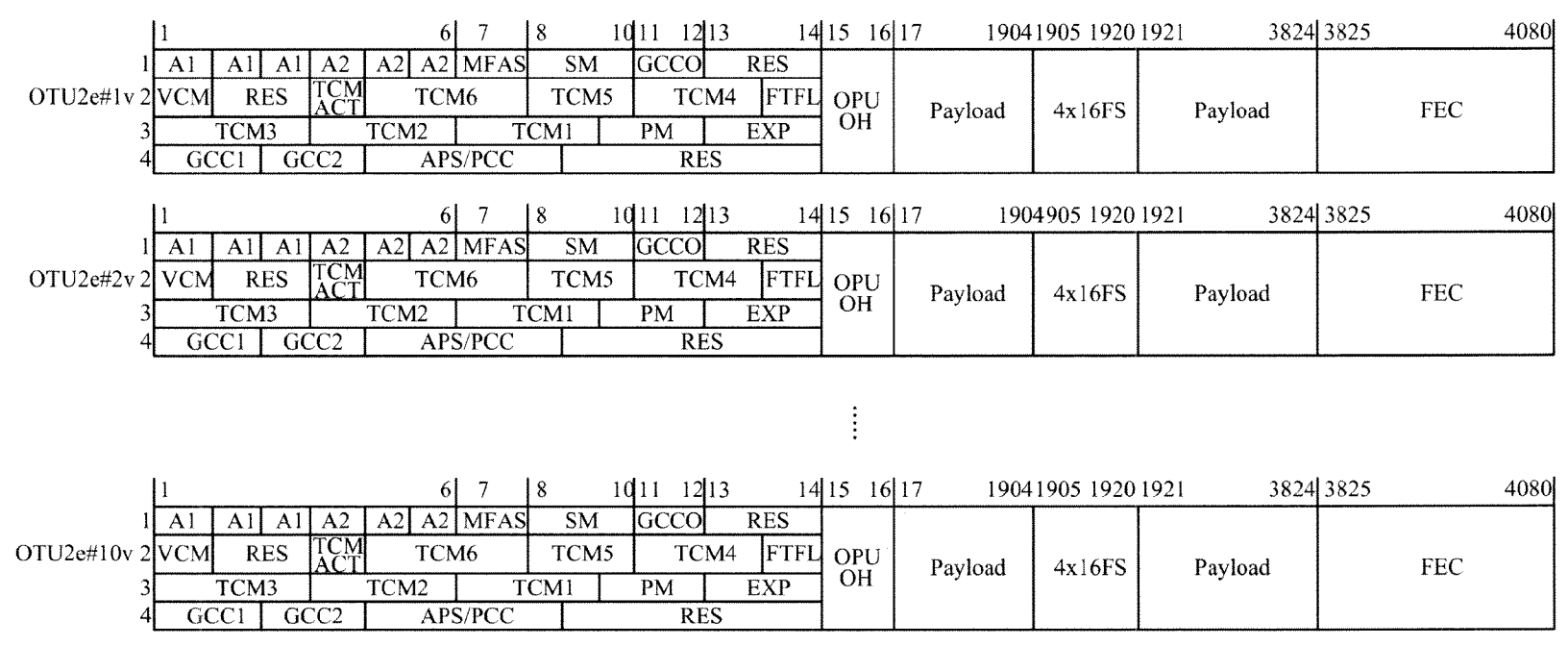

FIG. 10a illustrates a modified frame structure when only reserved byte information of the OTU2e overhead is used and an 8- or 16-byte distributor is used.

Figure 1:
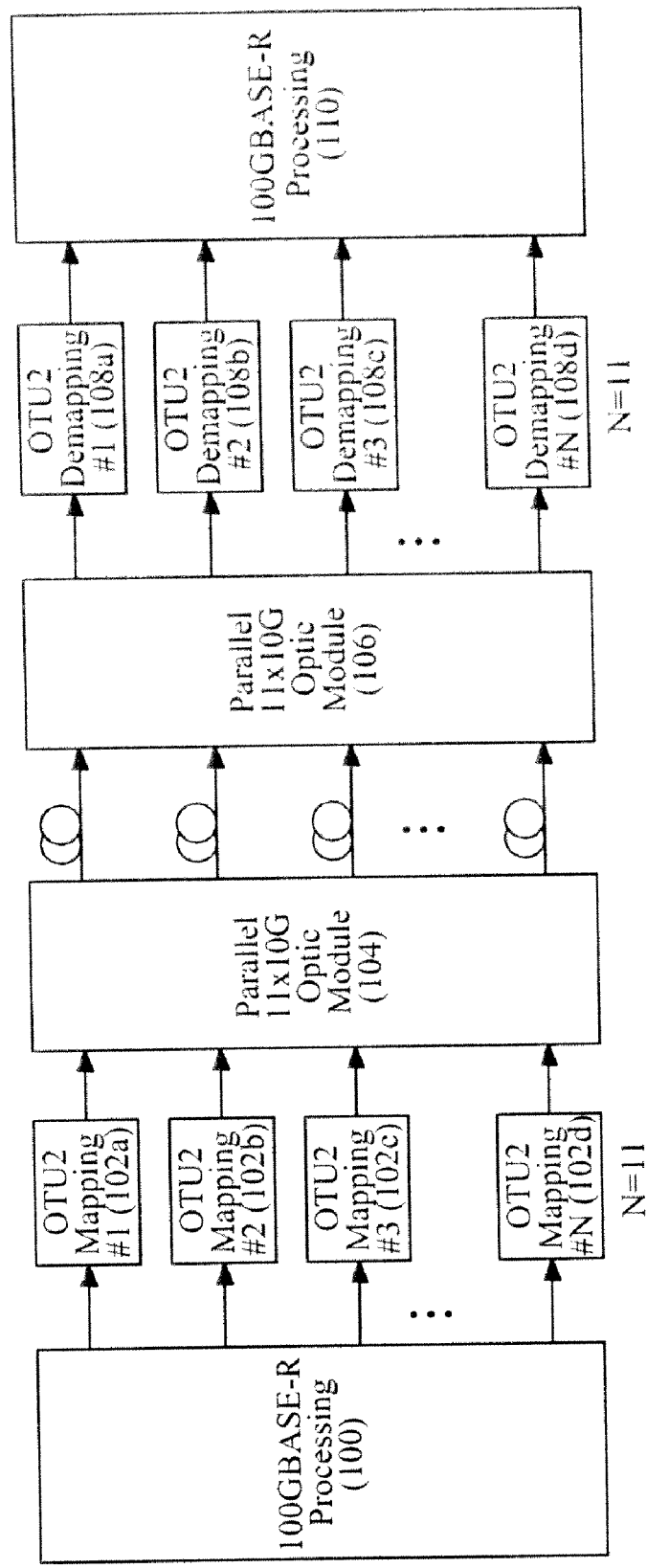
FIG. 1 is a block diagram of an apparatus transmitting a 100 Gbps Ethernet signal (100 GbE) conforming to a virtual concatenation (VCAT) standard for an optical transport network (OTN) in the form of eleven 10 Gbps optical channel transport unit (OTU) 2 signals.
Figure 10B:
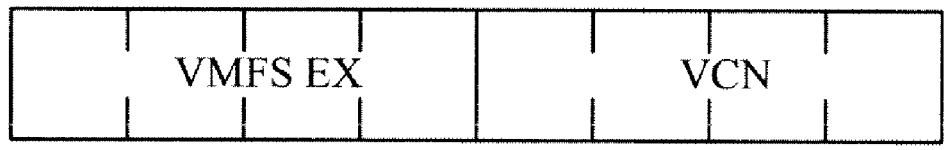

In the case where each virtual lane is transmitted in units of 8 or 16 bytes in transmitting each OTU2e-#nv frame, the least significant bit "0" of the MFAS indicates virtual lane #n and the least significant bit "1" indicates virtual lane #n+10 because a multi-frame alignment sequence (MFAS) located in column 7 in the OTU2e overhead is distributed in the virtual lanes in units of two frames. Accordingly, additional information for the virtual lane marker is unnecessary. Also, the 7 bits other than the least significant bit of 8 bits of the MFAS may be used for the multi-frame sequence of each virtual lane. Instead, a virtual container marker (VCM) overhead for identifying #n of each virtual container OTU2e-#nv is necessary. Since there are a total of ten virtual containers, only 4-bit VCM information is necessary. In FIG. 10a, 1 reserved byte in row 2 column 1 in the ODU2e overhead is used for the VCM byte. 1 reserved byte in row 1 column 13 in the OTU2e overhead may be used for VCM byte, but is suitable for a 16 or more byte distributor rather than an 8-byte distributor. The other 4 bits of the 8 bits of the VCM may also be used for 4 multi-frame sequence extension (VMFS EX) bits for each virtual lane, as in FIG. 10b. When the multi-frame sequence extension bits in the VCM are not used, a bit number capable of compensating for all skew bits is a maximum of 8,355,840 bit (=27×4×4080×8/2). Skew compensation of 753 us (=27×4×4080×8/2/255/237×10.3125 Gbit/s) can be achieved in view of a bit rate of OTU2e-#nv.

When the other 4 bits of the VCM byte are used for multi-frame sequence extension bits, frames can be identified with a total of 11 bits for each virtual lane. Accordingly, skew compensation of a maximum of 133,693,440 bits (=211×4× 4080×8/2/2) can be achieved. Skew compensation of about 12,049 us (=211×4×4080×8/2/255/237×10.3125 Gbit/s) can be achieved in view of a bit rate of OTU2e-#nv.

FIG. 10c illustrates an allocation structure of OTU2e-#nv bytes to virtual lanes when an 8-byte distributor is used. Since each virtual container has two virtual lanes and an 8-byte distributor is used, an OTU2e-#nv frame is distributed to each virtual lane by 8 bytes. In FIG. 10c, VLn is a byte transmitted to virtual lane #n, and VLn+10 is a byte transmitted to virtual lane #n+10. In a 2 $m^{th}$ OTU2e-#nv frame, VCM byte information at row 2 column 1 is distributed to virtual lane #n and transmitted, and in a 2 m+$1^{th}$ OTU2e-#nv frame, VCM byte information at row 2 column 1 is distributed to virtual lane #n+10 and transmitted (m=0, 1, 2, 3, . . . ). Since one frame is divided into two virtual lanes and each virtual lane uses VCM information once every two frames, each virtual lane may use the VCM information once during one period of OTU2e-#nv. Similarly, since the FAS byte and the MFAS byte in each virtual lane are transmitted in one period of OTU2e-#nv, frame alignment may be performed for each virtual lane. The MFAS byte is used to identify whether the virtual lane is #n or #n+10. When the least significant bit of the MFAS byte is 0, it indicates the 2 $m^{th}$ OTU2e-#nv frame, in which the MFAS byte is located in virtual lane #n. Similarly, when the least significant bit of the MFAS byte is 1, the MFAS byte corresponds to virtual lane #n+10 in the 2 m+$1^{th}$ OTU2e-#nv frame. Accordingly, in case of virtual lane #n, the least significant bit of 8 bits of the MFAS byte always begins with 0, and in case of virtual lane #n+1, the least significant bit of the MFAS byte begins with 1. Thus, two virtual lanes can be easily identified with the least significant bit of the MFAS. After the virtual lane is identified, the 4-bit VCN of the VCM byte is used to obtain #n. The identification can be performed by indicating #n information in the 4-bit VCN information to show a virtual container in ten OTU2e-10v frames to which the virtual lane belongs.

FIG. 10d illustrates a modified frame structure in which 1 byte of A2 in row 1 column 6 in the OTU2e overhead is used for a VCM byte. As described above, a minimum unit is 8 bytes, but all distributors with bytes corresponding to a multiple of 8 bytes and a divisor of 4×4080 are available. For example, 16, 32, 40, 51, 64, and 80-byte distributors are available. When the 16-byte distributor is used in the frame structure shown in FIGS. 10a and 10d, the OTU2e overhead consists of 16 bytes and the VCM byte as well as the FAS byte and the MFAS byte may be used as a group of 16 bytes. Accordingly, the frames of the virtual lanes can be easily parsed in view of structure.

FIG. 10e illustrates an allocation structure of OTU2e-#nv bytes to virtual lanes when a 16-byte distributor is used. The 16-byte distributor distributes an OTU2e-#nv frame in units of 16 bytes to each virtual lane. After OTU2e-#nv frame transmission is finished once, next frame transmission uses a reverse order of distributing the frame to each virtual lane in units of 16 bytes. VLn is a byte transmitted to virtual lane #n, and VLn+10 is a byte transmitted to virtual lane #n+10. In the 2 $m^{th}$ OTU2e-#nv frame, VCM byte information in row 1 column 6 is distributed to virtual lane #n and transmitted, and in the 2 $m+1^{th}$ OTU2e-#nv frame, VCM byte information at row 1 column 6 is distributed to virtual lane #n+10 and transmitted (m=0, 1, 2, 3, ...). In this case, since the FAS byte and the MFAS byte are transmitted in one period of OTU2e-#nv in each virtual lane, similarly to the case using the 8-byte distributor, the structure has the same frame alignment function and virtual lane skew compensation performance. A virtual lane other than the first transmitted virtual lane may first be transmitted in units of 16 bytes by switching the virtual lane.

Figure 11A:
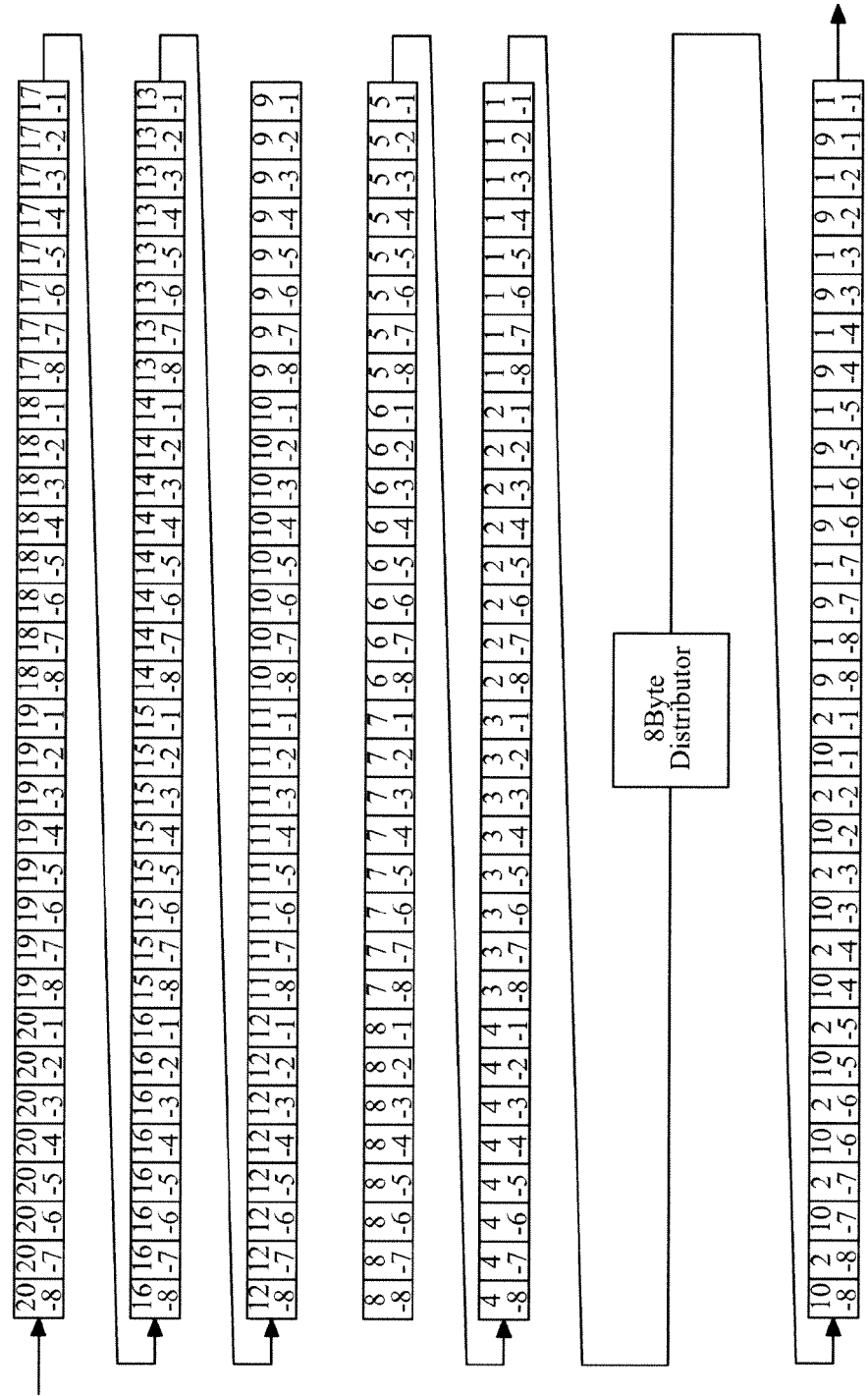
FIG. 11a illustrates a transmission bit string passing through an 8-byte distributor.

Meanwhile, a bit string passing through the 8-byte distributor is shown in FIG. 11a. A bit string output when an input and output bit of the 8-byte distributor is 1 bit is shown. 1-1 indicates the first bit of the first byte, and 9-8 indicates the eighth bit of the ninth byte. 1-1, 1-2, ..., 2-8 are bits transmitted to virtual lane #n, and 9-1, 9-2, ..., 10-8 are bits transmitted to virtual lane #n+10, in which virtual lanes are repeatedly output in units of bits. A simplified structure of the 8-byte distributor 200 for creating the two virtual lanes is shown in FIG. 11b.

Figure 11B:
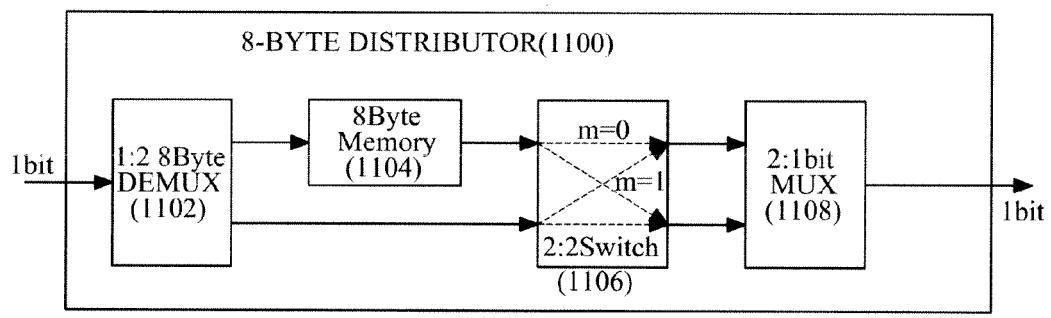
FIG. 11b is a block diagram of an 8-byte distributor according to an exemplary embodiment of the present invention.

In FIG. 11b, it is assumed that the input and output bit of the 8-byte distributor 1100 is 1 bit. In this case, a 1:2 8 byte demultiplexer 1102 demultiplexer an input bit in units of 8 bytes, and an upper lane is stored by 8 bytes in an 8-byte memory 1104 and is aligned with a lower lane. The aligned signal is switched by a 2:2 switch 1106 or two 2:1 multiplexer/selectors in one period of OTU2e-#nv (in units of 4×4080 bytes) and converted into an OTU2e-#nvd multi-lane signal by a 2:1 bit multiplexer 1108.

Figure 11C:
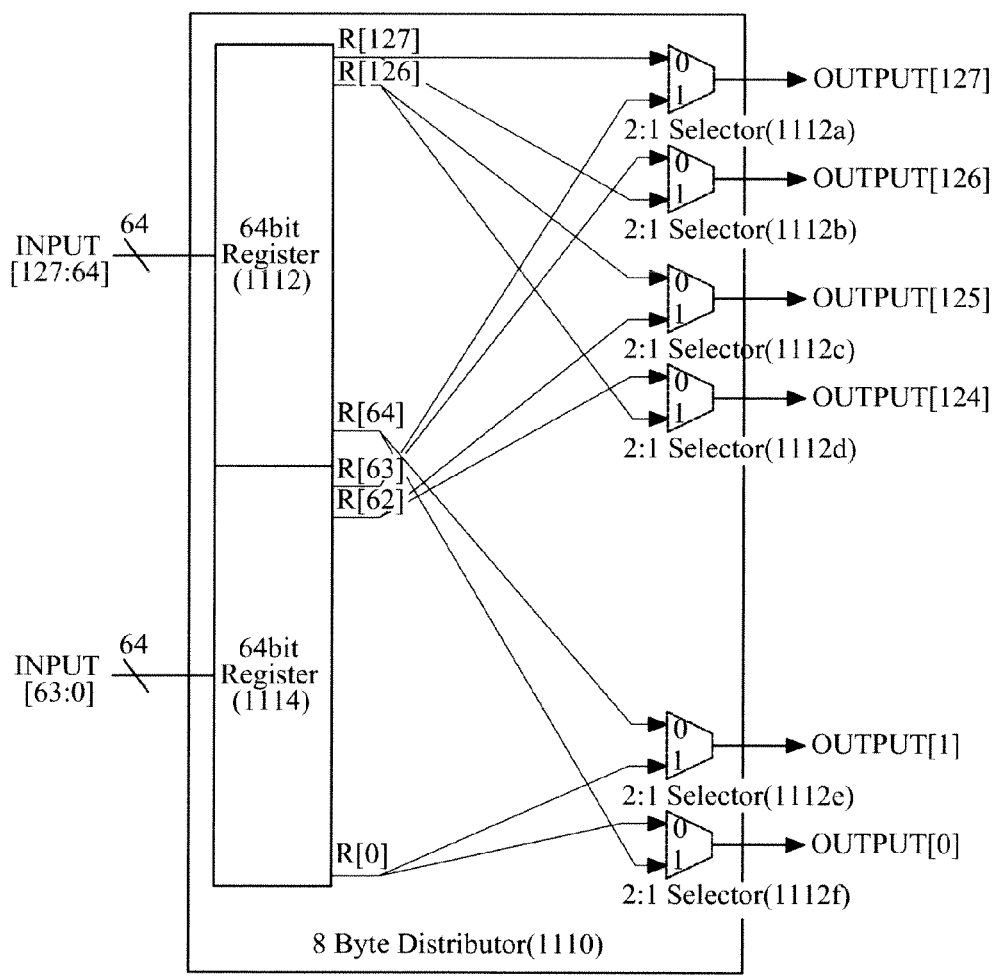
FIG. 11c is a block diagram of an 8-byte distributor according to another exemplary embodiment of the present invention.

A structure of an 8-byte distributor 1110 in which it is assumed that the input and output bit of the 8 byte distributor is 128 bits is shown in FIG. 11c. Since an input consists of a total of 16 bytes, 8 bytes are defined as one group and a bit signal of each group is rearranged. Path selection is switched in a period of OTU2e-#nv (in units of 4×4080 bytes) using 2:1 selectors 1112a, ..., 1112f. A 64-bit register 1114 stores a 64-bit input data signal during one clock and then outputs the 64-bit input data signal, thereby increasing a processing speed of the 8-byte distributor 1110, but may not be used at a low rate.

Figure 12A:
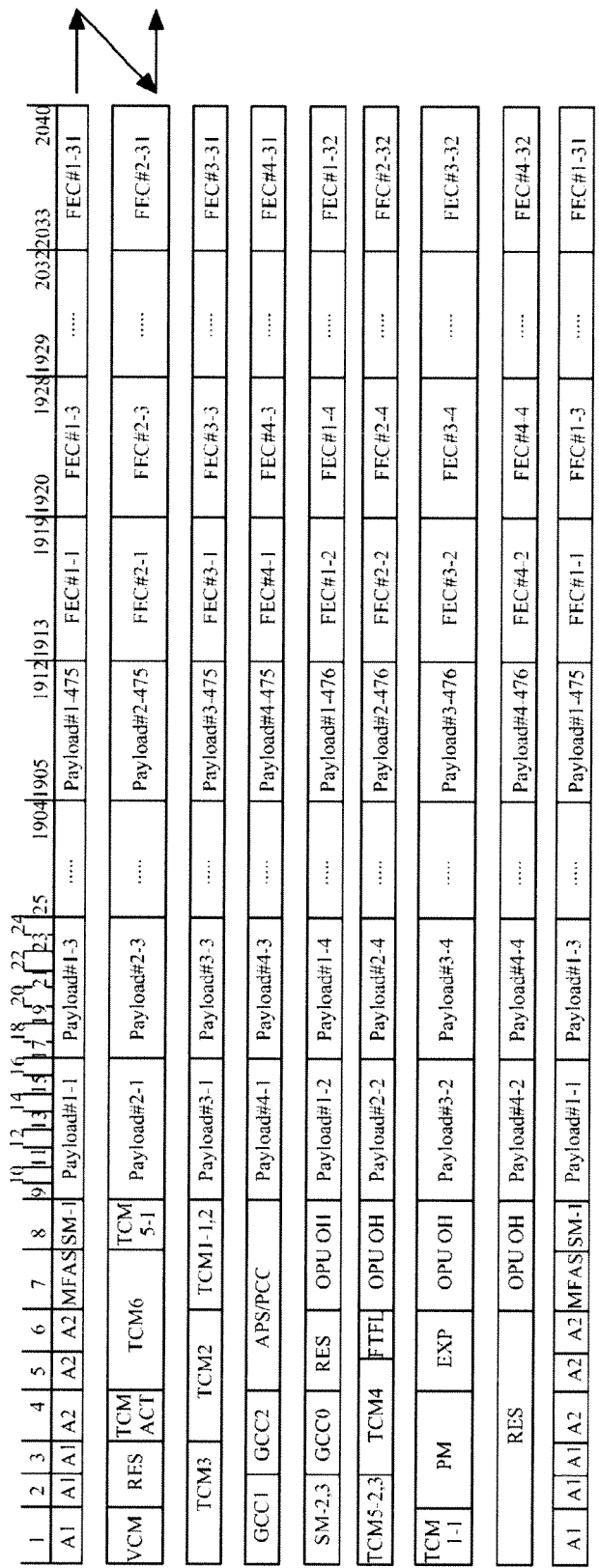
FIG. 12a illustrates a frame structure of virtual lane #n (n=1 to 10) by an 8-byte distributor according to an exemplary embodiment of the present invention.
Figure 12B:
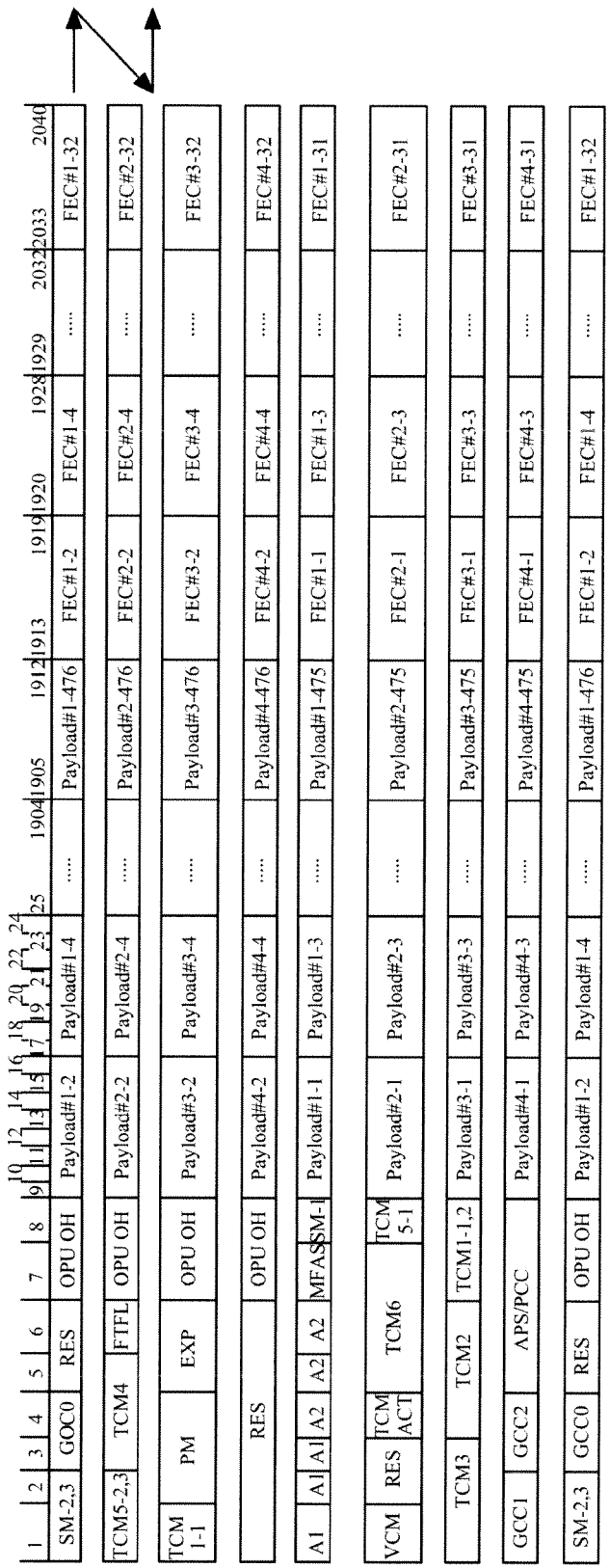
FIG. 12b illustrates a frame structure of virtual lane #n+10 (n=1 to 10) by an 8-byte distributor according to an exemplary embodiment of the present invention.

Structures of a frame of each virtual lane and an entire frame divided and then transmitted are shown in FIGS. 12a and 12b. The first row of 2040 bytes in a row direction is first transmitted and then the next row is transmitted. FIG. 12a illustrates a frame structure of virtual lane #n (n=1 to 10), in which a FAS byte and a MFAS byte are in row 1, but a VCM byte is located in row 2 column 1. FIG. 12b illustrates a frame structure of virtual lane #n+10 (n=1 to 10) in units of byte, in which a FAS byte and a MFAS byte are in row 5.

For frame alignment, each virtual lane uses a FAS byte. After each virtual lane frame is aligned, virtual lane #n or virtual lane #n+10 (n=1 to 10) is identified by the least significant bit of the MFAS byte. #n of each virtual lane and virtual container is obtained using the VCM byte defined in FIG. 10a, and simultaneously, a frame skew value between virtual lanes is measured using 7 bits of the MFAS byte together and the skew is compensated. It is to be noted that there is a fundamental 2×4080-byte difference in FAS byte location between virtual lane #n and virtual lane #n+1. After the skew is compensated, virtual lane #n and #n+10 frames take a structure of the OTU2e-10v frame according to virtual lane #n through a reverse process of the 8-byte distributor.

Figure 13A:
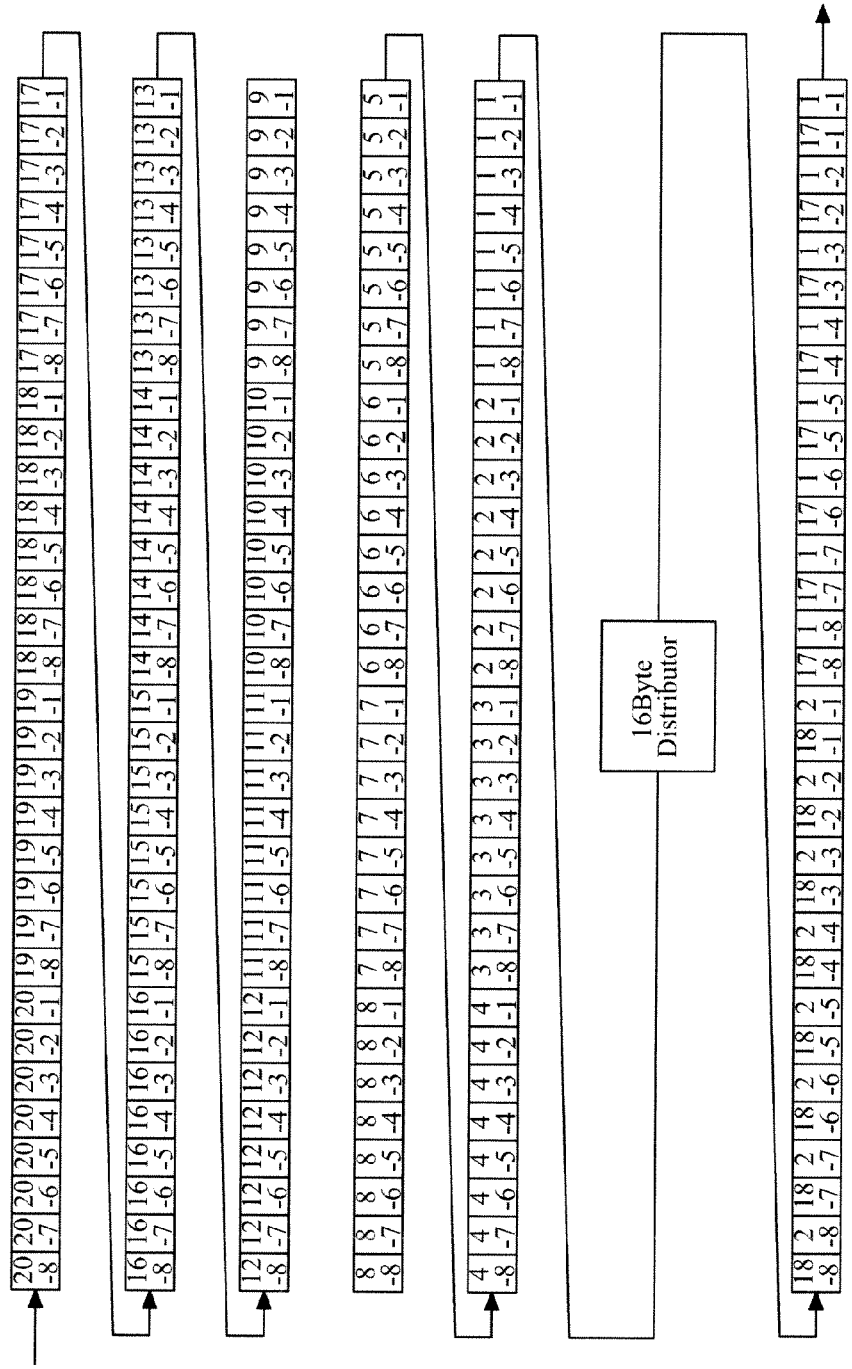
FIG. 13a illustrates a transmission bit string passing through a 16-byte distributor.
Figure 13B:
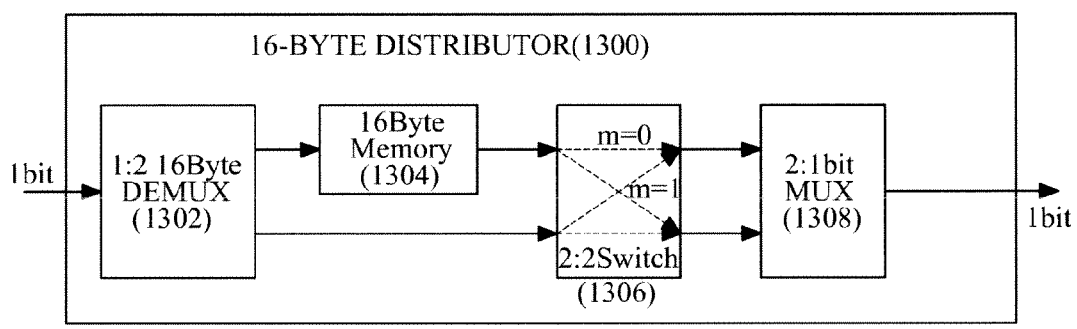
FIG. 13b is a block diagram of a 16-byte distributor according to an exemplary embodiment of the present invention.

A bit string passing through the 16-byte distributor is shown in FIG. 13a. FIG. 13a illustrates a bit string output when an input and output bit of the 16-byte distributor is 1 bit. 1-1 indicates the first bit of the first byte and 9-8 indicates the eighth bit of the ninth byte. 1-1, 1-2, and 2-8 are bits transmitted to virtual lane #n, and 17-1, 17-2, ..., and 18-8 are bits transmitted to virtual lane #n+10. The virtual lanes are repeatedly output in units of bits. A simplified structure of the 16-byte distributor 300 for creating such two virtual lanes is shown in FIG. 13b.

In FIG. 13, it is assumed that the input and output bit of the 16-byte distributor 1300 is 1 bit. In this case, a 1:2 16-byte demultiplexer 1302 demultiplexes an input bit in units of 16 bytes. An upper lane is stored by 16 bytes in a 16-byte memory 1304 and aligned with a lower lane. The aligned signal is switched using a 2:2 switch 1306 (or two 2:1 multiplexer/selectors) in a period of OTU2e-#nv (in units of 4×4080 bytes), and converted into an OTU2e-#nvd multi-lane signal using a 2:1 bit multiplexer 1308.

Figure 13C:
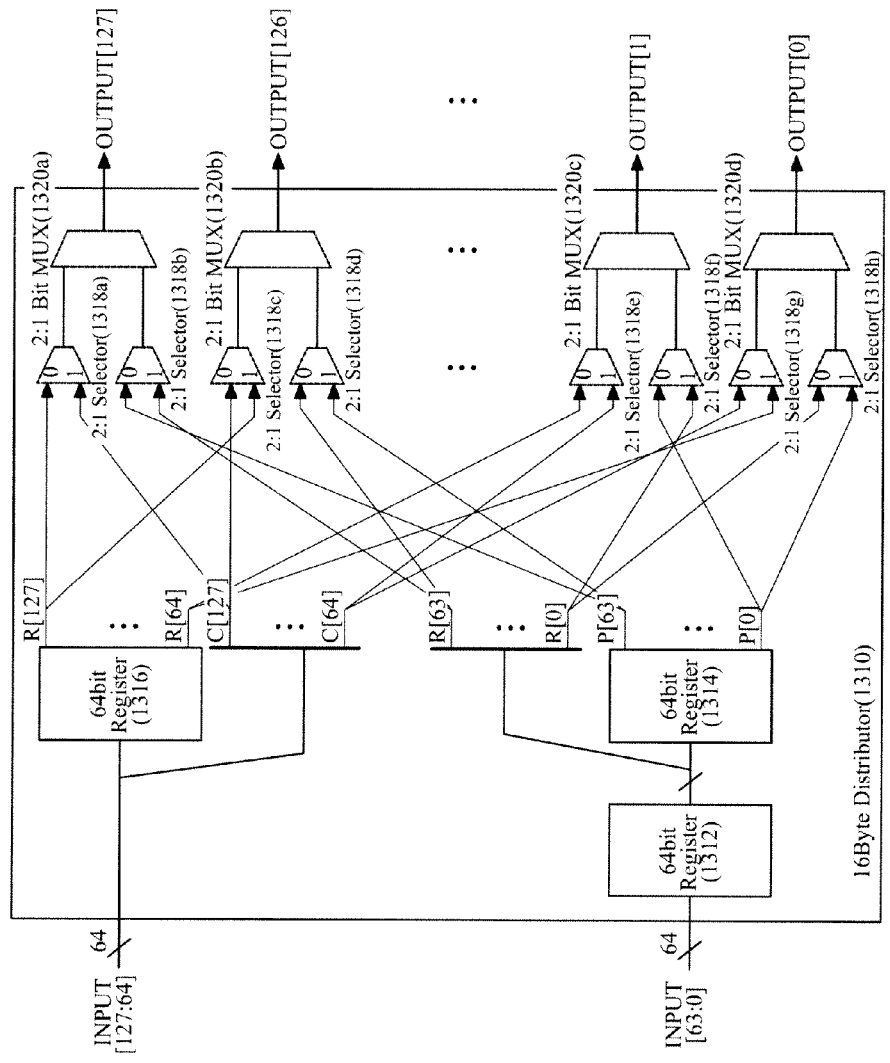
FIG. 13c is a block diagram of a 16-byte distributor according to another exemplary embodiment of the present invention.

Meanwhile, a structure of a 16-byte distributor 1310 in which it is assumed that an input and output bit of the 16-byte distributor is 128 bits is shown in FIG. 13c. In FIG. 13c, since an input consists of a total of 16 bytes, some of the input 16 bytes are stored in a 64-bit register 1316 during one clock, and the lower 8 bytes, R[63:0] signal, of the 16 bytes output from the 64-bit register 1312 are stored in a 64-bit register 1314 during one clock. An output R[127:64] signal of the 64-bit register 1316 and an input C[127:64] signal of the 16-byte distributor 1310 are switched for path selection by 2:1 selectors 1318a, 1318c, 1318e, and 1318g in a period of OTU2e-#nv (in units of 4×4080 bytes). Similarly, an output R[63:0] signal of the 64-bit register 1312 and an output P[63:0] signal of the 64-bit register 1314 are switched for path selection by 2:1 selectors 1318b, 1318d, 1318f, and 1318h in a period of OTU2e-#nv (in units of 4×4080 bytes). A 2:1 bit multiplexer 1320 performs 2:1 bit multiplexing on the signals output from the upper 2:1 selectors 1320a, 1320c, 1320e and 1320g and the lower 2:1 selectors 1320b, 1320d, 1320f, and 1320h to output a resultant signal as shown in FIG. 13a.

Figure 14A:
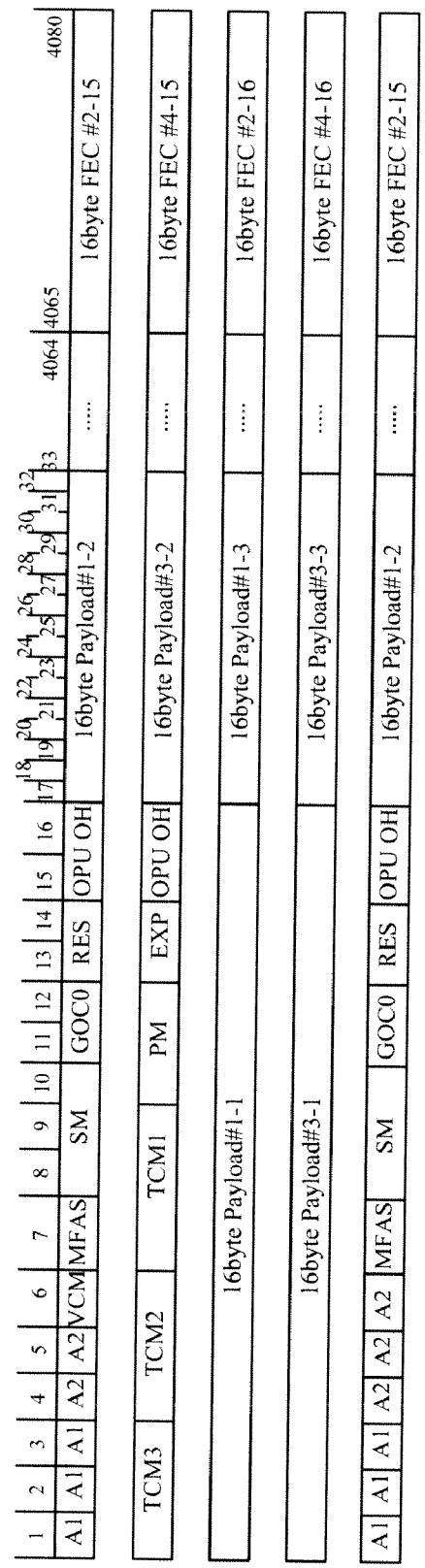
FIG. 14a illustrates a frame structure of virtual lane #n (n=1 to 10) by a 16-byte distributor according to an exemplary embodiment of the present invention.
Figure 14B:
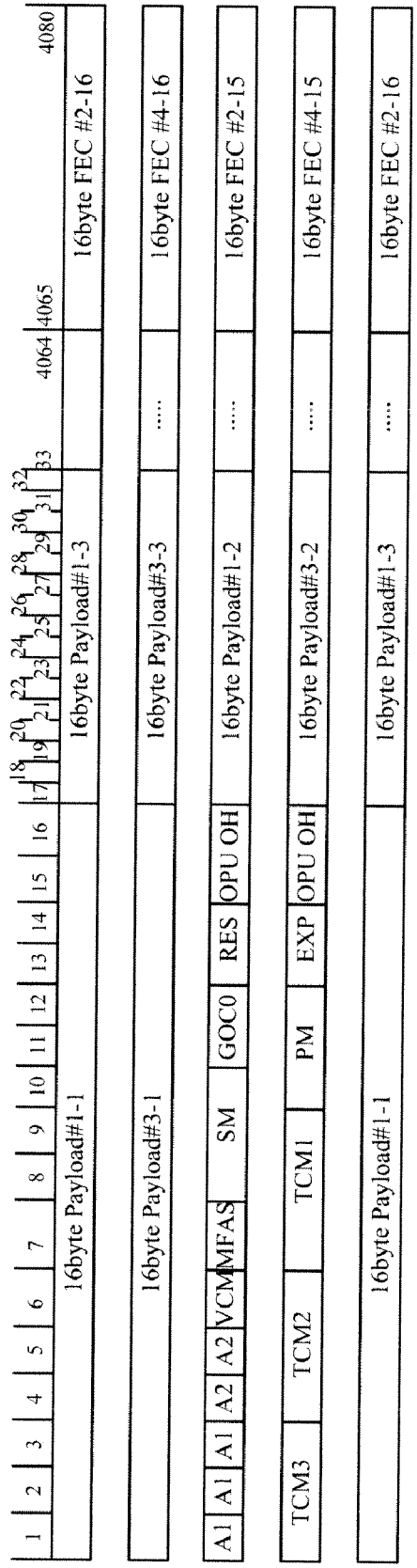
FIG. 14b illustrates a frame structure of virtual lane #n+10 (n=1 to 10) by a 16-byte distributor according to an exemplary embodiment of the present invention.

Structures of the frame of each virtual lane and an entire frame divided and then transmitted are shown in FIGS. 14a and 14b. The first row of 4080 bytes in a row direction is first transmitted and then the next row is transmitted. FIG. 14a illustrates a frame structure of virtual lane #n (n=1 to 10), in which a FAS byte, a MFAS byte and a VCM byte are in the first row. FIG. 14b illustrates a frame structure of virtual lane #n+10 (n=1 to 10) in units of byte, in which a FAS byte and a MFAS byte are in the third row.

For frame alignment, each virtual lane uses a FAS byte. Sufficient frame alignment can be performed using only the FAS byte in rows 1 to 5 without the sixth A2 byte. After each virtual lane frame is aligned, virtual lane #n or virtual lane #n+10 (n=1 to 10) is identified by the least significant bit of the MFAS byte. #n of each virtual lane and virtual container is obtained using the VCM byte defined in FIG. 10a, and simultaneously, a frame skew value among the virtual lanes is measured using 7 bits of the MFAS byte together and the skew is compensated. It is to be noted that there is a fundamental 2×4080-byte difference in FAS byte location between virtual lane #n and virtual lane #n+1. After the skew is compensated, the virtual lane #n and #n+10 frame take a structure of the OTU2e-10v frame according to virtual lane #n through a reverse process of the 16-byte distributor.

Frame modification to additionally use one reserved byte in the ODU2e overhead in FIG. 10 or to replace one A2 byte in the OTU2e overhead with a to VCM byte is performed by the overhead processor 806 shown in FIG. 8.

Figure 15:
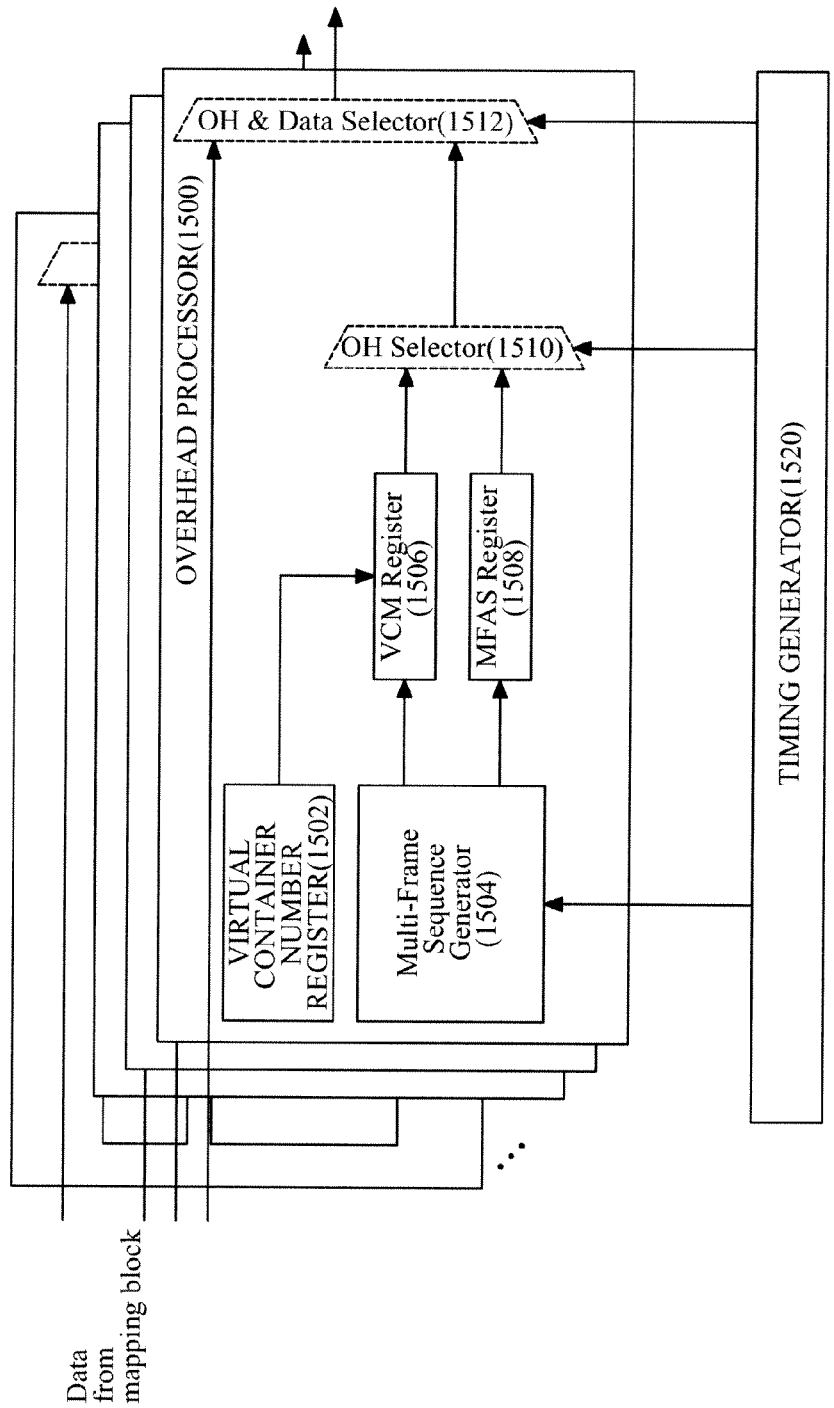
FIG. 15 is a block diagram of an overhead processor according to an exemplary embodiment of the present invention.

FIG. 15 illustrates an overhead processing block further included for a multi-lane transmission frame on the assumption that all existing overheads have been processed when an 8 or more byte distributor is selected.

Referring to FIG. 15, a virtual container number register 1502 enables a user to set a number of a virtual container to be used in each overhead processor 1500. A multi-frame sequence generator 1504 receives frame start information of the virtual container from a timing generator 1520 and continues to count a frame of the virtual container to 12 bits. In 12-bit multi-frame number information, the lower 8 bits are delivered to a MFAS register 1508, and the other 4 bits are delivered to a VCM register 1506. The VCM register 1506 combines 4-bit VCN information from the virtual container number register 1502 and 4-bit VMFS EX information from the multi-frame sequence generator 1504 to store VCM byte information. An overhead selector 1510 receives the VCM and MFAS byte location information defined in FIG. 10a in overhead timing information from the timing generator 1520 and selects information from the VCM register 1506 and the MFAS register 1508. An overhead and data selector 1512 receives the overhead timing information and payload timing information from the timing generator 1520 and selects data and overhead so that the data is delivered to the payload area and the overhead information selected by the overhead selector 1510 is delivered to the overhead area. The timing generator 1520 generates timing information of an overhead signal of OTUk and timing information of a payload signal and provides the information to the corresponding blocks.

The frame structure in which one reserved byte in the ODU2e overhead is additionally used or one A2 byte in the OTU2e overhead is replaced with the VCM byte to identify the virtual containers when the 8- or 16-byte distributor is used has been described so far in FIG. 10.

Figure 16A:
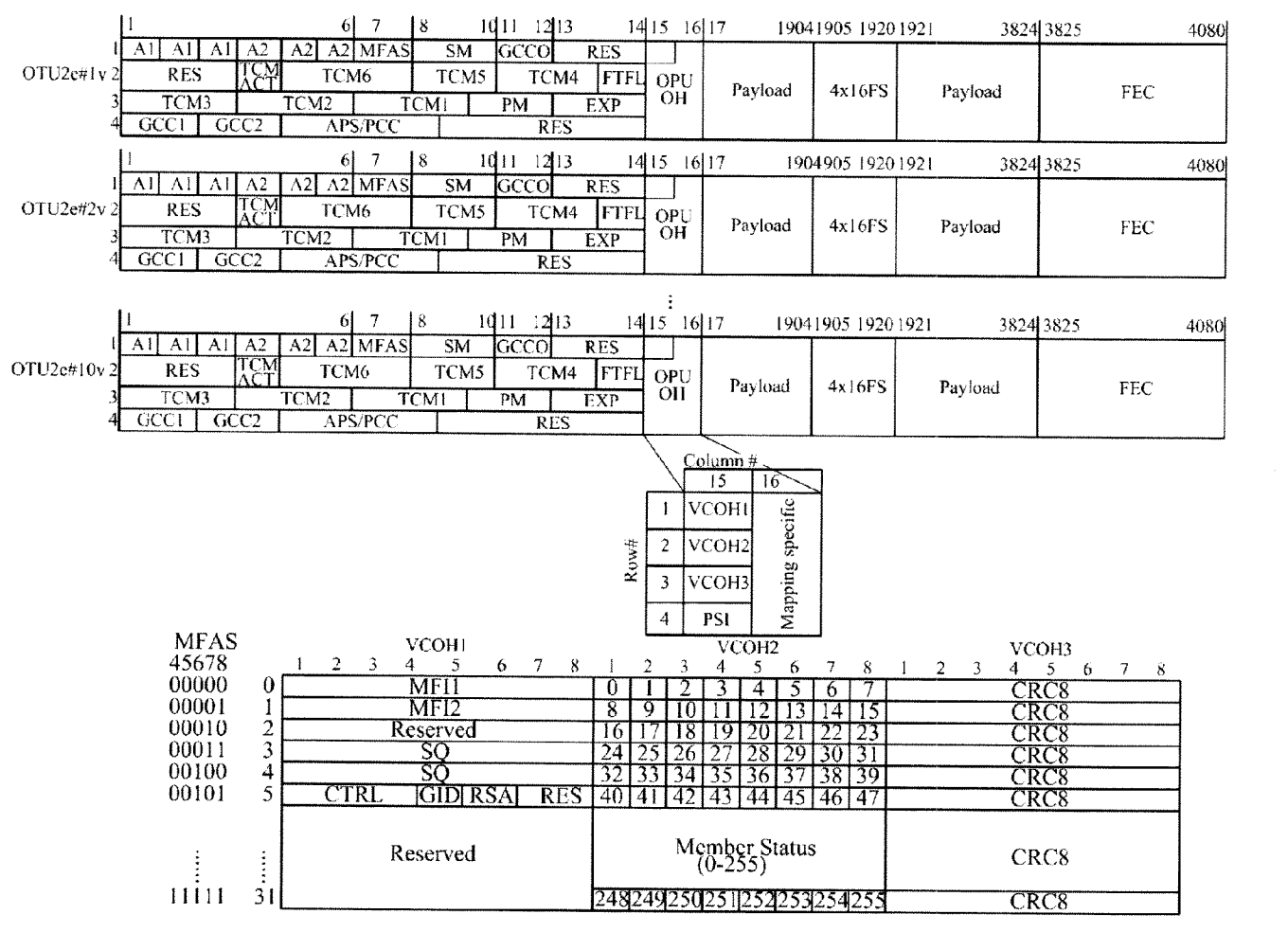

FIG. 16a illustrates a modified frame structure using only reserved 1-byte information in a virtual concatenation overhead (VCOH) of an OPU2e overhead when an 8- or 16-byte distributor is used.

In FIG. 4b, when a virtual concatenation overhead of existing OPUk-Xv is used as is and an 8- or 16-byte distributor is used, it is impossible to determine a virtual container to which virtual lane #n+10 corresponds and accordingly perform transmission via various transport lanes. This is because when the 8- or 16-byte distributor is used, the virtual lane is determined by the least significant bit of the MFAS byte being 0 or 1, in which SQ byte information is provided only when the least significant bit of the MFAS byte is 0, such that only virtual lane #n can recognize sequence information of the virtual container. To simply resolve this problem, when the fourth to eighth bits of the MFAS consist of "00011" as shown in FIG. 16a, the same information as the SQ byte is provided to the reserved byte of VCOH1, such that the sequence information of the virtual container may be provided to virtual lane #n+10. When the 8-byte distributor is used, the virtual lane allocation structure shown in FIG. 10c is applied, and when the 16-byte distributor is used, the virtual lane allocation structure shown in FIG. 10e is applied.

When the 8-byte distributor is used, VCOH1 byte is separated from FAS and MFAS bytes. Accordingly, when the fourth to eighth bits of the MFAS byte consist of "00010", virtual lane #n can obtain the SQ byte information by reading the next VCOH1 byte. On the other hand, when the fourth to eighth bits of the MFAS byte consist of "00011", virtual lane #n+10 can obtain the SQ byte information by reading the next VCOH1 byte. When the 16-byte distributor is used, 16 bytes constitute one unit. Accordingly, all VCOH1 bytes in row 1 column 15 including the FAS and MFAS bytes are included, the FAS byte is used to align frames and the least significant bit of the MFAS byte is used to identify virtual lane #n or virtual lane #n+10. When the fourth to eighth bits of the MFAS byte are "00100, virtual lane #n can obtain the SQ byte information by reading the VCOH1 byte. When the fourth to eighth bits of the MFAS byte are "00011", virtual lane #n+10 can obtain the SQ byte information by reading the VCOH1 byte. The least significant bit of 8 bits of the MFAS byte may be used to identify the virtual lanes, and the other 7 bits may be used for the multi-frame sequence of each virtual lane. Since the frame identification can be achieved with a total of 7 bits for each virtual lane, skew compensation of a maximum of 8,355,840 bits (=27×4×4080×8/2) can be achieved. Skew compensation of about 753 us (=27×4×4080×8/2/255/237× 10.3125 Gbit/s) can be achieved in view of a bit rate of each OTU2e-#nv.

FIG. 16b is a modified frame structure using m or m+1 reserved bytes of VCOH1 bytes when m virtual lanes are allocated to each virtual container and an 8- or 16-byte distributor is used.

The same information as the SQ byte is provided to the reserved byte of VCOH1 corresponding to "01000" to "01000"+m−1 of the fourth to eighth bits of a MFAS byte according to the number of virtual lanes allocated to each virtual container. If four virtual lanes of each virtual container are allocated using OTU2e-4v, the SQ byte information is provided to the VCOH1 byte corresponding to "01000" to "01011" of the fourth to eighth bits of the MFAS byte, as shown in FIG. 16b. A receiving stage may also obtain information on a maximum number of allocated virtual lanes, using a number of the last row to which the SQ byte is provided. That is, a maximum value is found from the fourth to eighth bit values of the MFAS byte having the last SQ byte in the VCOH1 bytes. The number of the used virtual lanes can be obtained by subtracting 7 from the maximum value. Alternatively, one reserved byte of the VCOH1 bytes may be allocated for indicating a total number of used virtual lanes. In FIG. 16b, a total number of virtual lanes (TVL) byte is allocated when the fourth to eighth bits of the MFAS byte are "00110".

Figure 16C:
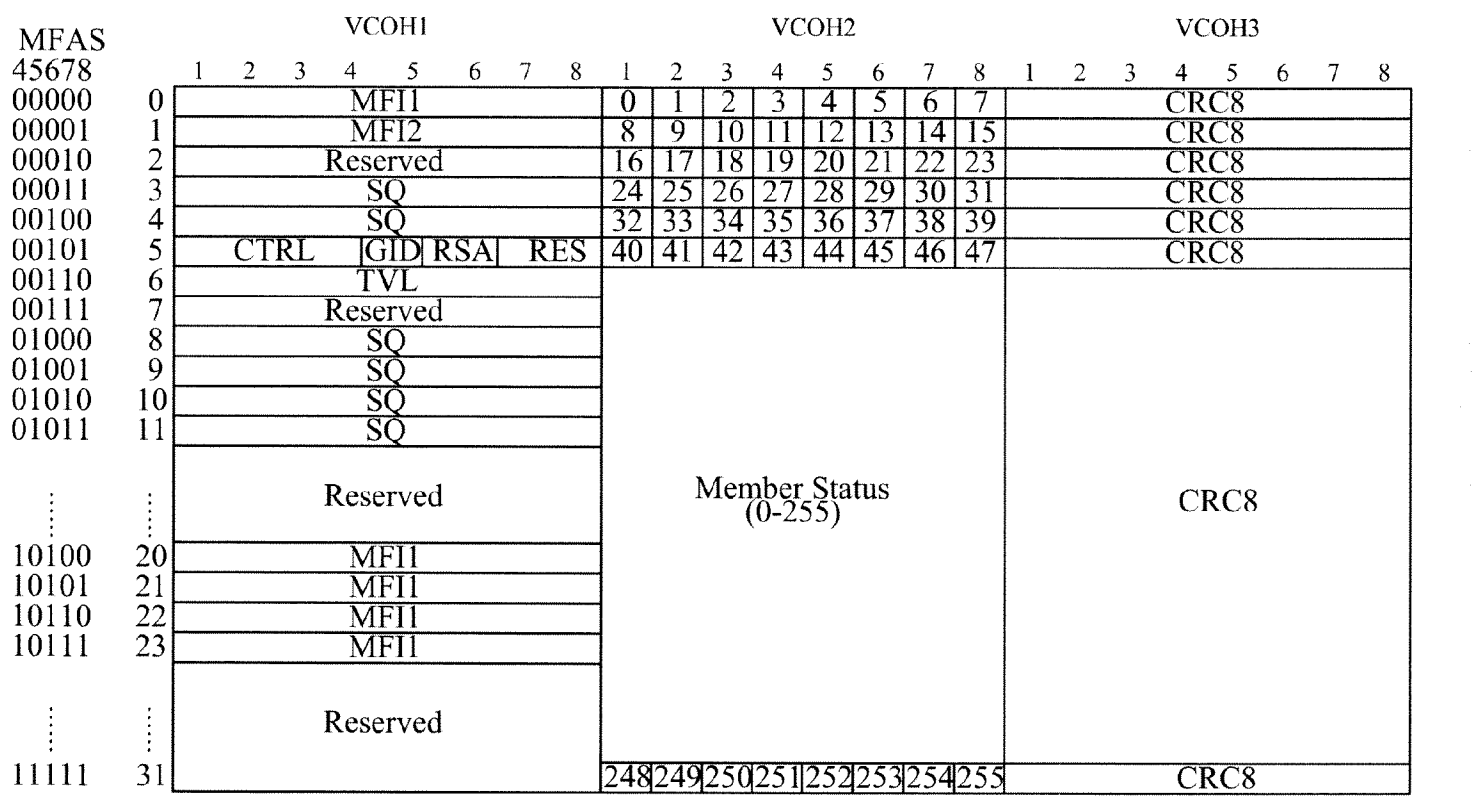

FIG. 16c illustrates an example of a frame structure in which m reserved bytes of the VCOH1 bytes are used for MFI bytes to provide multi-frame information of each virtual lane in the frame structure in FIG. 16b using SQ bytes corresponding to the number of the allocated virtual lanes.

The same information as the SQ byte is provided to reserved bytes of the VCOH1 corresponding to "01000" to "01000"+m−1 of the fourth to eighth bits of the MFAS byte according to the number of virtual lanes allocated to each virtual container. In this frame structure, in FIG. 10d, the 1 reserved byte of the OTUk overhead was utilized for multi-frame information of the virtual lane to improve the skew compensation capability. However, in FIG. 16c, the multi-frame information of the virtual lane is provided to m reserved bytes of the VCOH1 bytes without using the OTUk overhead. It is understood that the MFI2 byte as well as the MFI1 byte is provided from the m reserved bytes of the VCOH1 bytes to further improve the skew compensation capability. However, since bytes available as reserved bytes of the VCOH1 bytes are about 24, 14 virtual lanes are available only for MFI1 bytes, but about 8 virtual lanes are available for both MFI1 and MFI2 bytes.

Alternatively, the third to eighth bit or more bits rather than the fourth to eighth bits of the MFAS byte may be used to increase the number of available virtual lanes or to improve the skew compensation capability. An example in which four reserved bytes of the VCOH1 bytes are further used for MFI1 bytes using four virtual lanes, as shown in FIG. 16c, will now be described.

Since the four virtual lanes are used, the two least significant bits of 8 bits of the MFAS byte may be used to identify virtual lanes and the other 6 bits may be used for the multi-frame sequence of each virtual lane. Since the MFI1 byte may be used for the multi-frame sequence extension bits of each virtual lane, multi-frame of each virtual lane can be identified by a total of 14 bits for each virtual lane. Accordingly, skew compensation of a maximum of 1,069,547,520 bits (=2$^{14}$×4×4080×8/2) can be achieved. Skew compensation of about 96,392 us (=2$^{14}$×4×4080×8/2/255/237×10.3125 Gbit/s) can be achieved in view of a bit rate of each OTU2e-#nv.

If the MFI1 bytes are not additionally used, only 6 bits of the MFAS byte may be used for the multi-frame sequence of each virtual lane and multi-frame identification of each virtual lane can be achieved. Accordingly, skew compensation of a maximum of 4,177,920 bits (=2$^{6}$×4×4080×8/2) can be achieved and skew compensation of about 376 us (=2$^{6}$×4×4080×8/2/255/237×10.3125) Gbit/s can be achieved in view of a bit rate of each OTU2e-#nv.

Figure 17A:
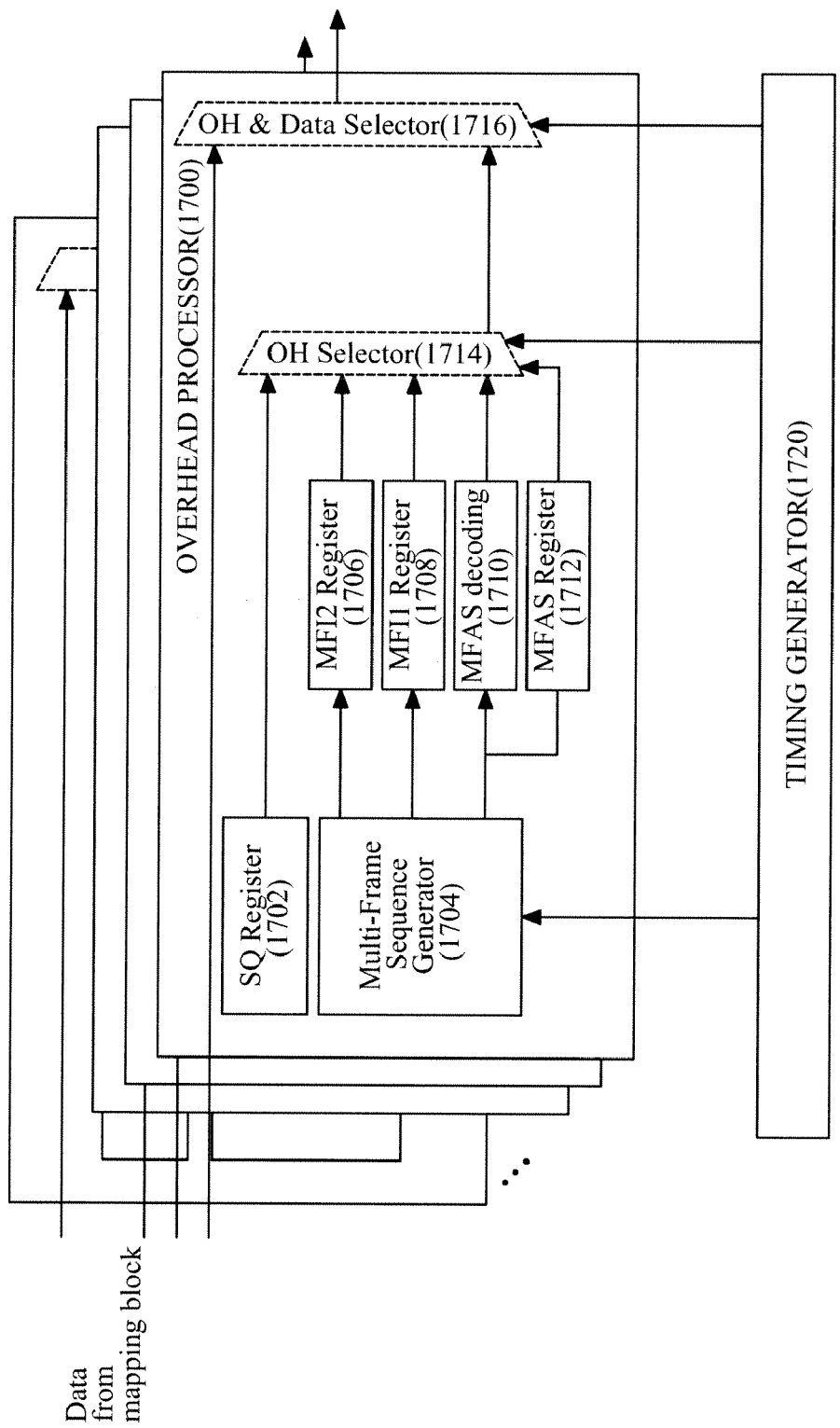
FIGS. 17a and 17b are block diagrams of an overhead processor according to another exemplary embodiment of the present invention.

FIG. 17a illustrates an overhead processor further included for a multi-lane transmission frame in which 1 reserved byte of VCOH in an OPU2e overhead is additionally used for a SQ byte and an 8- or 16-byte distributor is used.

Referring to FIG. 17a, a SQ register 1702 enables a user to set a number of a virtual container to be used in each overhead processor 1700. The SQ byte may provide 8-bit information to represent more virtual containers, unlike a conventional case providing only 4-bit information (user signal input is omitted). A multi-frame sequence generator 1704 receives frame start information of a virtual container from a timing generator 1720, and continues to count a frame of the virtual container to 24 bits. The lower 8 bits of the 24-bit multi-frame number information are sent to a MFAS register 1712, the next 8 bits are sent to a MFI1 register 1708, and the last 8 bits are sent to a MFI2 register 1706. A MFAS decoder 1710 receives information on the fourth to eighth bits of the MFAS information, and outputs a select control signal so that an overhead selector 1714 selects the SQ information when the fourth to eighth bits are "0011" or "0100". When the fourth to eighth bits of the MFAS are "00000", the MFAS decoder 1710 outputs a select signal so that the overhead selector 1714 can select MFI1 information from the MFI1 register 1708. When the fourth to eighth bits of the MFAS are "00001", the MFAS decoder 1710 outputs a select signal so that the overhead selector 1714 can select MFI2 information from the MFI2 register 1706.

Meanwhile, the MFAS register 1712 stores the lower 8-bit information received from the multi-frame sequence generator 1704, and the MFI1 register 1708 stores the 8-bit information corresponding to the ninth to sixteenth bits received from the multi-frame sequence generator 1704. The MFI2 register 1706 stores the upper 8-bit information received from the multi-frame sequence generator 1704. The overhead selector 1714 receives the VCOH and MFAS byte location information defined in FIG. 16 in the overhead timing information from the timing generator 1720, receives the MFI1 byte and the MF2 bytes in the VCOH byte and a SQ byte select control signal from the MFAS decoder 1710, and selects output information from the SQ register 1702, the MFI1 register 1708, the MFI2 register 1706 and the MFAS register 1712. An overhead and data selector 1716 receives the overhead timing information and the payload timing information from the timing generator 1720, and selects data and overhead so that the data is sent to the payload area and overhead information selected by the overhead selector 1714 is sent to the overhead area. Finally, the timing generator 1720 generates the timing information of the overhead signal of OTUk and the timing information of the payload signal and provides the information to the corresponding blocks.

In FIG. 10, the VCN information in the VCM byte is used to identify the virtual containers and, in FIG. 16, the SQ byte is used to identify the virtual containers. In FIG. 10, the MFAS byte and the VMFS EX information are used to measure and compensate for the skew of the virtual lanes while identifying the virtual lanes. Meanwhile, in FIG. 16, the MFAS byte and the MFI1 information are used to measure and compensate for the skew of the virtual lanes while identifying the virtual lanes. In this case, the virtual lanes can be identified by the MFAS byte when the virtual lane number corresponds to a divisor of 256 that can be represented by the MFAS byte, such as 2, 4, 8, 16, 32, 64, 128, 256, etc. When the virtual lane number is to be set to a number other than the divisor, it is difficult to identify the virtual lanes using the MFAS byte unless the number of the MFAS bytes is limited to the multiple of the virtual lane number. Some examples will be described in consideration of such an issue.

A first method is to use the SQ byte of the VCOH1 bytes to identify the virtual containers, as shown in FIG. 16b. A virtual multi-frame sequence (VMFS) is defined as an information byte for identifying the virtual lanes and compensating for the skew and used in place of the VCM in FIG. 10a or 10d. A maximum multiple x value of the virtual lane number capable of representing the VMFS value in 8 bits is used as a period, unlike using 256 as a period as in MFAS. That is, MFAS increments from 0 to 255 while VMFS increments from 0 to x−1 to identify the virtual lanes and simultaneously measure the skew of the virtual lanes. If the virtual lane number is 5, the VMFS value is set to increment from 0 to 254 (a maximum multiple of 5 that can be represented by 8 bits is 255). Accordingly, a virtual lane can be identified by performing the received VMFS value modulo 5, that is, by calculating a remainder of 5. Also, the skew among the virtual lanes may be measured using a quotient obtained by dividing by 5 or using an entire VMFS value. If the virtual lane number is 10, the VMFS value is similarly set to increment from 0 to 249 (a maximum multiple of 10 that can be represented by 8 bits is 250). A virtual lane can be identified by performing the received VMFS value modulo 10.

A second method is to use two reserved bytes in row 1 columns 13 and 14 as VMFS1 and VMFS2, similar to the method in FIG. 5a. The second method is used when a higher skew compensation capability than the case using 1 byte for the VFMS is required. Another method is to use 1 byte for the VFMS and use other bits using a virtual container VCN in other reserved bytes for extension bits of the VFMS.

Figure 17B:
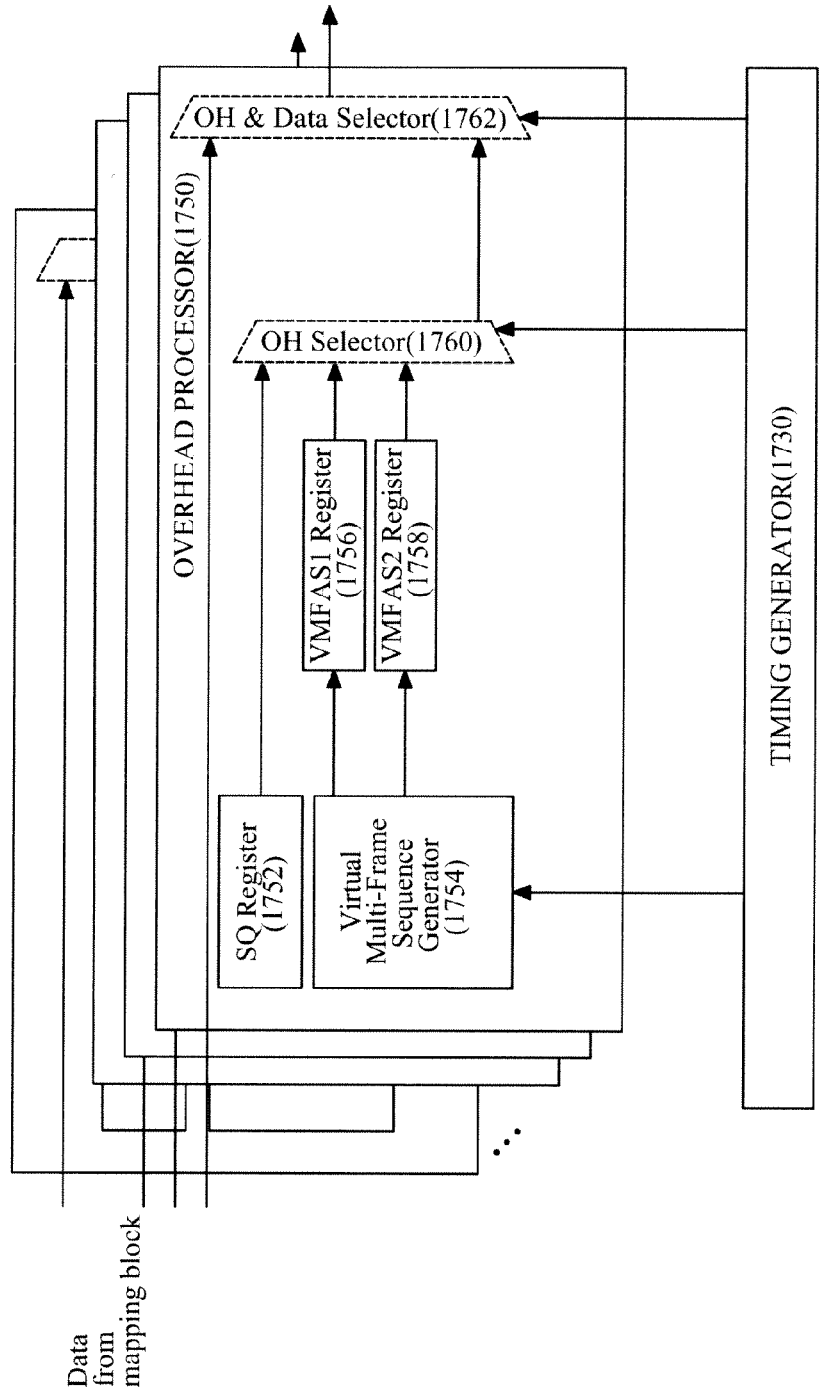

FIG. 17b illustrates an overhead processor further included for a multi-lane transmission frame in which reserved bytes of the OPUk overhead are additionally used for SQ bytes and VMFS1 and VMFS2 bytes and an 8- or 16-byte distributor is used.

Referring to FIG. 17b, a SQ register 1752 enables a user to set a number of a virtual container to be used in each overhead processor 1750. A virtual multi-frame sequence generator 1754 receives frame start information of a virtual container from a timing generator 1730, and periodically continues to count a maximum multiple of the virtual lane number capable of representing the frame of the virtual container by 16 bits. Among the calculated 16 bits, the lower 8 bits are sent to a VMFAS1 register 1756 and the next 8 bits are sent to a VMFAS2 register 1758.

Meanwhile, the VMFAS1 register 1756 stores the lower 8-bit information received from the virtual multi-frame sequence generator 1754, and the VMFAS2 register 1758 stores the upper 8-bit information received from the virtual multi-frame sequence generator 1754. An overhead selector 1760 receives VCOH, VMFAS1 and VMFAS2 byte location information in overhead timing information from the timing generator 1730, and selects output information from the SQ register 1752, the VMFAS1 register 1756 and the VMFAS2 register 1758. An overhead and data selector 1762 receives overhead timing information and payload timing information from the timing generator 1730, and selects data and overhead so that the data can be sent to the payload area and the overhead information selected by the overhead selector 1760 can be sent to the overhead area. Finally, the timing generator 1730 generates the timing information of the overhead signal of OTUk and the timing information of the payload signal and provides the information to the corresponding blocks.

After the OTUk-XvYd signal generated by the byte distributor and the OTUk-Xv mapping unit is transmitted, a receiving stage detects each virtual container and virtual lane from the OTUk-XvYd signal using a byte redistributor. The receiving stage compensates for a skew among the detected virtual signals and reclassifies the signals to obtain an OTUk-Xv signal. This will now be described.

Figure 18:
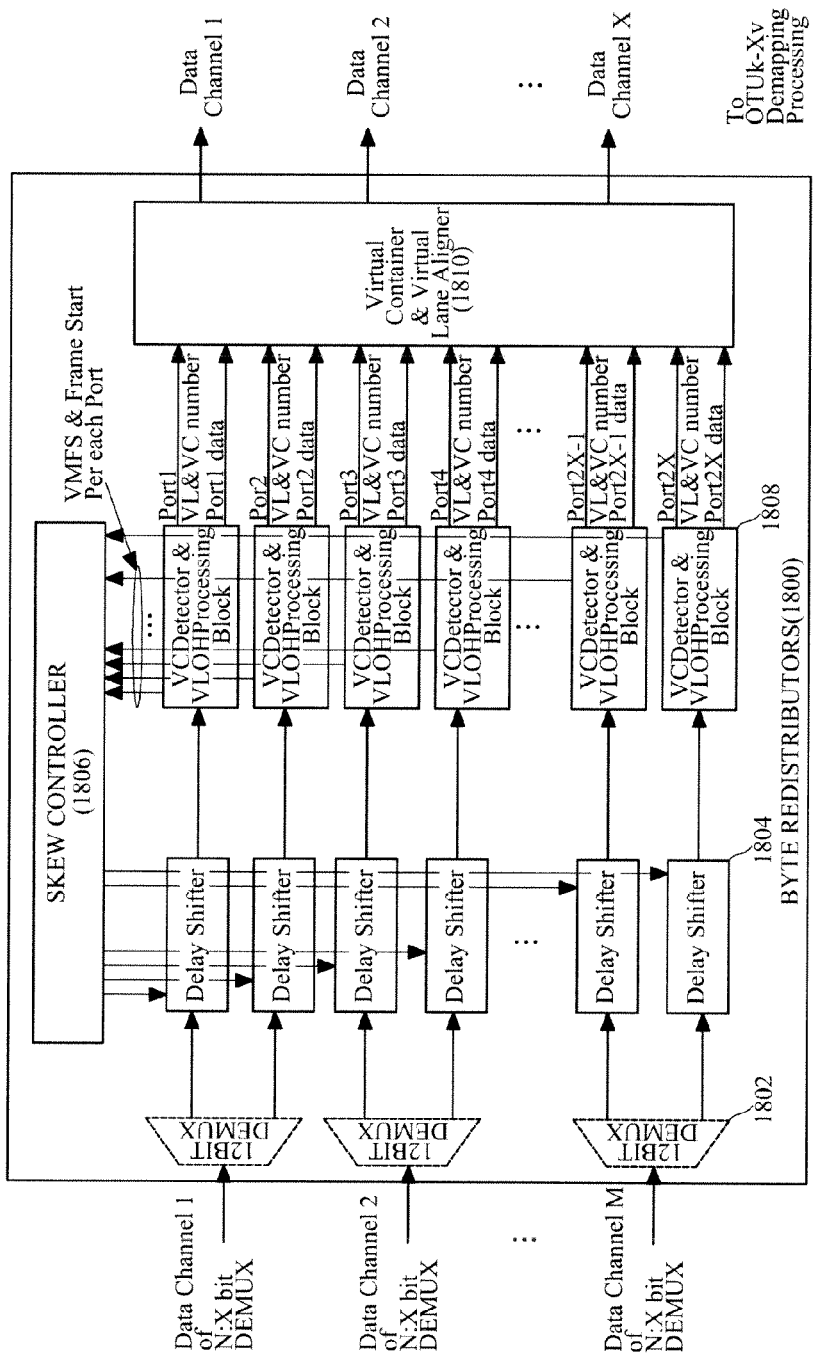
FIG. 18 is a block diagram of a byte redistributor according to an exemplary embodiment of the present invention.

FIG. 18 is a block diagram of a byte redistributor 1800 byte-redistributing an OTUk-Xv2d signal as an OTUk-Xv signal according to an exemplary embodiment of the present invention.

Referring to FIG. 18, 1:2 bit demultiplexers 1802 receive OTUk-Xv2d signals from N:X bit demultiplexers of a receiver via a total of X channels. There are two virtual lane signals on each channel, and the two virtual lane signals are divided through 1:2 bit demultiplexing. Each divided virtual lane signal is input to a delay shifter 1804. A skew (i.e., data delay) is generated among the virtual lanes upon transmission, and the delay shifter 1804 adjusts a delay of each virtual lane in response to a delay adjustment value received from a skew controller 1806.

The virtual lane signal delay-adjusted by the delay shifter 1804 is input to each virtual container (VC) detector and virtual lane overhead (VLOH) processor 1808. The VC detector and VLOH processor 1808 processes an overhead of each input virtual lane signal to extract VL #n and VC #n values. The VC detector and the VLOH processor 1808 sends the VC and VL data with the extracted VL #n and VC #n values to a virtual container VC and virtual lane VL aligner 1810. The VC detector and the VL overhead processor 1808 also send the detected frame start signal of each VL and virtual lane multi-frame sequence (VMFS) information to the skew controller 1806.

The skew controller 1806 determines whether a frame skew among all VLs is generated and calculates a frame skew value, using the virtual lane multi-frame sequence information received from each VC detector and VLOH processor 1808. The skew controller 1806 also calculates a data skew value in the frame among the VLs using the frame start signal of each VL received from the VC detector and VLOH processor 1808. Accordingly, the skew controller 1806 may measure a skew value generated among all the VLs and VCs. Also, the skew controller 1806 may calculate a skew compensation value for compensating for the skew generated among the VCs and VLs through the measured skew value. The skew compensation value is sent as a delay adjustment value to each delay shifter 1804.

The VC and VL aligner 1810 receives the VC and VL data and the VL #n and VC #n values from each VC detector and VLOH processor 1808. The VC and VL aligner 1810 collects VLs having the same VC #n in the VC and VL data and aligns the VLs having VC #n according to the VL #n value to obtain an OTUk-Xv signal. The obtained OTUk-Xv signal is sent to the OTUk-Xv demapping processor 332 shown in FIG. 3.

The case in which there are two virtual lanes has been described so far. In case of an OTUk-Xv4d signal in which there are four virtual lanes, the 1:2 bit demultiplexers 1802 are replaced with 1:4 bit demultiplexers, and 4X delay shifters 1804 and 4X VC detector and VLOH processors 1808 are used. Similarly, the skew controller 1806 receives 4X frame start signals and virtual lane multi-frame sequence (VMFS) information, and sends the 4X delay adjustment values to each delay shifter 1804. The VC and VL aligner 1810 receives the VL #n and VC #n values with the 4X VL data from the VC detector and VLOH processors 1808, and aligns the VCs and the VLs.

Figure 19A:
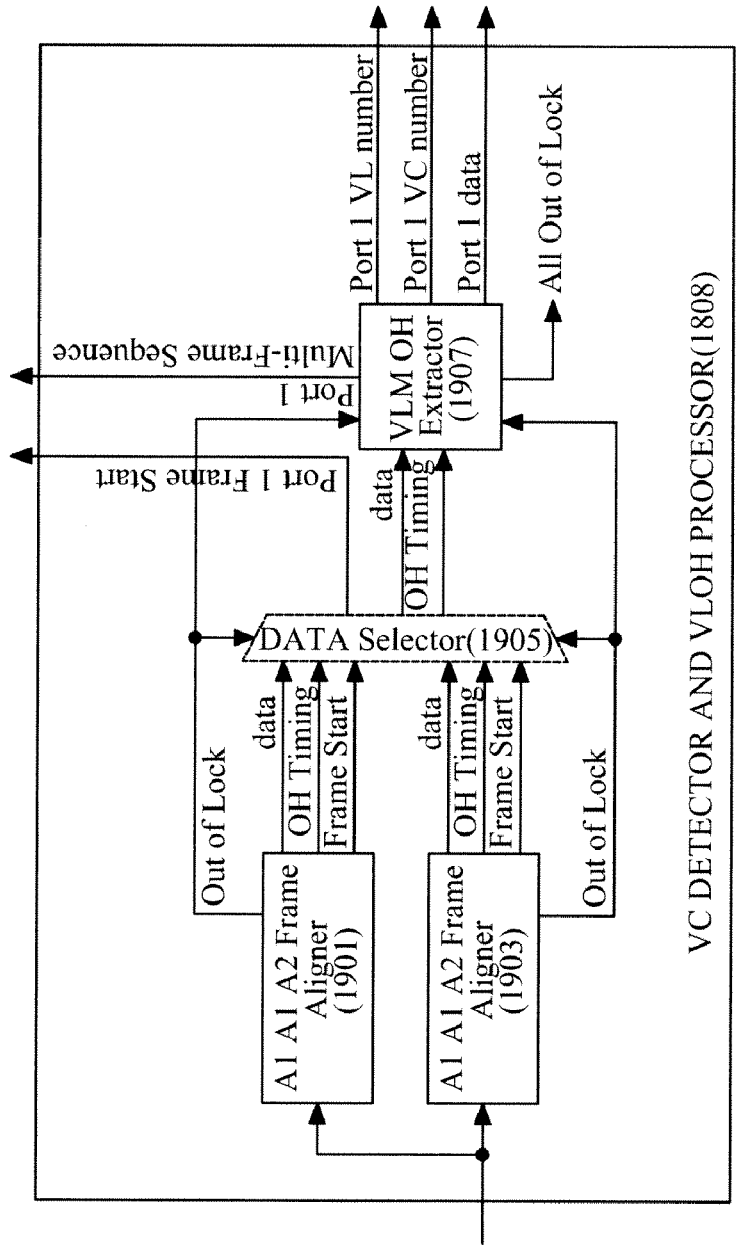
FIG. 19a is a block diagram of a virtual container detector and virtual lane overhead processor according to an exemplary embodiment of the present invention.
Figure 19B:
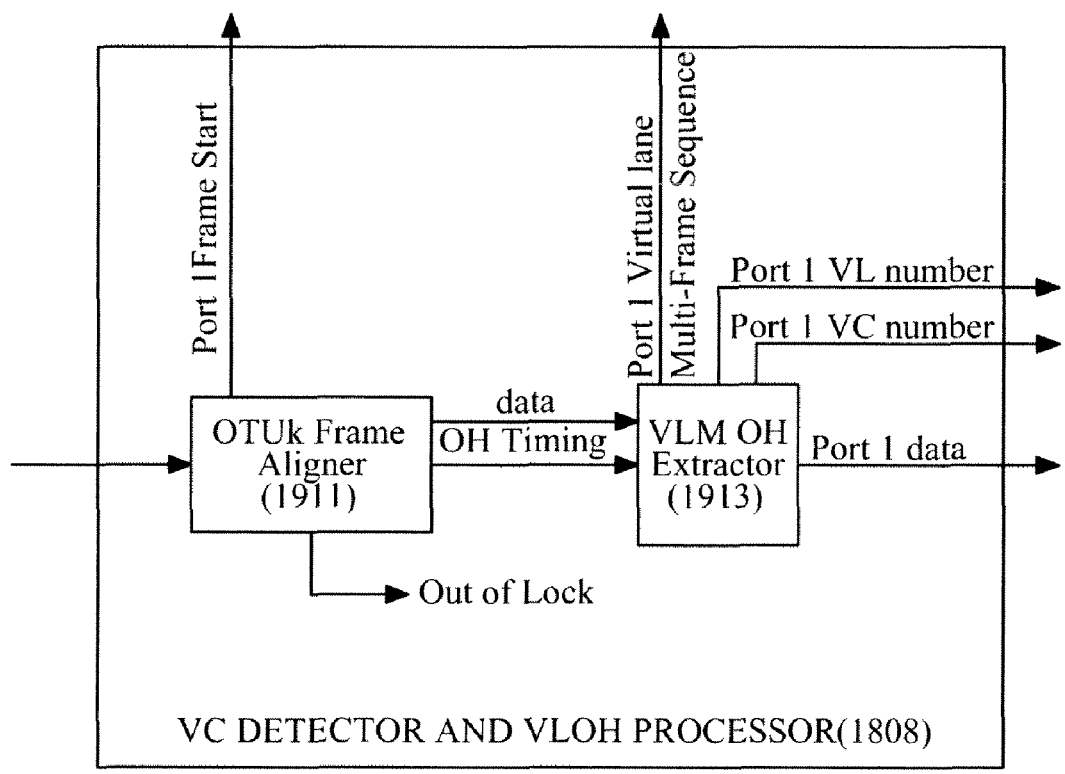
FIG. 19b is a block diagram of a virtual container detector and virtual lane overhead processor according to another exemplary embodiment of the present invention.
Figure 19C:
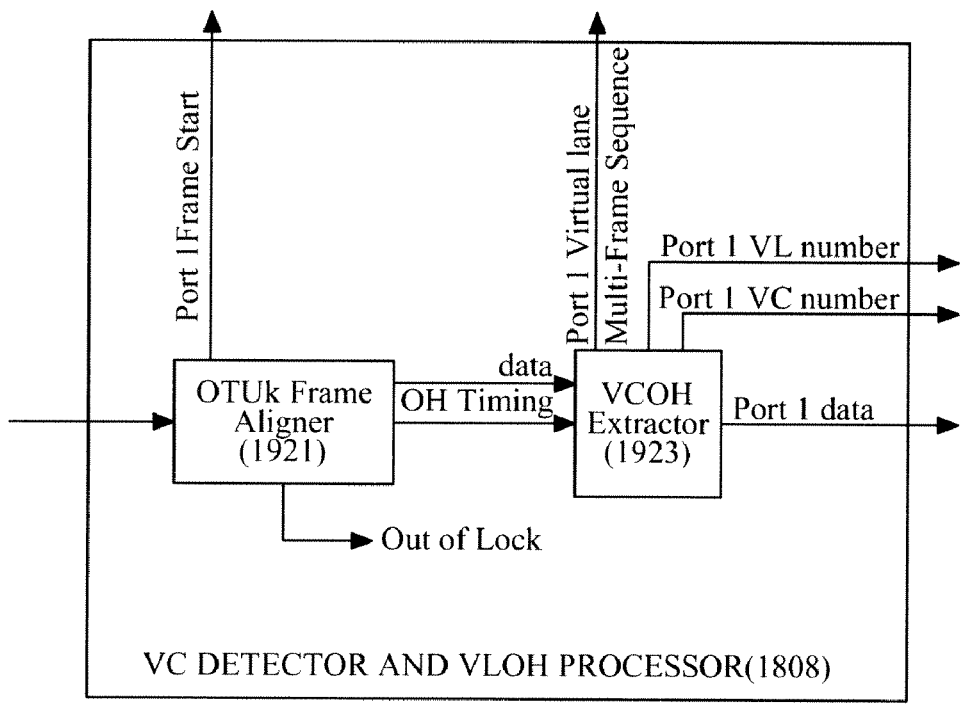
FIG. 19c is a block diagram of a virtual container detector and virtual lane overhead processor according to another exemplary embodiment of the present invention.

FIGS. 19a to 19c are block diagrams of the VC detector and VLOH processor 1808 detecting VCs and processing VL overheads. As described above, when the 1-byte distributor or the 8 or more byte distributor is used, the VC detector and VLOH processors 1808 in the byte redistributor 1800 are replaced.

FIG. 19a is a block diagram of the VC detector and VLOH processor when the frame as shown in FIG. 5 and the 1-byte distributor as shown in FIG. 6 are used.

If it is assumed that an OTUk-Xv2d signal is input, the OTUk-Xv2d signal consists of X virtual containers each having two virtual lanes. When the 1-byte distributor is used, virtual lanes #1 to X and virtual lanes #X+1 to 2X have different frame alignment bytes. Accordingly, the VC detector and VL overhead processor 1808 include an "A1 A1 A2" frame aligner 1901 and an "A1 A2 A2" frame aligner 1903 (in this example, A1 bits are "11110110" and A2 bits are "00101000").

The A1 A1 A2 frame aligner 1901 detects a frame alignment sequence such as "A1 A1 A2" from an incoming virtual lane signal, and deactivates an out of lock signal when a frame beginning with A1 A1 A2 is detected. When the frame is detected, the A1 A1 A2 frame aligner 1901 aligns parallel data in order of incoming A1 A1 A2, generates a timing signal for reading a frame start signal and an OH byte, and transmits the timing signal to a data selector 1905.

Similarly, the A1 A2 A2 frame aligner 1903 detects a frame alignment sequence such as "A1 A2 A2" from an incoming virtual lane signal, and deactivates an out of lock signal when a frame beginning with A1 A2 A2 is detected. When the frame is detected, the A1 A2 A2 frame aligner 1903 aligns parallel data in order of incoming A1 A2 A2, generates a timing signal for reading the frame start signal and the VLM overhead byte, and transmits the timing signal to the data selector 1905.

When the out of lock signal received from the "A1 A1 A2" frame aligner 1901 is deactivated, the data selector 1905 selects data, a VLM overhead extraction timing signal, and a frame start signal received from the "A1 A1 A2" frame aligner 1903. The data selector 1905 delivers the data and the VLM overhead extraction timing signal to a VLM overhead extractor 1907 and delivers the frame start signal to a skew controller 1806. Also, when the out of lock signal received from the "A1 A2 A2" frame aligner 1903 is deactivated, the data selector 1905 selects the data, the VLM overhead extraction timing signal, and the frame start signal received from the "A1 A1 A2" frame aligner 1903. The data selector 1905 delivers the data and the VLM overhead extraction timing signal to the VLM overhead extractor 1907 and delivers the frame start signal to the skew controller 1906. If the data selector 1905 receives the deactivated out of lock signals from both the "A1 A1 A2" frame aligner 1901 and the "A1 A2 A2" frame aligner 1903, a previous state is kept unchanged. On the other hand, if the data selector 1905 receives the activated out of lock signals from both the "A1 A1 A2" frame aligner 1901 and the "A1 A2 A2" frame aligner 1903, the data selector 1905 selects the signal from the "A1 A1 A2" frame aligner 1901 or a "zero" value, as default.

Meanwhile, the VLM overhead extractor 1907 extracts the VLM byte signal using the data and the VLM overhead timing signal received from the data selector 1905. The VLM overhead extractor 1907 sends a virtual lane multi-frame sequence that is 4-bit VMFS information in the extracted VLM byte signal to the skew controller 1806. The VLM overhead extractor 1907 also sends a virtual container number that is 4-bit VCN information in the extracted VLM byte signal to the VC and VL aligner 1810. Also, the VLM overhead extractor 1907 obtains #m as the virtual container number through the 4-bit VCN information, and may obtain #m as the received virtual lane number upon receipt of the deactivated out of lock signal from the "A1 A1 A2" frame aligner 1901. If the VLM overhead extractor 1907 obtains virtual container number #m through the 4-bit VCN information and receives the deactivated out of lock signal from the "A1 A2 A2" frame aligner 1903, the VLM overhead extractor 1907 may obtain #m+X as the received virtual lane number. The virtual container number and the virtual lane number obtained by the VLM overhead extractor 1907 are sent to the VC and VL aligner 1810. When the "A1 A1 A2" frame aligner 1901 and the "A1 A2 A2" frame aligner 1903 simultaneously activate the out of lock signal, the VC detector and VL overhead processor 1808 regard it as an input of an abnormal virtual lane signal and activates all out of lock signals of the virtual lanes to inform the user of alert generation.

FIG. 19b is a block diagram of the VC detector and VLOH processor 1808 when a frame as shown in FIG. 10 and an 8 or more byte distributor as shown in FIG. 11 or 1 are used.

When an 8 or more byte distributor is used, there are frame alignment sequences such as A1 and A2 and a MFAS signal in one group. Accordingly, virtual lanes may be aligned by an OTUk frame aligner 1911 that aligns frames with "A1 A1 A2 A2". An OTUk frame aligner 1911 detects a frame alignment sequence such as "A1 A1 A2 A2" from the received virtual lane, and deactivates an out of lock signal when frame start points such as A1 A1 A1 A2 A2 are detected. When the frame is detected, the OTUk frame aligner 1911 aligns parallel data in order of incoming A1 A1 A1 A2 . . . , generates a timing signal for reading an OTUk overhead byte, and transmits the aligned data and the timing signal to the VCM overhead extractor 1913. Also, the OTUk frame aligner 1911 sends the frame start signal obtained through the frame detection to the skew controller 1806.

The VCM overhead extractor 1913 extracts a MFAS byte and a VCM byte signal using the aligned data and the overhead timing signal from the OTUk frame aligner 1911. The received data is sent to the VC and VL aligner 1810. In this case, the scrambler 810 in FIG. 8 scrambles the MFAS byte using a polynomial expression, $1+x+x^3+x^{12}+x^{16}$, as defined in the OTUk standard. Accordingly, obtaining accurate MFAS byte information requires descrambling. However, a descrambler having a reverse function of the scrambler 810 in FIG. 8 is unnecessary to simply obtain the MFAS byte. Performing an exclusive-OR (XOR) operation on the received descrambled MFAS byte and "11111111" can provide a descrambled MFAS byte. Scrambling is initialized and operation is performed beginning with the MFAS byte because a scrambling result value is x"FF". When the VCM byte is located in row 1 column 6 in extracting the VCM byte signal, separate descrambling is unnecessary because the VCM byte is not at a scrambling location. However, if the VCM byte is located in row 1 column 13 and scrambled before being transmitted, the VCM overhead detector 250 must descramble the descrambled VCM byte to obtain desired information. Accordingly, performing the XOR operation on the received descrambled VCM byte and "00010011" may provide a descrambled VCM byte. This is because a scrambling result value in row 1 column 13 is x"13". Meanwhile, the virtual container number that is 4-bit VCN information in the extracted VCM byte signal is sent to the VC and VL aligner 1810. The VCM overhead extractor 1913 also obtains #m as the virtual container number through 4-bit VCN information, and may obtain #m as the received virtual lane number if a MFAS[7] bit that is the least significant bit of the extracted MFAS byte is "0". If virtual container number #m is obtained through 4-bit VCN information and a MFAS[7] bit that is the least significant bit of the MFAS byte is "1", the VCM overhead extractor 1913 may obtain #m+X as the received virtual lane number. The virtual container number and the virtual lane number obtained from the VCM overhead extractor 1913 are sent to the VC and VL aligner 1810.

A MFAS[0:6] signal that consists of 7 other bits in the MFAS byte extracted by the VCM overhead extractor 1913 is used as multi-frame sequence information of the virtual lane. A VMFS EX byte that consists of 4 other bits in the VCM byte signal is used to add 4-bit VMFS bits. Accordingly, a total of 11-bit multi-frame of the virtual lane may be counted. The obtained multi-frame sequence of the virtual lane is sent to the skew controller 1806. The above example is related to an OTUk-Xv2d signal, in which X virtual containers and two virtual lanes are used. In case of an OTUk-Xv4d signal, when X virtual containers and four virtual lanes are used, two least lower bits MFAS[6:7] of MFAS are necessary to identify each virtual lane. Accordingly, bits available as the multi-frame sequence information of the virtual lane are reduced to 6 bits, MFAS[0:5]. Use of the VMFS EX byte consisting of 4 other bits in the VCM byte signal enables a total of 10-bit multi-frame sequence of the virtual lane to be sent to the skew controller 1806.

FIG. 19c is a block diagram of a VC detector and VL overhead processor 1808 when a frame as shown in FIG. 16 and an 8 or more byte distributor as shown in FIG. 11 or 1 is used.

Since the 8 or more byte distributor is used, as in FIG. 19b, virtual lanes may be aligned using an OTUk frame aligner 1921, which aligns frames with "A1 A1 A2 A2". A difference between FIG. 19c and FIG. 19b is that since an overhead of OTUk uses a VCOH byte that is an OPUk overhead, location information of an overhead other than the VCM byte must be extracted. The OTUk frame aligner 1921 detects a frame alignment sequence such as "A1 A1 A2 A2" from received virtual lane data, and deactivates an out of lock signal when frame start points such as A1 A1 A1 A2 A2 are detected. When the frame is detected, the OTUk frame aligner 1921 aligns data in order of incoming A1 A1 A1 A2 . . . , generates a timing signal for reading an OTUk overhead byte, and transmits the aligned data and the timing signal to the VCOH extractor 1923. The OTUk frame aligner 1921 also sends a frame start signal obtained through frame detection to the skew controller 1806.

Meanwhile, the VCOH extractor 1923 extracts the MFAS and VCOH byte signal using the aligned data and the overhead timing signal received from the OTUk frame aligner 1921. The received data is sent to the VC and VL aligner 1810. A descrambled MFAS byte may be extracted by performing an exclusive-OR (XOR) operation on the received descrambled MFAS byte and "11111111". A VCOH1 byte in row 1 column 15 is descrambled by the scrambler 810 in FIG. 8 when transmitted. Accordingly, a descrambled VCM byte can be obtained by performing an XOR operation on the received descrambled VCOH1 byte and "01110111". This is because a scrambling result value in row 1 column 15 is x"77". With the same method, VCOH2 and VCOH3 bytes may be extracted. When fourth to eighth bits MFAS[3:7] in the extracted VCOH1 byte signal are "00011" or "00100", VCOH1 byte information SQ is stored. The stored SQ signal indicates the virtual container number and is delivered to the VC and VL aligner 140. Also, the VCOH overhead detector 250 obtains #m as the virtual container number through the SQ information, and may obtain #m as the received virtual lane number when a MFAS[7] bit that is the least significant bit of the extracted MFAS byte is "0". If virtual container number #m is obtained through the SQ information and a MFAS[7] bit that is the least significant bit of the MFAS byte is "1", the VCOH overhead detector 250 may obtain #m+X as the received virtual lane number. The virtual container number and the virtual lane number obtained from the VCM overhead extractor are sent to the VC and VL aligner 1810.

Also, a MFAS[0:6] signal, which consists of 7 other bits of the MFAS byte extracted by the VCOH extractor 1923, is used for multi-frame sequence information of the virtual lane. Also, MFI1 and MFI2 bytes in the VCOH1 byte signal are used to add the VMFS bit by 8 bits. Accordingly, a total of 23-bit multi-frame of the virtual lane may be counted. The obtained multi-frame sequence of the virtual lane is sent to the skew controller 1806. The above example is related to an OTUk-Xv2d signal, in which X virtual containers and two virtual lanes are used. In case of an OTUk-Xv4d signal, if X virtual containers and four virtual lanes are used, MFAS[6:7], which are two least lower bits of MFAS, are necessary to identify each virtual lane. Accordingly, bits available as multi-frame sequence information of the virtual lane are reduced to 6 bits, MFAS[0:5]. If MFI1 and MFI2 bytes in the VCOH1 byte signal are used, a total of 22-bit multi-frame sequence of the virtual lane may be sent to the skew controller 1806. It is understood that the SQ information may be obtained from another value MFAS[3:7] defined in transmission.

Figure 20:
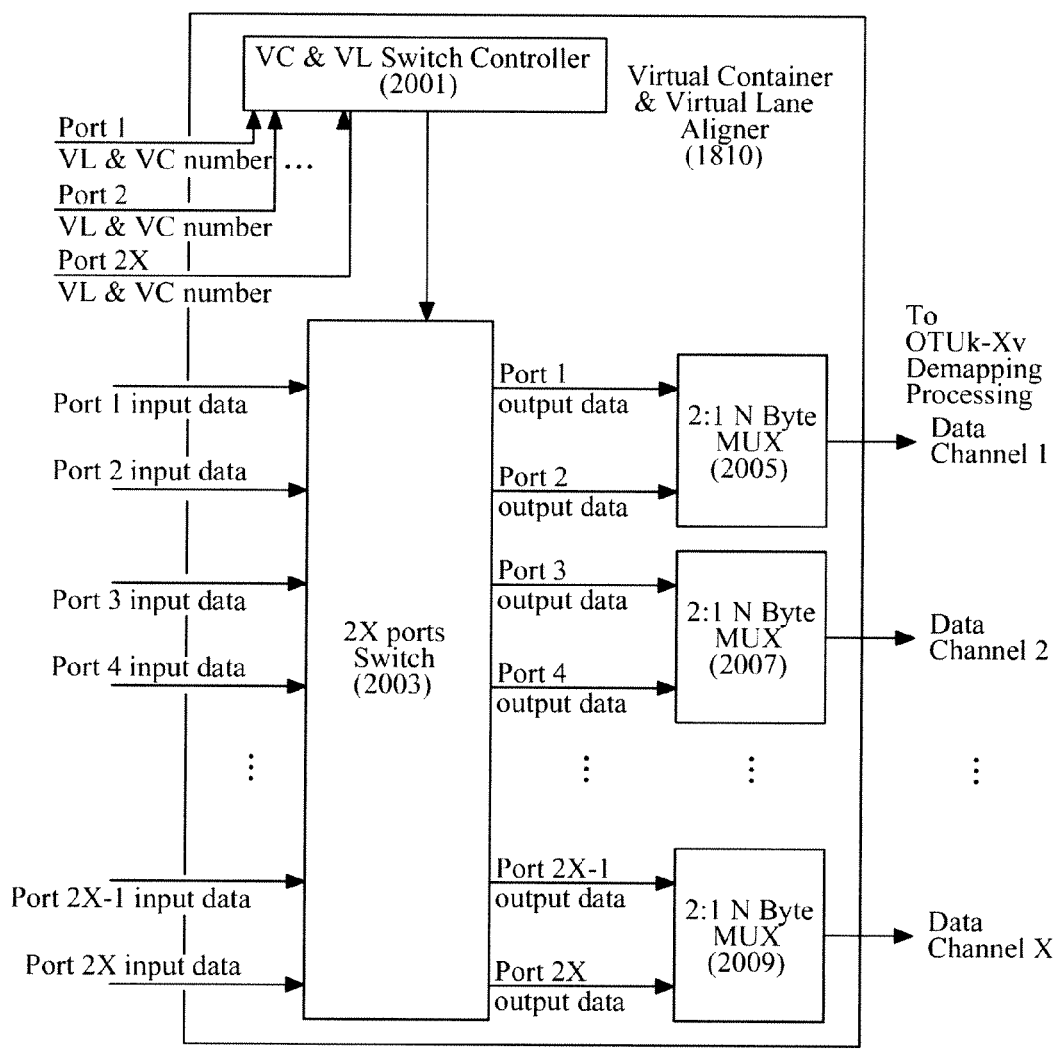
FIG. 20 is a block diagram of a virtual container and virtual lane aligner for a byte redistributor according to an exemplary embodiment of the present invention.

FIG. 20 is a block diagram of a VC and VL aligner 1810 for a byte redistributor 1800 according to an exemplary embodiment of the present invention.

Referring to FIG. 20, the VC and VL aligner 1810 receives data of each virtual lane, each virtual lane number, and a virtual container number from the VC detector and VL overhead processor 1808, and performs realignment to obtain an OTUk-Xv signal. The virtual lane number and the virtual container number input via ports are input to a VC and VL switch controller 2001, which aligns a port corresponding to the virtual container number received via each port into one virtual lane group, generates a switch control signal, and sends the switch control signal to a 2X port switch 2003 so that the ports are aligned in descending order using the virtual lane numbers in each group.

The 2X port switch 2003 receives 2X virtual lane data for each port and outputs the virtual lanes aligned for each virtual container according to the port switch control signal from the VC and VL switch controller 2001. That is, in case of OTUk-Xv2d signal, since one virtual container includes two virtual lanes, the 2X virtual lanes are aligned in X groups having the same virtual container number. Since there are two virtual lanes in each group, the virtual lanes are aligned in descending order using the virtual lane numbers. Accordingly, output data from port 1 of the 2X port switch is virtual lane 1 of virtual container 1, output data from port 2 is virtual lane 2 of virtual container 1, output data from port 3 is virtual lane 1 of virtual container 2, and output data from port 4 is virtual lane 2 of virtual container 2. Accordingly, output data from last port 2X−1 is virtual lane 1 of virtual container X, and output data from port 2X is virtual lane 2 of virtual container X. Pairs of the output data from the 2X ports are input to 2:1 N-byte multiplexers 2005, 2007, and 2009.

Each of the 2:1 N-byte multiplexers 2005, 2007, and 2009 performs multiplexing on the two data in units of N bytes. If an 8-byte distributor is employed in the transmitting unit, a 2:1 8-byte multiplexer is used to obtain an original virtual container signal OTUk. That is, 8-byte data input from port 1 are output and then 8-byte data input from port 2 are output. Since the output data are output twice as fast as the input data, there is no data loss. Since a total of X 2:1 N-byte multiplexers 2005, 2007, and 2009 are used, X OTUk signals are output via respective output channels. That is, the output signal becomes an OTUk-Xv signal. A realigned OTUk-Xv signal is sent to the OTUk-Xv demapping processor 332.

The method and apparatus of the present invention have been described in detail in connection with OTU2e-10v2d containing the 100 GbE signal. An exemplary embodiment of 40 Gbps signal transmission containing a 40 GbE signal will now be described. When OTU2e-4v is used to contain a 40 GbE signal, transmission via lane 4 and lane 1 can be achieved. However, transmission via lane 16 requires a separate deskew channel. However, when an OTU2e-4v4d frame structure in which four virtual lanes are allocated to each virtual container is used in the apparatus of the present invention, the transmission apparatus configuration as shown in FIG. 21 can be achieved without a separate deskew channel.

Figure 21:
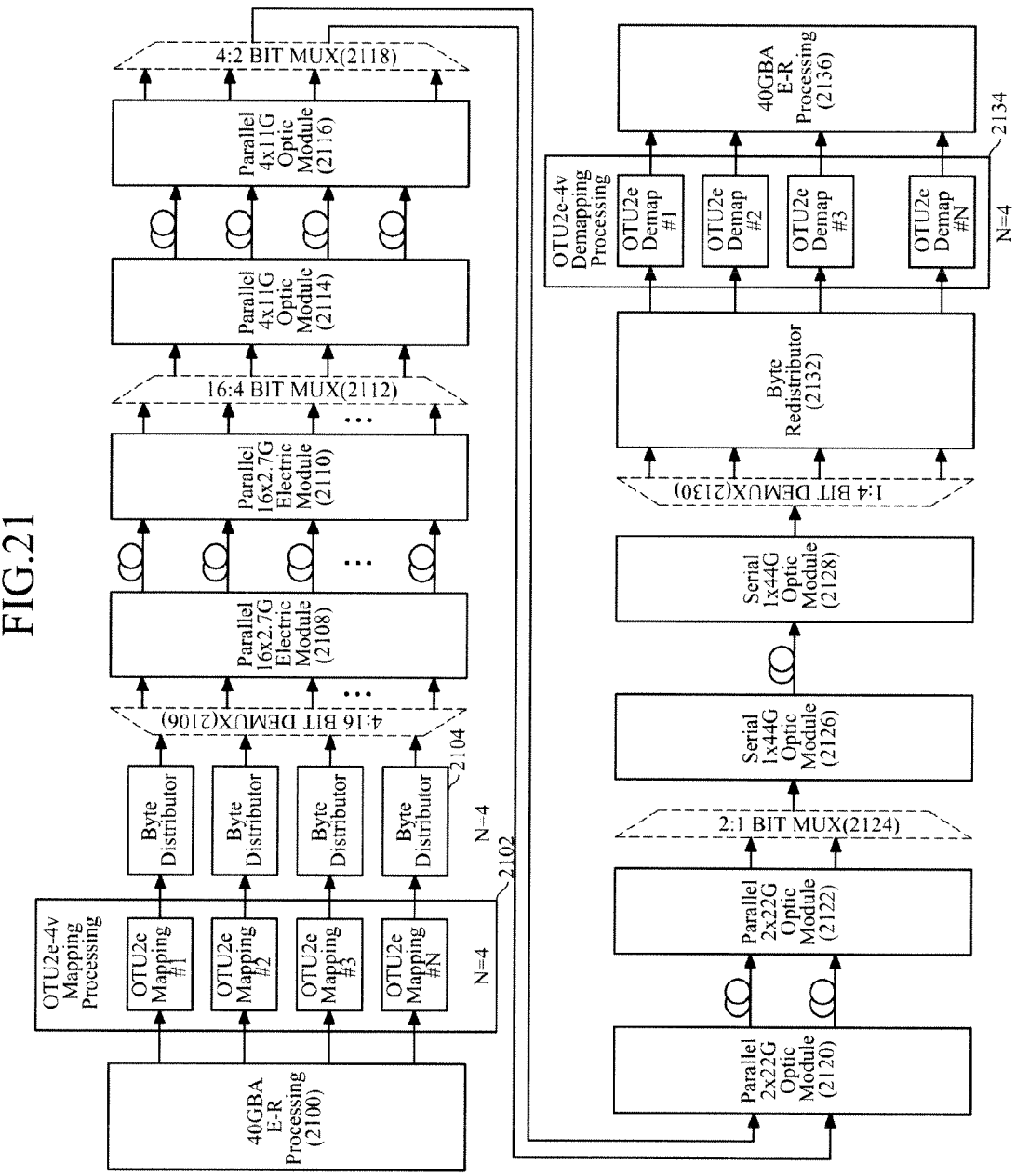
FIG. 21 is a block diagram of signal transmitting and receiving apparatuses containing a 40 GbE signal and performing transmission via various transport lanes according to another exemplary embodiment of the present invention.

FIG. 21 is a block diagram of a multi-lane transmitting apparatus according to another exemplary embodiment of the present invention. The multi-lane transmitting apparatus includes 40 GBASE-R processors 2100 and 2136, an OTU2e-4v mapping unit 2102, a byte distributor 2104, a parallel 4:16 bit demultiplexer 2106, parallel 16×2.7 G electric modules 2108 and 2110, a 16:4 bit multiplexer 2112, parallel 4×11 G optic modules 2114 and 2116, a 4:2 bit multiplexer 2118, parallel 2×22 G optic modules 2120 and 2122, a 2:1 bit multiplexer 2124, serial 1×44 G optic modules 2126 and 2128, a 1:4 bit demultiplexer 2130, a byte redistributor 2132, and an OTU2e-4v demapping unit 2134.

The 40 GBASE-R processor 2100 performs physical coding sublayer (PCS) processing on a 40 G Ethernet signal to generate a 41.25 Gb/s signal (40 GBASE-R). The OTU2e-4v mapping unit 2102 divides the 40 GBASE-R signal into four uniform signals and maps the uniform signals to four OTU2e signals. The byte distributor 2104 distributes bytes to four virtual lane groups so that four OTU2e signals can be transmitted via various transport lanes, and adds information for identifying each virtual lane. If the generated signal is an OTU2e-4v4d signal, each virtual container of OTU2e-4v4d has a rate of about 11 Gbps (=255×237×10.3125 Gbit/s). When OTU1e or another frame is used instead of OTU2e, the bit rate may be adjusted according to the OTU1e or frame.

The 4:16 bit demultiplexer 2106 performs 4:16 bit demultiplexing on the OTU2e-4v4d signal received from the byte distributor 2104 and interfaces to the parallel 16×2.5 G electric module 2110 via 16 lanes. Between the parallel 16×2.7 G electric modules 2108 and 2110, the generated OTU2e-4v4d signal is delivered via 16-channel electric lines of a PCB or an electrical cable. The 16:4 bit multiplexer 2112 performs 16:4 bit multiplexing on the OTU2e-4v4d signal received from the parallel 16×2.7 G electric module 2110 to transmit the OTU2e-4v4d signal to the parallel 4×11 G optic module 2114. The 16:4 bit multiplexing may use necessary overhead information of OTU2e-4v4d. Between the parallel 4×11 G optic modules 2114 and 2116, the OTU2e-4v4d signal is delivered to four optical cables or one optical cable through four wavelengths or a DQPSK+PM modulation scheme. The 4:2 bit multiplexer 2118 performs 4:2 bit multiplexing 4:2 on the OTU2e-4v4d signal received from the parallel 4×11 G optic module 2116 to transmit the OTU2e-4v4d signal to the parallel 2×22 G optic module 2120. The bit multiplexing may use necessary overhead information of the OTU2e-4v4d signal. Between the parallel 2×22 G optic modules 2120 and 2122, a signal obtained by 4:2 bit multiplexing the OTU2e-4v4d signal is delivered to two optical cables or one optical cable through two wavelengths or a DQPSK modulation scheme.

The 2:1 bit multiplexer 2124 performs 2:1 bit multiplexing on the OTU2e-4v4d signal received from the parallel 2×22 G optic module 2122 to transmit the OTU2e-4v4d signal to the serial 1×44 G optic module 2126. The 2:1 bit multiplexing may use necessary overhead information of the OTU2e-4v4d signal. Between the serial 1×44 G optic modules 2126 and 2128, a signal obtained by 4:1 bit multiplexing the OTU2e-4v4d signal is delivered to one optical cable through one wavelength. The 1:4 bit demultiplexer 2130 performs 1:4 bit demultiplexing on the signal obtained by 4:1 bit multiplexing the OTU2e-4v4d signal received from the serial 1×44 G optic module 2128 and interfaces to the byte redistributor 2132 via four lanes. Each byte redistributor 2132 redistributes bytes to detect the OTU2e-4v4d signal and generate an OTU2e-4v signal. The OTU2e-4v demapping unit 2134 extracts the 40 GBASE-R signal from the received OTU2e-4v signal and sends the 40 GBASE-R signal to the 40 GBASE-R processor 2136.

An exemplary embodiment of 160 Gbps signal transmission containing a 160 GbE signal will be described. Even though an OTU3-4v signal may be used to contain the 160 GbE signal, an example using OTU2e+-4v will be described to reduce a description of a complex mapping scheme. OTU2e+ is defined as a frame having the same structure as the OTU2e frame structure in FIG. 3a, but a data rate thereof is four times higher than that of OTU2e. That is, if a data rate of OTU2e is 255/237×10.3125 Gbit/s, a data rate of OTU2+e is 255/237×41.25 Gbit/s. Accordingly, parallel 4×44 G transmission can be achieved by forming OTU2e+-4v. However, in case of OTU2e+-4v, transmission via 8 or 16 lanes except for parallel 4 lanes is impossible. However, the configuration of the transmission apparatus as in FIG. 22 can be achieved by using an OTU2e+4v4d frame structure in which four virtual lanes are allocated to each virtual container according to the apparatus of the present invention.

Figure 22:
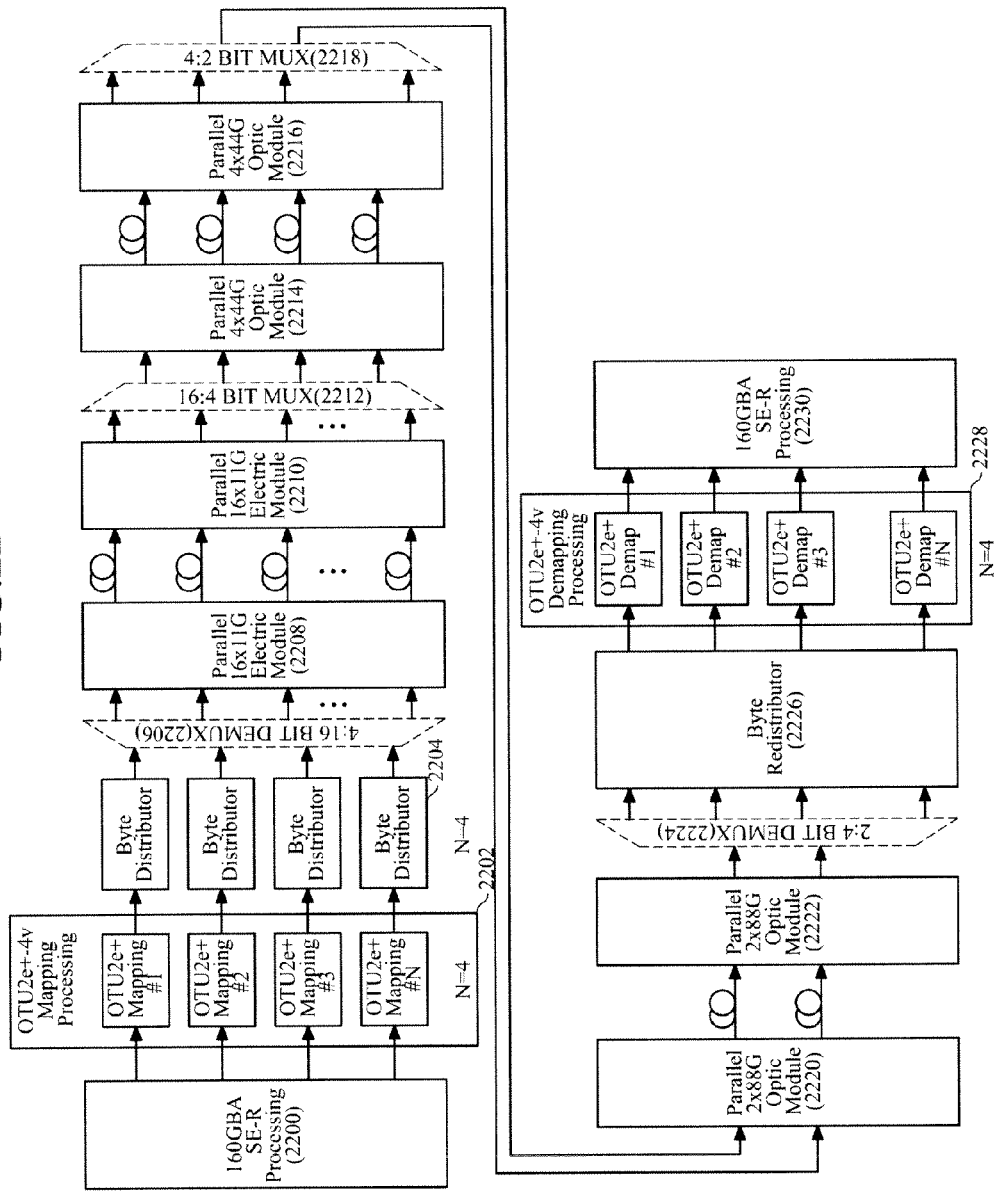
FIG. 22 is a block diagram of signal transmitting and receiving apparatuses containing a 160 GbE signal and performing transmission via various transport lanes according to another exemplary embodiment of the present invention.

Referring to FIG. 22, a 160 GBASE-R processor 2200 performs physical coding sublayer (PCS) processing on a 160 G Ethernet signal to generate a 165 Gb/s signal (160 GBASE-R). An OTU2e+-4v mapping unit 2202 divides a 160 GBASE-R signal into four uniform signals and maps the signals to four OTU2e+ signals. A byte distributor 2204 distributes bytes to four virtual lane groups and adds information for identifying each virtual lane so that four OTU2e+ signals can be transmitted via various transport lanes. If the generated signal is an OTU2e+-4v4d signal, each virtual container of OTU2e+-4v4d has a rate of about 44 Gbps (=255×237×41.25 Gbit/s). When OTU1e+ other than OTU2e+ or another frame is used, the bit rate may be adjusted according to the OTU1e+ or frames. A 4:16 bit demultiplexer 2206 performs 4:16 bit demultiplexing on the OTU2e+-4v4d signal received from the byte distributor 2204 and interfaces to a parallel 16×11 G electric module 2208 via 16 lanes. Between the parallel 16×11 G electric modules 2208 and 2210, the generated OTU2e+-4v4d signal is delivered through 16-channel electric lines of a PCB or an electrical cable. A 16:4 bit multiplexer 2212 performs 16:4 bit multiplexing on the OTU2e+-4v4d signal received from the parallel 16×11 G electric module 2210 to transmit the OTU2e+-4v4d signal to a parallel 4×44 G optic module 2214. The 16:4 bit multiplexing may use necessary overhead information of OTU2e+-4v4d. Between the parallel 4×44 G optic modules 2214 and 2216, the OTU2e+-4v4d signal is delivered to four optical cables or one optical cable through four wavelengths or a DQPSK+PM modulation scheme. A 4:2 bit multiplexer 2218 performs 4:2 bit multiplexing on the OTU2e+-4v4d signal received from the parallel 4×44 G optic module 2216 to transmit the OTU2e+-4v4d signal to a parallel 2×88 G optic module 2220. The 4:2 bit multiplexing may use necessary overhead information of the OTU2e+-4v4d signal.

Between the parallel 2×88 G optic modules 2220 and 2222, a signal obtained by 4:2 bit multiplexing the OTU2e+-4v4d signal is delivered to two optical cables or one optical cable through two wavelengths or a DQPSK modulation scheme. A 2:4 bit demultiplexer 2224 performs 2:4 bit demultiplexing on a signal obtained by 4:2 bit multiplexing the OTU2e+-4v4d signal received from the parallel 2×88 G optic module 2222, and interfaces to each byte redistributor 2226 via four lanes. Each byte redistributor 2226 distributes bytes to detect the OTU2e+-4v4d signal and generate an OTU2e+-4v signal. The OTU2e+-4v demapping unit 2228 extracts the 160 GBASE-R signal from the OTU2e+-4v signal received from the byte redistributor 2226 and sends the 160 GBASE-R signal to a 160 GBASE-R processor 2230.

Similarly, when an OTU2e+4v5d frame structure in which five virtual lanes are allocated to each virtual container is used, transmission via 5 parallel 32 G lanes, 10 16 G lanes and 20 8 G lanes, as well as via 2 parallel 80 G lanes and 4 parallel 40 G lanes, can be achieved. Also, when an OTU2e+4v10d frame structure in which ten virtual lanes are allocated to each virtual container is used, transmission via 8 parallel 20 G lanes and 40 parallel 4 G lanes, as well as 2 parallel 80 G lanes, 4 parallel 40 G lanes, 5 parallel 32 G lanes, 10 16 G lanes and 20 8 G lanes, can be achieved.

According to an exemplary embodiment of the present invention, it is unnecessary to demap a data-tributary signal mapped to frames, define a new frame conforming to a product standard, or map the signal to the new frame to use products available from several serializer deserializer (SerDes) manufacturers and several optic module manufacturers. Also, by using the apparatus according to an exemplary embodiment of the present invention after mapping a data-tributary signal to a transmission frame using a conventional mapping technique as is, a 40 G transmission frame can be extended to a 160 G transmission frame, and 160 G transmission can be achieved by using 40 G products as is. Thus, since a system can be implemented using several optic module products, system configuration does not depend on specific optic module manufactures and products can be selected and used through various price comparisons, thereby reducing system's price and upgrading the system through substitution of only optic modules. Also, since a SerDes does not require any logic for compensating for a skew among electrical signals, but merely a simple bit multiplexing function, volumes and prices of parts and a total cost of the system can be reduced. In addition, when a transmission property of previously installed optical fiber does not support very high speed signal transmission, an optic module using parallel optical fiber may be used to transmit the very high speed signal in parallel.

The present invention can be implemented as computer readable codes in a computer readable record medium. The computer readable record medium includes all types of record media in which computer readable data are stored.

Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner. Functional programs, codes, and code segments for implementing the present invention may be easily inferred by programmers in the art to which the present invention belongs.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A multi-lane signal transmitting apparatus comprising:
a transport hierarchy signal mapping unit mapping a data signal to transport hierarchy signals of a plurality of channels, and inserting virtual lane marker information for identifying a plurality of virtual lane signals belonging to each channel into an overhead area of the virtual lane signals;
byte distributors distributing a transport hierarchy signal frame of each channel to a plurality of virtual lanes; and
an n:m bit multiplexer bit-multiplexing an transport hierarchy signal (OTUk-XvYd) having Y virtual lane signals per channel (X) output from each byte distributor according to a transport lane number of a signal transmission module located after the n:m bit multiplexer.

2. The apparatus of claim 1, wherein the transport hierarchy signal mapping unit generates a plurality of virtual lane marker information for each channel using a virtual container number indicating each channel (X) and multi-frame alignment sequence information of the virtual lane.

3. The apparatus of claim 2, wherein the transport hierarchy signal mapping unit further generates a plurality of extended virtual lane marker information for each channel using some parts of the multi-frame alignment sequence information of the virtual lane to extend a skew compensation value.

4. The apparatus of claim 3, wherein the transport hierarchy signal mapping unit inserts the extended virtual lane marker information into an overhead area of ODUk that is a transport hierarchy signal.

5. The apparatus of claim 1, wherein the transport hierarchy signal mapping unit inserts the plurality of generated virtual lane marker information into an overhead area of OTUk that is a transport hierarchy signal.

6. The apparatus of claim 1, wherein each byte distributor comprises:
a 1:N byte demultiplexer demultiplexing the transport hierarchy signal of each channel output from the transport hierarchy signal mapping unit, in units of bytes;
a temporary data storage unit storing some of the demultiplexed transport hierarchy signals in units of bytes; and
a N:1 bit multiplexer aligning the demultiplexed transport hierarchy signals and the stored transport hierarchy signals to output an transport hierarchy multi-lane signal (OTUk-XvYd) having Y virtual lane signals per channel.

7. A multi-lane signal transmitting apparatus comprising:
an transport hierarchy signal mapping unit dividing a data signal, mapping the data signal to transport hierarchy signals of a plurality of channels, and inserting virtual lane marker information indicating each channel (X) into an overhead area of virtual lane signals;
byte distributors distributing a transport hierarchy signal frame of each channel by a virtual lane number; and
an n:m bit multiplexer bit-multiplexing a transport hierarchy signal (OTUk-XvYd) having Y virtual lane signals per channel (X) output from each byte distributor according to a transport lane number of a signal transmission module located after the n:m bit multiplexer.

8. The apparatus of claim 7, wherein the transport hierarchy signal mapping unit generates virtual container marker information for each channel using a virtual container number indicating each channel (X) and multi-frame alignment sequence information of the virtual lane.

9. The apparatus of claim 7, wherein the transport hierarchy signal mapping unit inserts the virtual container marker information into an overhead area of ODUk that is a transport hierarchy signal.

10. The apparatus of claim 7, wherein the transport hierarchy signal mapping unit inserts the virtual container marker information into any one A2 1-byte area in an overhead of OTUk that is a transport hierarchy signal.

11. The apparatus of claim 7, wherein the transport hierarchy signal mapping unit generates virtual multi-frame alignment sequence information of each channel that represents a maximum multiple of the virtual lane number, instead of the virtual container marker information of each channel.

12. The apparatus of claim 7, wherein the transport hierarchy signal mapping unit comprises an overhead processor adding an overhead including the virtual multi-frame alignment sequence information to a transport hierarchy signal frame, the overhead processor comprising:
a SQ register setting a virtual container number to be used in the overhead processor;

a virtual multi-frame sequence generator receiving frame start information of the virtual container from a timing generator and outputting a virtual multi-frame sequence number of the virtual lane;

at least one virtual multi-frame alignment sequence register dividing and storing count bit information of the virtual multi-frame sequence number;

an overhead selector selecting an output of each register as overhead information at a specified location of the overhead area; and an overhead and data selector selecting and outputting the overhead information and data in an overhead area and a payload area, respectively.

13. The apparatus of claim 7, wherein each byte distributor is an 8n (n=1, 2, 3, . . . ) byte distributor and comprises:

a 1:N byte demultiplexer demultiplexing the transport hierarchy signal of each channel output from the transport hierarchy signal mapping unit, in units of bytes;

a temporary data storage unit storing some of the demultiplexed transport hierarchy signals in units of bytes;

a switching unit switching and outputting the demultiplexed transport hierarchy signals and the stored transport hierarchy signals; and a N:1 bit multiplexer aligning the demultiplexed transport hierarchy signals and the stored transport hierarchy signals output from the switching unit to output an transport hierarchy multi-lane signal (OTUk-XvYd) having Y virtual lane signals per channel.

14. A multi-lane signal receiving apparatus that receives multiplexed transport hierarchy signals (OTUk-XvYd) of a plurality (X) of channels having Y virtual lane signals per channel, a demultiplexer demultiplexing the multiplexed transport hierarchy signals into the transport hierarchy signals of a plurality of channels;

a byte redistributor dividing the demultiplexed virtual lane signal of each channel, compensating for a skew of the divided virtual lane signals, and outputting transport hierarchy signals (OTUk-Xv) of the plurality of channels using a virtual lane number and a virtual container number inserted into overhead area of the virtual lane signals; and a demapping unit demapping data signals from the transport hierarchy signals of the plurality of channels output from the byte redistributor.

15. The apparatus of claim 14, wherein the byte redistributor comprises:

a plurality of 1:Y bit demultiplexers dividing Y virtual lane signals for an transport hierarchy signal (OTUk-XvYd) of each channel;

delay shifters adjusting a delay of each virtual lane signal output from the 1:Y demultiplexer according to an input delay adjustment value;

a plurality of virtual container detector and virtual lane overhead processors processing an overhead of each delay-adjusted virtual lane signal and extracting a virtual lane number, a virtual container number, a frame start signal of the virtual lane, virtual lane multi-frame sequence information and data;

a skew controller calculating a value of a frame skew generated among the virtual lanes and a data skew value in a frame of each virtual lane using the frame start signal of the virtual lane and the virtual lane multi-frame sequence information and outputting a delay adjustment value; and a virtual container and virtual lane aligner aligning input virtual containers and virtual lane data having the same virtual container number among input virtual lane data according to the virtual lane number, and outputting transport hierarchy signals (OTUk-Xv) of a plurality of channels.

16. The apparatus of claim 15, wherein the virtual container detector and virtual lane overhead processor comprises:

frame aligners outputting a path select signal (out-of-lock signal) for the same input virtual lane signal when the virtual lane signal has a predetermined frame alignment sequence, and outputting a frame start signal, a timing signal for reading an overhead byte, and the aligned data;

a data selector selecting the frame start signal, the timing signal and the aligned data output from any one of the frame aligners according to the path select signal; and a virtual lane marker overhead extractor extracting a virtual lane marker from the timing signal and the data input from the data selector, obtaining virtual lane multi-frame sequence information (VMFS) and a virtual container number from the virtual lane marker, and obtaining virtual lane numbers #m and #m+X according to the path select signal from the frame aligners.

17. The apparatus of claim 15, wherein the virtual container detector and virtual lane overhead processor comprises:

a frame aligner outputting a path select signal (out-of-lock signal) and a frame start signal when the input virtual lane signal has a predetermined frame alignment sequence, aligning input data, outputting the aligned data with a timing signal for reading an overhead byte of the output transport hierarchy signal; and a virtual container marker overhead extractor extracting multi-frame sequence information (MFAS) and virtual container marker information from the aligned data using the timing signal and obtaining a virtual container number and a virtual lane number from the multi-frame sequence information and the virtual container marker information.

18. The apparatus of claim 17, wherein the virtual container marker overhead extractor obtains virtual lane number #m or #m+X according to a least significant bit value of the obtained multi-frame sequence information (MFAS).

19. The apparatus of claim 15, wherein the virtual container detector and virtual lane overhead processor comprises:

a frame aligner outputting a path select signal (out-of-lock signal) and a frame start signal when an input virtual lane signal has a predetermined frame alignment sequence, aligning input data, and outputting the aligned data with a timing signal for reading an overhead byte of the transport hierarchy signal; and a virtual concatenation overhead extractor extracting multi-frame sequence information (MFAS) and a virtual concatenation overhead byte from the aligned data using the timing signal, and obtaining a virtual lane number and sequence indicator (SQ) information indicating a virtual container number from the multi-frame sequence information (MFAS) and the virtual concatenation overhead byte.

20. The apparatus of claim 19, wherein the virtual concatenation overhead extractor obtains virtual lane number #m or #m+X according to a least significant bit value of the obtained multi-frame sequence information (MFAS).

* * * * *